US012747766B2

(12) United States Patent
Ishida

(10) Patent No.: US 12,747,766 B2
(45) Date of Patent: Sep. 29, 2026

(54) BRAKE CONTROL DEVICE AND MOTOR DRIVE DEVICE

(71) Applicant: FANUC CORPORATION, Yamanashi (JP)

(72) Inventor: Hitoshi Ishida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 441 days.

(21) Appl. No.: 18/264,929

(22) PCT Filed: Mar. 23, 2022

(86) PCT No.: PCT/JP2022/013671

§ 371 (c)(1),
(2) Date: Aug. 10, 2023

(87) PCT Pub. No.: WO2022/210196

PCT Pub. Date: Oct. 6, 2022

(65) Prior Publication Data

US 2024/0309925 A1 Sep. 19, 2024

(30) Foreign Application Priority Data

Mar. 31, 2021 (JP) ................................ 2021-061247

(51) Int. Cl.

*F16D 66/00* (2006.01)
*H02P 29/024* (2016.01)
*F16D 121/22* (2012.01)

(52) U.S. Cl.

CPC ............ *F16D 66/00* (2013.01); *H02P 29/024* (2013.01); *F16D 2121/22* (2013.01)

(58) Field of Classification Search

CPC ................ F16D 66/00; F16D 2121/22; F16D 2121/14; H02P 29/024; H02P 29/04; H02P 3/04; B60T 2270/415

See application file for complete search history.

(56) References Cited

U.S. PATENT DOCUMENTS

2009/0216372 A1* 8/2009 Watanabe ............. B25J 9/1674 700/245
2014/0060982 A1* 3/2014 Matsumoto ............ B60T 13/74 188/158

(Continued)

FOREIGN PATENT DOCUMENTS

CN 112368931 A 2/2021
JP H08-182365 A 7/1996

(Continued)

*Primary Examiner* — David R Morris

(74) *Attorney, Agent, or Firm* — HAUPTMAN HAM, LLP

(57) ABSTRACT

A brake control device includes a power supply controlled so as to output a voltage or so as not to output a voltage in accordance with a power supply control signal; a brake control unit for outputting a brake control signal; an opening/closing unit for opening/closing an electric circuit between the power supply and the brake device in accordance with the brake control signal; a state detection unit for outputting a state detection signal indicating the potential state of the electric circuit between the opening/closing unit and the brake device; an abnormality detection unit for detecting whether or not an abnormality has occurred on the basis of a combination of the details of the brake control signal and the details of the state detection signal; and a power supply control unit for outputting, as the power supply control signal, an output-off signal when an abnormality is occurred.

13 Claims, 54 Drawing Sheets

(56) References Cited

U.S. PATENT DOCUMENTS

| | | | | |
|---|---|---|---|---|
| 2015/0316111 | A1* | 11/2015 | Tanabe | B60T 13/748<br>700/245 |
| 2019/0382103 | A1* | 12/2019 | Frank | B64C 25/44 |

FOREIGN PATENT DOCUMENTS

| | | | |
|---|---|---|---|
| JP | 2009-196031 | A | 9/2009 |
| JP | 2012-237397 | A | 12/2012 |
| JP | 2014-050912 | A | 3/2014 |
| JP | 2015-211609 | A | 11/2015 |
| JP | 2019-105286 | A | 6/2019 |
| JP | 2020-089137 | A | 6/2020 |
| WO | 2014/045728 | A1 | 3/2014 |

* cited by examiner

FIG. 3A

DURING NORMAL STATE

| | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | HIGH | LOW | LOW |
| STATE DETECTION SIGNAL $FB_B$ | HIGH | LOW | HIGH |
| BRAKE STATE | ACTUATED | ACTUATED | RELEASED |

FIG. 4A

DURING SHORT CIRCUIT FAILURE OF POSITIVE-SIDE OPENING AND CLOSING SWITCH

| | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | ~~High~~ LOW | LOW | LOW |
| STATE DETECTION SIGNAL $FB_B$ | ~~High~~ LOW | LOW | HIGH |
| BRAKE STATE | ACTUATED | ACTUATED | RELEASED |

FIG. 5A

WITHOUT POWER SOURCE CONTROL: DURING SHORT CIRCUIT FAILURE OF NEGATIVE-SIDE OPENING AND CLOSING SWITCH

| | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | HIGH | LOW | LOW |
| STATE DETECTION SIGNAL $FB_B$ | HIGH | ~~LOW~~ HIGH | HIGH |
| BRAKE STATE | ACTUATED | AC~~TUAT~~ED RELEASED | RELEASED |

FIG. 6A

WITH POWER SOURCE CONTROL: DURING SHORT CIRCUIT FAILURE OF NEGATIVE-SIDE OPENING AND CLOSING SWITCH

| | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | HIGH | HIGH |
| STATE DETECTION SIGNAL $FB_B$ | HIGH | LOW HIGH |
| POWER SOURCE CONTROL SIGNAL | ON | OFF |
| BRAKE STATE | ACTUATED | RELEASED ACTUATED |

FIG. 7A

WITH RETURN TO BRAKE ACTUATION PROCESS: DURING SHORT CIRCUIT FAILURE OF NEGATIVE-SIDE OPENING AND CLOSING SWITCH

| | BRAKE ACTUATION | BRAKE RELEASE PREPARATION | BRAKE ACTUATION |
|---|---|---|---|
| BRAKE SIGNAL $BS_A$ | LOW | HIGH → | LOW |
| BRAKE SIGNAL $BS_B$ | LOW | LOW | LOW |
| STATE DETECTION SIGNAL $FB_A$ | HIGH | LOW | HIGH |
| STATE DETECTION SIGNAL $FB_B$ | HIGH | ~~LOW~~ HIGH | ~~LOW~~ HIGH |
| BRAKE STATE | ACTUATED | RELEASED → | ACTUATED |

FIG. 8A

WITHOUT CURRENT CONTROL: DURING SHORT CIRCUIT FAILURE OF POSITIVE-SIDE OPENING AND CLOSING SWITCH AND NEGATIVE-SIDE OPENING AND CLOSING SWITCH

| | BRAKE ACTUATION | BRAKE RELEASE PREPARATION | BRAKE RELEASE |
|---|---|---|---|
| BRAKE SIGNAL $BS_A$ | LOW | HIGH | HIGH |
| BRAKE SIGNAL $BS_B$ | LOW | LOW | HIGH |
| STATE DETECTION SIGNAL $FB_A$ | ~~High~~ LOW | LOW | LOW |
| STATE DETECTION SIGNAL $FB_B$ | HIGH | ~~Low~~ HIGH | HIGH |
| BRAKE STATE | ~~ACTUATED~~ RELEASED | ~~ACTUATED~~ RELEASED | RELEASED |

FIG. 9A

WITH CURRENT CONTROL: DURING SHORT CIRCUIT FAILURE OF POSITIVE-SIDE OPENING AND CLOSING SWITCH AND NEGATIVE-SIDE OPENING AND CLOSING SWITCH

| | BRAKE ACTUATION | BRAKE RELEASE PREPARATION |
|---|---|---|
| BRAKE SIGNAL $BS_A$ | LOW | HIGH |
| BRAKE SIGNAL $BS_B$ | LOW | LOW |
| STATE DETECTION SIGNAL $FB_A$ | ~~LOW~~ HIGH | LOW |
| STATE DETECTION SIGNAL $FB_B$ | HIGH | ~~LOW~~ HIGH |
| POWER SOURCE CONTROL SIGNAL | OFF | OFF |
| BRAKE STATE | ~~RELEASED~~ ACTUATED | ~~RELEASED~~ ACTUATED |

FIG. 18A

DURING NORMAL STATE

| | BRAKE ACTUATION | BRAKE RELEASE |
|---|---|---|
| BRAKE SIGNAL BS | LOW | HIGH |
| STATE DETECTION SIGNAL FB | LOW | HIGH |
| BRAKE STATE | ACTUATED | RELEASED |

FIG. 19A

WITHOUT POWER SOURCE CONTROL: DURING SHORT CIRCUIT FAILURE OF OPENING AND CLOSING SWITCH

| | BRAKE ACTUATION | BRAKE RELEASE |
|---|---|---|
| BRAKE SIGNAL BS | LOW | HIGH |
| STATE DETECTION SIGNAL FB | ~~LOW~~ HIGH | HIGH |
| BRAKE STATE | AC~~TUAT~~ED RELEASED | RELEASED |

FIG. 20A

WITH POWER SOURCE CONTROL: DURING SHORT CIRCUIT FAILURE OF OPENING AND CLOSING SWITCH

| | BRAKE ACTUATION | BRAKE RELEASE |
|---|---|---|
| BRAKE SIGNAL BS | LOW | HIGH |
| STATE DETECTION SIGNAL FB | ~~LOW~~ HIGH | HIGH |
| POWER SOURCE CONTROL SIGNAL | OFF | |
| BRAKE STATE | ~~RELEASED~~ ACTUATED | RELEASED |

FIG. 21A

DURING NORMAL STATE

| | BRAKE ACTUATION | POWER SOURCE INSPECTION | BRAKE RELEASE |
|---|---|---|---|
| BRAKE SIGNAL BS | LOW | LOW | HIGH |
| POWER SOURCE CONTROL SIGNAL | ON | OFF | ON |
| POWER SOURCE OUTPUT | PRESENT | ABSENT | PRESENT |
| STATE DETECTION SIGNAL FB | LOW | HIGH | HIGH |
| BRAKE STATE | ACTUATED | ACTUATED | RELEASED |

FIG. 21B

DURING ABNORMALITY OF POWER SOURCE

| | BRAKE ACTUATION | POWER SOURCE INSPECTION | BRAKE ACTUATION |
|---|---|---|---|
| BRAKE SIGNAL BS | LOW | LOW | LOW |
| POWER SOURCE CONTROL SIGNAL | ON | OFF | ON |
| POWER SOURCE OUTPUT | PRESENT | ~~ABSENT~~ PRESENT | PRESENT |
| STATE DETECTION SIGNAL FB | LOW | ~~High~~ LOW | LOW |
| BRAKE STATE | ACTUATED | ACTUATED | ACTUATED |

FIG. 24A

DURING NORMAL STATE

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | HIGH | LOW | HIGH | LOW |
| STATE DETECTION SIGNAL $FB_B$ | HIGH | HIGH | LOW | HIGH | HIGH |
| BRAKE STATE | ACTUATED | ACTUATED | ACTUATED | ACTUATED | RELEASED |

FIG. 24B

DURING FAILURE OF POWER SOURCE

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | ~~High~~ LOW | LOW | HIGH | LOW |
| STATE DETECTION SIGNAL $FB_B$ | HIGH | ~~High~~ LOW | LOW | HIGH | HIGH |
| BRAKE STATE | ACTUATED | ACTUATED | ACTUATED | ACTUATED | RELEASED |

FIG. 25A

DURING SHORT CIRCUIT FAILURE OF NEGATIVE-SIDE OPENING AND CLOSING SWITCH

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | HIGH | LOW | HIGH | LOW |
| STATE DETECTION SIGNAL $FB_B$ | HIGH | HIGH | ~~LOW~~ HIGH | HIGH | HIGH |
| BRAKE STATE | ACTUATED | ACTUATED | ACTUATED | ACTUATED | RELEASED |

FIG. 25B

DURING SHORT CIRCUIT FAILURE OF POSITIVE-SIDE OPENING AND CLOSING SWITCH

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | LOW | LOW | ~~High~~ LOW | LOW |
| STATE DETECTION SIGNAL $FB_B$ | HIGH | LOW | LOW | ~~High~~ LOW | HIGH |
| BRAKE STATE | ACTUATED | ACTUATED | ACTUATED | ACTUATED | RELEASED |

FIG. 26A

DURING SHORT CIRCUIT FAILURE OF POSITIVE-SIDE OPENING AND CLOSING SWITCH AND NEGATIVE-SIDE OPENING AND CLOSING SWITCH

| | BRAKE ACTUATION | FIRST BRAKE RELEASE PREPARATION | POWER SOURCE CONTROL | SECOND BRAKE RELEASE PREPARATION | PROTECTING OPERATION |
|---|---|---|---|---|---|
| POWER SOURCE CONTROL SIGNAL | OFF | OFF | ON | ON | ~~ON~~ OFF |
| BRAKE LOCK CONTROL SIGNAL | OPEN | OPEN | OPEN | OPEN | ~~OPEN~~ CLOSE |
| BRAKE SIGNAL $BS_A$ | LOW | HIGH | HIGH | LOW | LOW |
| BRAKE SIGNAL $BS_B$ | LOW | LOW | LOW | LOW | LOW |
| STATE DETECTION SIGNAL $FB_A$ | HIGH | HIGH | LOW | ~~High~~ LOW | HIGH |
| STATE DETECTION SIGNAL $FB_B$ | HIGH | HIGH | ~~Low~~ HIGH | HIGH | HIGH |
| BRAKE STATE | ACTUATED | ACTUATED | ~~ACTUATED~~ RELEASED | ~~ACTUATED~~ RELEASED | ~~RELEASED~~ ACTUATED |

FIG. 26B

DURING SHORT CIRCUIT FAILURE OF POSITIVE-SIDE OPENING AND CLOSING SWITCH AND NEGATIVE-SIDE OPENING AND CLOSING SWITCH

| | BRAKE ACTUATION | FIRST BRAKE RELEASE PREPARATION | POWER SOURCE CONTROL | SECOND BRAKE RELEASE PREPARATION | PROTECTING OPERATION |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | ~~OPEN~~ CLOSE |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | HIGH | LOW | ~~High~~ LOW | LOW |
| STATE DETECTION SIGNAL $FB_B$ | HIGH | HIGH | ~~Low~~ HIGH | HIGH | HIGH |
| BRAKE STATE | ACTUATED | ACTUATED | ~~ACTUATED~~ RELEASED | ~~ACTUATED~~ RELEASED | ~~RELEASED~~ ACTUATED |

FIG. 27

DURING SHORT CIRCUIT FAILURE OF POSITIVE-SIDE OPENING AND CLOSING SWITCH AND NEGATIVE-SIDE OPENING AND CLOSING SWITCH

| | BRAKE ACTUATION | FIRST BRAKE RELEASE PREPARATION | POWER SOURCE CONTROL | SECOND BRAKE RELEASE PREPARATION | PROTECTING OPERATION |
|---|---|---|---|---|---|
| POWER SOURCE CONTROL SIGNAL | OFF | OFF | ON | ON | ~~ON~~ OFF |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | HIGH | LOW | ~~High~~ LOW | LOW |
| STATE DETECTION SIGNAL $FB_B$ | HIGH | HIGH | ~~Low~~ HIGH | HIGH | HIGH |
| BRAKE STATE | ACTUATED | ACTUATED | ~~ACTUATED~~<br>RELEASED | ~~ACTUATED~~<br>RELEASED | ~~RELEASED~~<br>ACTUATED |

FIG. 29A

WITHOUT PROTECTING OPERATION: DURING SHORT CIRCUIT OF EXTERNAL POWER SOURCE AND BRAKE CABLE (PART 1)

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | ~~High~~ LOW | ~~High~~ LOW | LOW | ~~High~~ LOW | LOW |
| STATE DETECTION SIGNAL $FB_B$ | HIGH | HIGH | ~~Low~~ HIGH | HIGH | HIGH |
| BRAKE STATE | ~~ACTUATED~~<br>RELEASED | ~~ACTUATED~~<br>RELEASED | ~~ACTUATED~~<br>RELEASED | ~~ACTUATED~~<br>RELEASED | RELEASED |

FIG. 29B

WITH PROTECTING OPERATION: DURING SHORT CIRCUIT OF EXTERNAL POWER SOURCE AND BRAKE CABLE (PART 1)

| | BRAKE ACTUATION | FIRST BRAKE RELEASE PREPARATION | POWER SOURCE CONTROL | SECOND BRAKE RELEASE PREPARATION |
|---|---|---|---|---|
| POWER SOURCE CONTROL SIGNAL | OFF | OFF | ~~ON~~ OFF | ~~ON~~ OFF |
| BRAKE LOCK CONTROL SIGNAL | OPEN CLOSE | OPEN CLOSE | OPEN CLOSE | OPEN CLOSE |
| BRAKE SIGNAL $BS_A$ | LOW | HIGH | HIGH | LOW |
| BRAKE SIGNAL $BS_B$ | LOW | LOW | LOW | LOW |
| STATE DETECTION SIGNAL $FB_A$ | ~~High~~ LOW | ~~High~~ LOW | LOW | ~~High~~ LOW |
| STATE DETECTION SIGNAL $FB_B$ | HIGH | HIGH | ~~Low~~ HIGH | HIGH |
| BRAKE STATE | ~~RELEASED~~ ACTUATED | ~~RELEASED~~ ACTUATED | ~~RELEASED~~ ACTUATED | RELEASED ACTUATED |

FIG. 31A

WITHOUT PROTECTING OPERATION: DURING SHORT CIRCUIT OF EXTERNAL POWER SOURCE AND BRAKE CABLE (PART 2)

| | BRAKE ACTUATION | FIRST BRAKE RELEASE PREPARATION | POWER SOURCE CONTROL | SECOND BRAKE RELEASE PREPARATION | BRAKE RELEASE |
|---|---|---|---|---|---|
| POWER SOURCE CONTROL SIGNAL | OFF | OFF | ON | ON | ON |
| BRAKE LOCK CONTROL SIGNAL | OPEN | OPEN | OPEN | OPEN | OPEN |
| BRAKE SIGNAL $BS_A$ | LOW | HIGH | HIGH | LOW | HIGH |
| BRAKE SIGNAL $BS_B$ | LOW | LOW | LOW | LOW | HIGH |
| STATE DETECTION SIGNAL $FB_A$ | HIGH | HIGH | ~~Low~~ HIGH | HIGH | LOW |
| STATE DETECTION SIGNAL $FB_B$ | ~~High~~ LOW | ~~High~~ LOW | LOW | ~~High~~ LOW | HIGH |
| BRAKE STATE | AC~~TUA~~TED RELEASED | AC~~TUA~~TED RELEASED | AC~~TUA~~TED RELEASED | AC~~TUA~~TED RELEASED | RELEASED |

FIG. 31B

WITH PROTECTING OPERATION: DURING SHORT CIRCUIT OF EXTERNAL POWER SOURCE AND BRAKE CABLE (PART 2)

| | BRAKE ACTUATION | FIRST BRAKE RELEASE PREPARATION | POWER SOURCE CONTROL | SECOND BRAKE RELEASE PREPARATION |
|---|---|---|---|---|
| POWER SOURCE CONTROL SIGNAL | OFF | OFF | ~~ON~~ OFF | ~~ON~~ OFF |
| BRAKE LOCK CONTROL SIGNAL | ~~OPEN~~ CLOSE | ~~OPEN~~ CLOSE | ~~OPEN~~ CLOSE | ~~OPEN~~ CLOSE |
| BRAKE SIGNAL $BS_A$ | LOW | HIGH | HIGH | LOW |
| BRAKE SIGNAL $BS_B$ | LOW | LOW | LOW | LOW |
| STATE DETECTION SIGNAL $FB_A$ | HIGH | HIGH | ~~Low~~ HIGH | HIGH |
| STATE DETECTION SIGNAL $FB_B$ | ~~High~~ LOW | ~~High~~ LOW | LOW | ~~High~~ LOW |
| BRAKE STATE | ~~RELEASED~~ ACTUATED | ~~RELEASED~~ ACTUATED | RELEASED ACTUATED | RELEASED ACTUATED |

FIG. 33A

DURING NORMAL STATE

| | BRAKE ACTUATION | POWER SOURCE CONTROL | BRAKE RELEASE |
|---|---|---|---|
| POWER SOURCE CONTROL SIGNAL | OFF | ON | ON |
| BRAKE LOCK CONTROL SIGNAL | OPEN | OPEN | OPEN |
| BRAKE SIGNAL BS | LOW | LOW | HIGH |
| STATE DETECTION SIGNAL FB | HIGH | LOW | HIGH |
| BRAKE STATE | ACTUATED | ACTUATED | RELEASED |

FIG. 33B

WITHOUT PROTECTING OPERATION: DURING SHORT CIRCUIT FAILURE OF OPENING AND CLOSING SWITCH

| | BRAKE ACTUATION | POWER SOURCE CONTROL | BRAKE RELEASE |
|---|---|---|---|
| POWER SOURCE CONTROL SIGNAL | OFF | ON | ON |
| BRAKE LOCK CONTROL SIGNAL | OPEN | OPEN | OPEN |
| BRAKE SIGNAL BS | LOW | LOW | HIGH |
| STATE DETECTION SIGNAL FB | HIGH | ~~LOW~~ HIGH | HIGH |
| BRAKE STATE | ACTUATED | AC~~TUAT~~ED RELEASED | RELEASED |

FIG. 34A

WITH PROTECTING OPERATION: DURING SHORT CIRCUIT FAILURE OF OPENING AND CLOSING SWITCH

| | BRAKE ACTUATION | POWER SOURCE CONTROL | PROTECTING OPERATION |
|---|---|---|---|
| POWER SOURCE CONTROL SIGNAL | OFF | ON | ~~ON~~ OFF |
| BRAKE LOCK CONTROL SIGNAL | OPEN | OPEN | ~~OPEN~~ CLOSE |
| BRAKE SIGNAL BS | LOW | LOW | ~~High~~ LOW |
| STATE DETECTION SIGNAL FB | HIGH | ~~Low~~ HIGH | HIGH |
| BRAKE STATE | ACTUATED | ~~ACTUATED~~ RELEASED | ~~RELEASED~~ ACTUATED |

FIG. 34B

WITH PROTECTING OPERATION: DURING SHORT CIRCUIT FAILURE OF OPENING AND CLOSING SWITCH

| | BRAKE ACTUATION | POWER SOURCE CONTROL | PROTECTING OPERATION |
|---|---|---|---|
| POWER SOURCE CONTROL SIGNAL | OFF | ON | ON |
| BRAKE LOCK CONTROL SIGNAL | OPEN | OPEN | ~~OPEN~~ CLOSE |
| BRAKE SIGNAL BS | LOW | LOW | ~~High~~ LOW |
| STATE DETECTION SIGNAL FB | HIGH | ~~Low~~ HIGH | HIGH |
| BRAKE STATE | ACTUATED | AC~~TUA~~TED RELEASED | RE~~LEA~~SED ACTUATED |

FIG. 34C

WITH PROTECTING OPERATION: DURING SHORT CIRCUIT FAILURE OF OPENING AND CLOSING SWITCH

| | BRAKE ACTUATION | POWER SOURCE CONTROL | PROTECTING OPERATION |
|---|---|---|---|
| POWER SOURCE CONTROL SIGNAL | OFF | ON | ~~ON~~ OFF |
| BRAKE LOCK CONTROL SIGNAL | OPEN | OPEN | OPEN |
| BRAKE SIGNAL BS | LOW | LOW | ~~High~~ LOW |
| STATE DETECTION SIGNAL FB | HIGH | ~~Low~~ HIGH | HIGH |
| BRAKE STATE | ACTUATED | AC~~TUA~~TED RELEASED | RE~~LEA~~SED ACTUATED |

BRAKE CONTROL DEVICE AND MOTOR DRIVE DEVICE

RELATED APPLICATIONS

The present application is a National Phase of International Application No. PCT/JP2022/013671 filed Mar. 23, 2022, which claims priority to Japanese Application No. 2021-061247, filed Mar. 31, 2021.

TECHNICAL FIELD

The present invention relates to a brake control device and a motor drive device.

BACKGROUND ART

A non-excitation actuated type brake device actuates a brake in a non-excitation state in which no voltage is applied to a brake coil, and releases the brake in an excitation state in which the voltage is applied to the brake coil.

For example, as an electromagnetic brake control device that controls a non-excitation actuated type electromagnetic brake, an electromagnetic brake control device is known that includes an output terminal for connecting the electromagnetic brake, and a brake control unit that outputs a brake control signal to be supplied to the electromagnetic brake via the output terminal, the brake control unit outputting a brake control signal to release the electromagnetic brake when a normal brake command and a safe brake command are both ON, and outputting a brake control signal to actuate the electromagnetic brake when at least one of the normal brake command and the safe brake command is OFF (see, e.g., PTL 1).

For example, a brake drive control circuit is known that controls an electromagnetic brake that releases the brake through energization, and includes a first rectification element provided between a first power source having a first circuit voltage and one terminal of the electromagnetic brake, a block switch inserted into a line that supplies power to the first power source for operating the first power source, a first switching element provided between the other terminal of the electromagnetic brake and a ground point, and a second switching element and a second rectification element provided in series between a second power source having a second circuit voltage different from the first circuit voltage and the one terminal of the electromagnetic brake (see, e.g., PTL 2).

For example, a non-excitation actuated type electromagnetic brake control device is known that actuates an electromagnetic brake having an excitation coil in a non-excitation state, and includes a first brake control circuit including a first computing unit that performs arithmetic processing in accordance with a brake command and a first switch that is turned through a brake signal generated based on an output signal of the first computing unit, and a second brake control circuit including a second computing unit that performs arithmetic processing in accordance with a brake command and a second switch that is turned on through a brake signal generated based on an output signal of the second computing unit, the first switch and the second switch being connected in series between a brake power source and the electromagnetic brake (see, e.g., PTL 3).

For example, PTL 4 discloses that the electromagnetic coil is not driven when the brake releasing brake power is not being supplied from the brake control unit to the electromagnetic brake. In this case, the armatures are pressed against the brake hub (the brake shoe) through a biasing force of the torque springs. As a result, the rotation shaft of the motor remains in a braked state (constrained state) without rotating. At this time, a gap (opening) is formed between the armatures and the field core, and the first detector and the second detector are set to an OFF state (constraint position), and PTL 4 discloses that the electromagnetic coil is driven when the brake releasing brake power is being supplied to the electromagnetic brake. In this case, the armature moves toward the electromagnetic coil against an elastic force of the torque spring. As a result, the armature and the brake hub (the brake shoe) move in a direction as to move away from each other, causing the break to be in a released state. This makes it possible to rotationally drive the rotation shaft of the motor. At this time, no gap (opening) is formed between the armatures and the field core, and the first detector and the second detector are set to be in an ON state (release position).

CITATION LIST

Patent Literature

[PTL 1] JP 2020-089137 A
[PTL 2] JP 2019-105286 A
[PTL 3] WO 2014/045728
[PTL 4] JP 2012-237397 A

SUMMARY OF INVENTION

Technical Problem

In the non-excitation actuated type brake device, an opening and closing switch is provided in a circuit including the brake coil and the power source, and the presence or absence of the excitation to the brake coil is controlled by opening and closing the opening and closing switch. In the event of an abnormality such as a short circuit failure of the opening and closing switch, a failure of a control unit that controls the opening and closing switch, or a short circuit of the circuit including the brake coil and the power source and a circuit other than the brake device, the brake may possibly be released when the brake is normally actuated. For example, in a brake device provided in a motor that drives an arm of a robot, an extremely dangerous state occurs, such as not being able to maintain an orientation of the robot or the arm falling down, if the brake is released due to some type of abnormality regardless of when the brake is normally actuated. As such, it is desirable to develop a safe non-excitation actuated type brake device and motor drive device that make it possible to avoid a brake thereof from being released when an abnormality occurs.

Solution to Problem

In one aspect of the present disclosure, a brake control device controls a brake device that is a non-excitation actuated type and is configured to actuate a brake in a non-excitation state in which no voltage is applied and release the brake in an excitation state in which the voltage is applied, the brake control device including a power source configured to be controlled to output a voltage or not to output the voltage in response to a received power source control signal, a brake control unit configured to output a brake control signal, an opening and closing unit connected in series to the brake device and configured to open and close an electrical path between the power source and the brake device in response to the brake control signal that has been received, a state detecting unit configured to output a state detection signal indicating a potential state of an electrical path between the opening and closing unit and the brake device, an abnormality detecting unit configured to detect, based on a combination of a content of the brake control signal and a content of the state detection signal, whether or not an abnormality occurs, and a power source control unit configured to output, as the power source control signal for the power source, an output OFF signal for controlling the power source so as not to output the voltage when the occurrence of an abnormality is detected by the abnormality detecting unit.

A motor drive device of the present disclosure includes a non-excitation actuated type brake device that actuates a brake on a motor in a non-excitation state in which no voltage is applies and releases the brake on the motor in an excitation state in which the voltage is applied, and the above-described brake control device, the brake control device being controlling the brake device.

Advantageous Effect of Invention

According to the aspects of the present disclosure, it is possible to realize a safe non-excitation actuated type brake device and motor drive device that make it possible to avoid a brake thereof from being released when an abnormality occurs.

BRIEF DESCRIPTION OF DRAWINGS

FIG. 3A is a diagram for describing each signal and brake state in a normal state in the brake control device according to the first embodiment of the present disclosure, and a table illustrating each signal and brake state.

FIG. 4A is a diagram for describing each signal and brake state when only a positive-side opening and closing switch experiences a short circuit failure in the brake control device 1 according to the first embodiment of the present disclosure, and a table illustrating each signal and brake state.

FIG. 5A is a diagram for describing each signal and brake state when only a negative-side opening and closing switch experiences a short circuit failure in the brake control device in a case where a constant voltage is output without output control of the power source, and a table illustrating each signal and brake state.

FIG. 6A is a diagram for describing each signal and brake state when only the negative-side opening and closing switch experiences a short circuit failure in the brake control device including the output controllable power source according to the first embodiment of the present disclosure, and a table illustrating each signal and brake state.

FIG. 7A is a diagram for describing each signal and brake state when only the negative-side opening and closing switch experiences a short circuit failure in the brake control device including a returning sequence of a brake actuation process according to the first embodiment of the present disclosure, and a table illustrating each signal and brake state.

FIG. 8A is a diagram for describing each signal and brake state when both the positive-side opening and closing switch and the negative-side opening and closing switch experience a short circuit failure in the brake control device in the case where a constant voltage is output without the output control of the power source, and a table illustrating each signal and brake state.

FIG. 9A is a diagram for describing each signal and brake state when both the positive-side opening and closing switch and the negative-side opening and closing switch experience a short circuit failure in the brake control device including the output controllable power source according to the first embodiment of the present disclosure, and a table illustrating each signal and brake state.

FIG. 18A is a diagram for describing each signal and brake state in a normal state in the brake control device 1 according to the third embodiment of the present disclosure, and a table illustrating each signal and brake state.

FIG. 19A is a diagram for describing each signal and brake state when an opening and closing switch experiences a short circuit failure in the brake control device in the case where a constant voltage is output without the output control of the power source, and a table illustrating each signal and brake state.

FIG. 20A is a diagram for describing each signal and brake state when the opening and closing switch experiences a short circuit failure in the brake control device including an output controllable power source according to the third embodiment of the present disclosure, and a table illustrating each signal and brake state.

FIG. 21A is a diagram illustrating an example of each signal and brake state in the brake control device having a power source inspection function according to the fourth embodiment of the present disclosure, and an example of each signal and brake state in a normal state of the power source.

FIG. 21B is a diagram illustrating an example of each signal and brake state in the brake control device having the power source inspection function according to the fourth embodiment of the present disclosure, and an example of each signal and brake state in an abnormal state of the power source.

FIG. 24A is a diagram illustrating an example of each signal and brake state in the brake control device according to the fifth embodiment of the present disclosure, and an example of each signal and brake state in a normal state.

FIG. 24B is a diagram illustrating an example of each signal and brake state in the brake control device according to the fifth embodiment of the present disclosure, and an example of each signal and brake state in an abnormal state of the power source.

FIG. 25A is a diagram illustrating an example of each signal and brake state in the brake control device according to the fifth embodiment of the present disclosure, and an example of each signal and brake state the negative-side opening and closing switch experiences a short circuit failure.

FIG. 25B is a diagram illustrating an example of each signal and brake state in the brake control device according to the fifth embodiment of the present disclosure, and an example of each signal and brake state when the positive-side opening and closing switch experiences a short circuit failure.

FIG. 26A is a diagram illustrating an example of each signal and brake state in the brake control device according to the fifth embodiment of the present disclosure, and an example of each signal and brake state in a case where a first protecting operation process is performed when the positive-side opening and closing switch and the negative-side opening and closing switch experience a short circuit failure.

FIG. 26B is a diagram illustrating an example of each signal and brake state in the brake control device according to the fifth embodiment of the present disclosure, and an example of each signal and brake state in a case where a second protecting operation process is performed when the positive-side opening and closing switch and the negative-side opening and closing switch experience a short circuit failure.

FIG. 27 is a diagram illustrating an example of each signal and brake state in the brake control device according to the fifth embodiment of the present disclosure, and an example of each signal and brake state in a case where a third protecting operation process is performed when the positive-side opening and closing switch and the negative-side opening and closing switch experience a short circuit failure.

FIG. 29A is a diagram illustrating an example of each signal and brake state in a case where the device including the external power source is short-circuited to the brake cable of the brake device as illustrated in FIG. 28 in the brake control device and the motor drive device including the same according to the fifth embodiment of the present disclosure, and an example of each signal and brake state in a case where a protecting operation process is not performed.

FIG. 29B is a diagram illustrating an example of each signal and brake state in a case where the device including the external power source is short-circuited to the brake cable of the brake device as illustrated in FIG. 28 in the brake control device and the motor drive device including the same according to the fifth embodiment of the present disclosure, and an example of each signal and brake state in a case where the protecting operation process is performed.

FIG. 31A is a diagram illustrating an example of each signal and brake state in a case where the device including the external power source is short-circuited to the brake cable of the brake device as illustrated in FIG. 30 in the brake control device and the motor drive device including the same according to the fifth embodiment of the present disclosure, and an example of each signal and brake state in a case where the protecting operation process is not performed.

FIG. 31B is a diagram illustrating an example of each signal and brake state in a case where the device including the external power source is short-circuited to the brake cable of the brake device as illustrated in FIG. 30 in the brake control device and the motor drive device including the same according to the fifth embodiment of the present disclosure, and an example of each signal and brake state in a case where the protecting operation process is performed.

FIG. 33A is a diagram illustrating an example of each signal and brake state in the brake control device according to the fifth embodiment of the present disclosure, and an example of each signal and brake state in a normal state.

FIG. 33B is a diagram illustrating an example of each signal and brake state in the brake control device according to the fifth embodiment of the present disclosure, and an example of each signal and brake state when the opening and closing switch experiences a short circuit failure.

FIG. 34A is a diagram illustrating an example of each signal and brake state in the brake control device according to the fifth embodiment of the present disclosure, and an example of each signal and brake state in a case where the first protecting operation process is performed when the opening and closing switch experiences a short circuit failure.

FIG. 34B is a diagram illustrating an example of each signal and brake state in the brake control device according to the fifth embodiment of the present disclosure, and an example of each signal and brake state in a case where the second protecting operation process is performed when the opening and closing switch experiences a short circuit failure.

FIG. 34C is a diagram illustrating an example of each signal and brake state in the brake control device according to the fifth embodiment of the present disclosure, and an example of each signal and brake state in a case where the third protecting operation process is performed when the opening and closing switch experiences a short circuit failure.

DESCRIPTION OF EMBODIMENTS

Figure 1:
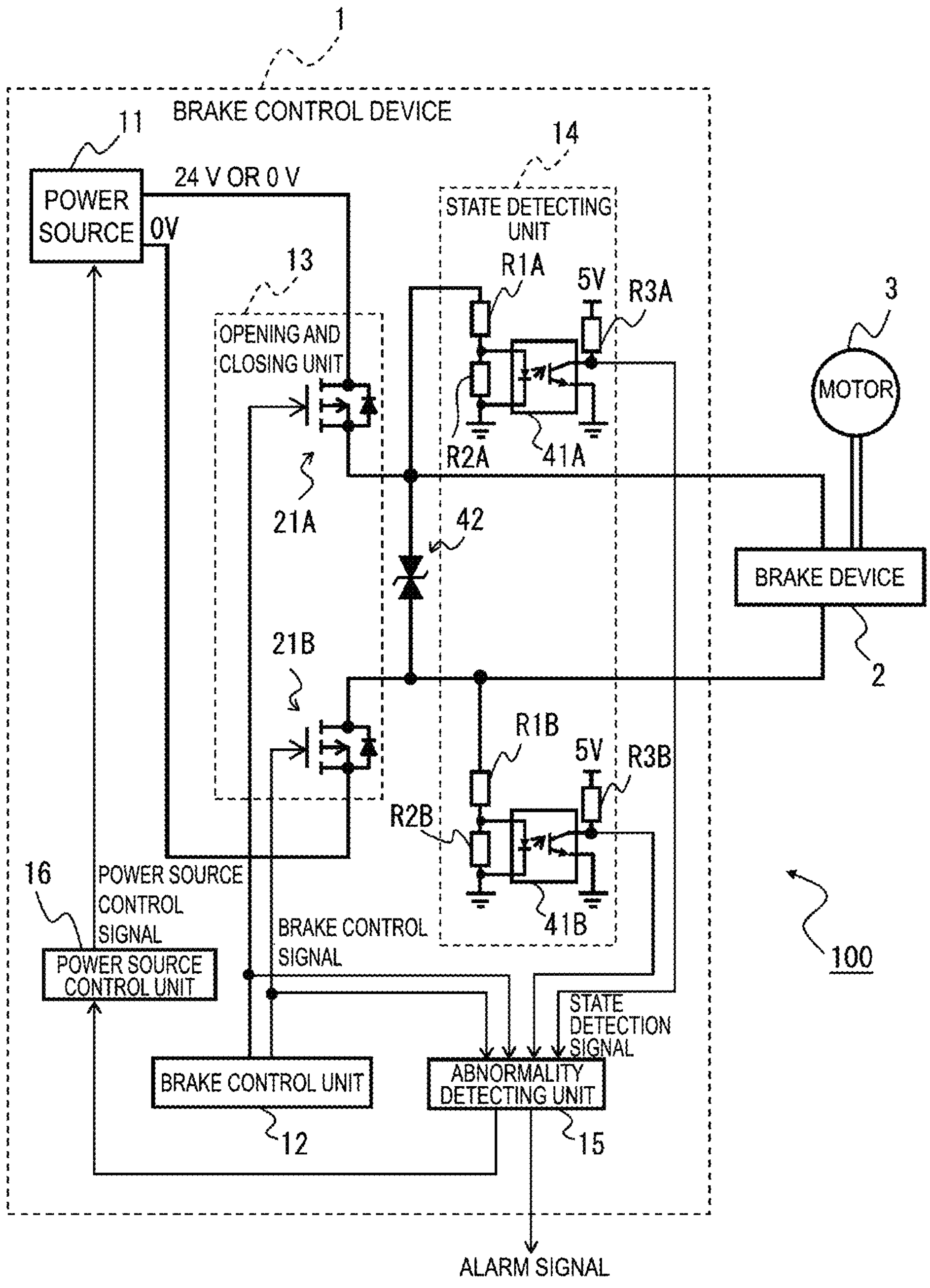
FIG. 1 is a diagram illustrating a brake control device and a motor drive device including the same according to first and second embodiments of the present disclosure.

A brake control device and a motor drive device are described below with reference to the accompanying drawings. The same member is denoted with the same reference symbol in each of the drawings. These drawings are scaled as necessary for convenience of description. The embodiments illustrated in the drawings are each an example for implementation and the illustrated embodiments are not limited thereto.

FIG. 1 is a diagram illustrating a brake control device and a motor drive device including the same according to first and second embodiments of the present disclosure.

The first embodiment of the present disclosure will be described first, but FIG. 1 is also applicable to the second embodiment described below.

A motor drive device 100 includes a non-excitation actuated type brake device 2 that actuates a brake on a motor 3 in a non-excitation state in which no voltage is applied and releases the brake on the motor 3 in an excitation state in which the voltage is applied, and a brake control device 1 that controls the brake device 2. In FIG. 1, illustration is omitted of a power source part that supplies drive power to the motor 3 and a motor control unit that controls the motor 3. The motor 3 may be an AC motor or a DC motor. Examples of machines in which the motor 3 is provided include machine tools, robots, forging machines, injection molding machines, industrial machines, various electrical appliances, trains, automobiles, and aircrafts.

Figure 2A:
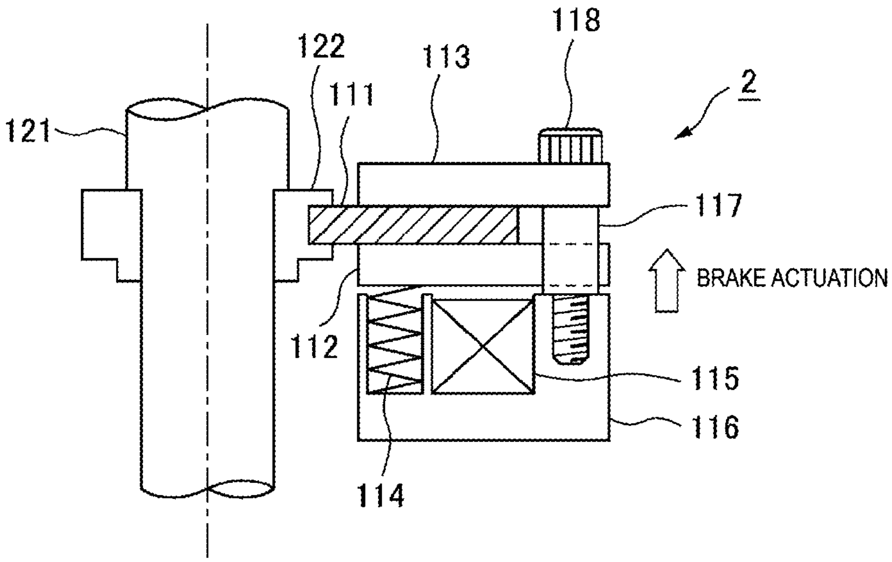
FIG. 2A is a cross-sectional view illustrating a structure of a non-excitation actuated type brake device, and illustrates a state where a brake is actuated on a motor.
Figure 2B:
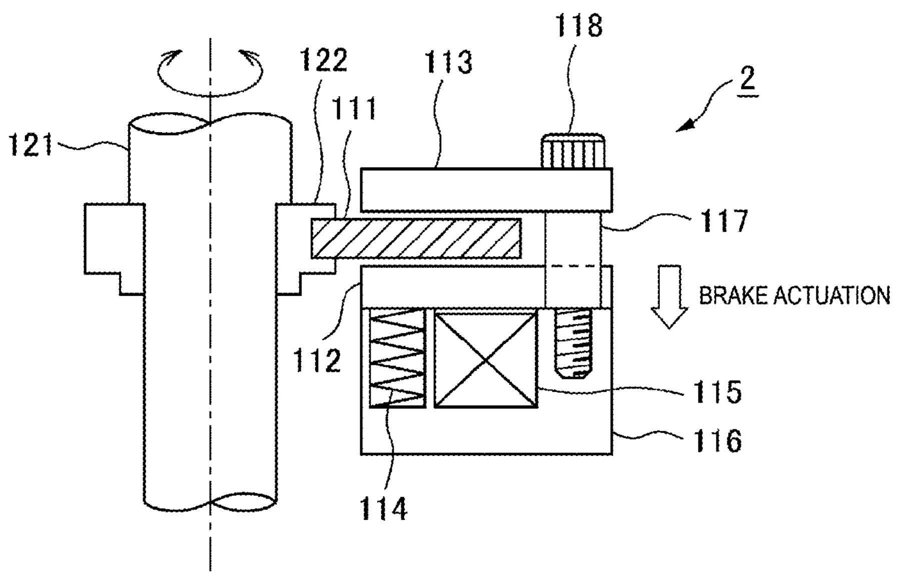
FIG. 2B is a cross-sectional view illustrating the structure of the non-excitation actuated type brake device, and illustrates a state where the brake actuated on the motor is released.

Before describing the brake control device 1 according to the first embodiment of the present disclosure, a structure of the non-excitation actuated type brake device 2 is described with reference to FIGS. 2A and 2B. FIG. 2A is a cross-sectional view illustrating the structure of the non-excitation actuated type brake device, and illustrates a state where the brake is actuated on the motor. FIG. 2B is a cross-sectional view illustrating the structure of the non-excitation actuated type brake device, and illustrates a state where the brake actuated on the motor is released. The brake device illustrated in FIGS. 2A and 2B is also applicable to first to sixth embodiments.

As illustrated in FIGS. 2A and 2B, in the non-excitation actuated type brake device 2, a friction plate 111 is disposed between an armature 112 and an end plate 113. Since a hub 122 is spline-coupled to the friction plate 111, and the hub 122 and a shaft 121 of the motor 3 are integrated with each other through shrink-fitting, the friction plate 111 rotates in conjunction with a rotation of the shaft 121 of the motor 3. The end plate 113 and a spacer 117 are coupled by a bolt 118, and the armature 112 is coupled to the spacer 117 so as to be movable in a direction toward or away from the friction plate 111. A spring 114 and a brake coil 115 are provided in a core 116. As illustrated in FIG. 2A, in a non-excitation state where no voltage is being applied to the brake coil 115, the armature 112 is strongly pressed against the friction plate 111 through an elastic force of the spring 114 and the friction plate 111 cannot rotate due to being sandwiched by the armature 112 and the end plate 113. As a result, the shaft 121 of the motor 3 coupled to the friction plate 111 can also no longer rotate, causing a where the brake is actuated on the motor 3. On the other hand, as illustrated in FIG. 2B, in an excitation state where the voltage is applied to the brake coil 115, an electromagnetic force overcoming the elastic force of the spring 114 that has pressed the armature 112 against the friction plate 111 is generated in the core 116, causing the armature 112 to be is attracted by the core 116, thus releasing the friction plate 111 from contact with the armature 112 and the end plate 113. As a result, the friction plate 111 and thus the shaft 121 of the motor 3 can freely rotate, and the brake on the motor 3 is released.

The brake device 2 is controlled by the brake control device 1. The brake control device 1 according to the first embodiment of the present disclosure includes a power source 11, a brake control unit 12, an opening and closing unit 13, a state detecting unit 14, an abnormality detecting unit 15, and a power source control unit 16.

The power source 11 is a power source of which a DC output voltage is controllable (i.e., a power source with a variable output), and is controlled to output the voltage or not output the voltage in response to a power source control signal CTRP received from the power source control unit 16. The power source 11 includes, for example, a chopper circuit and a switching element. As an example, the power source 11 outputs, for example, a DC voltage of 24 V when having received an output ON signal as the power source control signal CTRP. It should be noted that while the value of the DC voltage at the time of the output ON is 24 V in the example illustrated in FIG. 1, other voltage values (such as 15 V, 12 V, and 5 V) may also be used. For example, the power source 11 does not output the DC voltage, i.e., the DC output voltage of the power source 11 is 0 V when having received an output OFF signal as the power source control signal CTRP. As an alternative example, the power source 11 may output a voltage lower than the voltage that excites the brake coil 115 when having received the output OFF signal as the power source control signal CTRP.

The opening and closing unit 13 is connected in series to the brake coil 115 of the brake device 2, and opens and closes an electrical path between the power source 11 and the brake device 2 in response to a received brake control signal. In the first embodiment, the opening and closing unit 13 includes at least one positive-side opening and closing switch that opens and closes an electrical path between a positive electrode terminal of the power source 11 and a positive electrode terminal of a brake device 2, and at least one negative-side opening and closing switch that opens and closes an electrical path between a negative electrode terminal of the power source 11 and a negative electrode terminal of the brake device 2. In the example illustrated in FIG. 1, the opening and closing unit 13 includes one positive-side opening and closing switch 21A and one negative-side opening and closing switch 21B as an example. While one positive-side opening and closing switch and one negative-side opening and closing switch are provided in the example illustrated in FIG. 1, two or more positive-side opening and closing switches and two or more negative-side opening and closing switches may be provided as a modified example. For example, the positive-side opening and closing switch may include two opening and closing switches connected in series, and in this case, the two opening and closing switches are controlled to open and close through the same brake control signal $BS_A$. For example, the negative-side opening and closing switch may include three opening and closing switches connected in series, and in this case, the three opening and closing switches are controlled to open and close through the same brake control signal $BS_B$.

The positive-side opening and closing switch 21A and the negative-side opening and closing switch 21B are normally open switches as an example. Examples of the semiconductor switching element making up the positive-side opening and closing switch 21A and the negative-side opening and closing switch 21B are FETs, IGBTs, thyristors, GTOs (Gate Turn-OFF thyristor), and transistors, but other semiconductor switching elements may also be used. The FET includes a gate, a drain, and a source as terminals thereof. The thyristor and GTO include a gate, an anode, and a cathode as terminals thereof. The transistor includes a base, an emitter, and a collector as terminals thereof. In the following, a case is described where the positive-side opening and closing switch 21A and the negative-side opening and closing switch 21B include FETs. It should be noted that in a case where the positive-side opening and closing switch 21A and the negative-side opening and closing switch 21B include a thyristor and a GTO, each embodiment of the present disclosure is applied by reading “gate” as “base”, “drain” as “anode”, and “source” as “cathode”. In a case where the positive-side opening and closing switch 21A and the negative-side opening and closing switch 21B include transistors, each embodiment of the present disclosure is applied by reading “gate” as “base”, “drain” as “collector”, and “source” as “emitter”.

To eliminate instantaneous high voltage such as noise and an opening or closing surge of the opening and closing unit 13, a surge absorber 42 is connected in parallel to the brake device 2 between input terminals of the brake device 2 (i.e., between the positive electrode terminal and the negative electrode terminal of the brake device 2).

The brake control unit 12 outputs the brake control signals $BS_A$ and $BS_B$ for opening and closing the positive-side opening and closing switch 21A and the negative-side opening and closing switch 21B in the opening and closing unit 13. The brake control signals $BS_A$ and $BS_B$ output from the brake control unit 12 are sent to the positive-side opening and closing switch 21A and the negative-side opening and closing switch 21B in the opening and closing unit 13, and the abnormality detecting unit 15. Contents of a control process executed in the brake control device 1 according to the first embodiment of the present disclosure are divided into three processes, i.e., a brake actuation process, a brake release preparation process, and a brake release process, and the brake control signals $BS_A$ and $BS_B$ corresponding to each process are sent to the positive-side opening and closing switch 21A and the negative-side opening and closing switch 21B. The brake actuation process, the brake release preparation process, and the brake release process in the brake control device 1 will be described in detail below.

During the execution of the brake actuation process, the brake release preparation process, and the brake release process, the state detecting unit 14 detects a potential state of an electrical path between the opening and closing unit 13 and the brake device 2, and outputs a state detection signal indicating this potential state. In the example illustrated in FIG. 1, the state detecting unit 14 outputs a state detection signal $FB_A$ indicating an potential state of an electrical path between a source of the positive-side opening and closing switch 21A in the opening and closing unit 13 and the positive electrode terminal of the brake device 2, and a state detection signal $FB_B$ indicating a potential state of an electrical path between a drain of the negative-side opening and closing switch 21B in the opening and closing unit 13 and the negative electrode terminal of the brake device 2. The state detection signal indicating the potential state of the electrical path between the opening and closing unit 13 and the brake device 2 detected by the state detecting unit 14 is sent to the abnormality detecting unit 15. In order to generate the state detection signal $FB_A$ indicating the potential state of the electrical path between the source of the positive-side opening and closing switch 21A in the opening and closing unit 13 and the positive electrode terminal of the brake device 2, the state detecting unit 14 includes, for example, a photocoupler 41A, voltage divider resistors R1A and R2A, and a pull-up resistor R3A. One end of the voltage divider resistor R1A is connected to the electrical path connecting the source of the positive-side opening and closing switch 21A and the positive electrode terminal of the brake device 2, and the other end of the voltage divider resistor R1A is connected to one end of the voltage divider resistor R2A. The other end of the voltage divider resistor R2A is grounded. A light-emitting element in the photocoupler 41A is connected in parallel to the voltage divider resistor R2A. One end of a light-receiving element in the photocoupler 41A is connected to the pull-up resistor R3A, and the other end of the light-receiving element in the photocoupler 41A is grounded. In order to generate the state detection signal $FB_B$ indicating the potential state of the electrical path between the drain of the negative-side opening and closing switch 21B in the opening and closing unit 13 and the negative electrode terminal of the brake device 2, the state detecting unit 14 includes, for example, a photocoupler 41B, voltage divider resistors R1B and R2B, and a pull-up resistor R3B. One end of the voltage divider resistor R1B is connected to the electrical path connecting the negative electrode terminal of the brake device 2 and the drain of the negative-side opening and closing switch 21B, and the other end of the voltage divider resistor R1B is connected to one end of the voltage divider resistor R2B. The other end of the voltage divider resistor R2B is grounded. A light-emitting element in the photocoupler 41B is connected in parallel to the voltage divider resistor R2B. One end of a light-receiving element in the photocoupler 41B is connected to the pull-up resistor R3B, and the other end of the light-receiving element in the photocoupler 41B is grounded. It should be noted that the state detecting unit 14 includes photocouplers and various resistors in the example illustrated in FIG. 1, but as an alternative example, the state detecting unit 14 may include a power source that outputs a reference voltage for isolating a High state and a Low state (the reference voltage may be generated using a method such as resistor division instead of using the power source), and a comparator that compares the reference voltage and voltage applied to the voltage divider resistor R2A or R2B and outputs a High signal or a Low signal based on a result of the comparison.

The abnormality detecting unit 15 detects, based on a combination of a content of the brake control signal and a content of the state detection signal, whether or not an abnormality occurs. During the execution of the brake actuation process and during the execution of the brake release preparation process, the abnormality detecting unit 15 detects, based on the combination of the content of the brake control signal and the content of the state detection signal, whether or not an abnormality occurs. A detection result of the abnormality detecting unit 15 is sent to the power source control unit 16. An abnormality detection process of the abnormality detecting unit 15 will be described in detail below.

An abnormality detected by the abnormality detecting unit 15 includes a short circuit failure of the positive-side opening and closing switch 21A, a short circuit failure of the negative-side opening and closing switch 21B, a short circuit of a cable making up the electrical path from the source of the positive-side opening and closing switch 21A to the positive electrode terminal of the brake device 2 and an external circuit, a short circuit of a cable making up the electrical path from the negative electrode terminal of the brake device 2 to the drain of the negative-side opening and closing switch 21B and an external circuit, and a failure of the state detecting unit 14. For example, in a case where the positive-side opening and closing switch 21A does not respond to a received open command due to a failure of a drive circuit of the positive-side opening and closing switch 21A, causing the positive-side opening and closing switch 21A to remain in a closed state, the failure can be regarded as "the short circuit failure of the positive-side opening and closing switch 21A". Likewise, in a case where the negative-side opening and closing switch 21B does not respond to a received open command due to a failure of a drive circuit of the negative-side opening and closing switch 21B, causing the negative-side opening and closing switch 21B to remain in a closed state, the failure can be regarded as "the short circuit failure of the negative-side opening and closing switch 21B".

The abnormality detecting unit 15 has a function of outputting an alarm signal when the occurrence of an abnormality is detected. The alarm signal output from the abnormality detecting unit 15 is sent to, for example, a display part (not illustrated), the display part, for example, notifies an operator of an "abnormality occurrence". Examples of the display part include a single display device, a display device attached to the motor drive device 100, a display device attached to a host controller (not illustrated), and a display device attached to a personal computer and a mobile terminal. For example, the alarm signal output from the abnormality detecting unit 15 is sent to, for example, a light-emitting device (not illustrated) such as an LED or a lamp, the light-emitting device notifying the operator of an "abnormality occurrence" by emitting light when receiving the alarm signal. For example, the alarm signal output from the abnormality detecting unit 15 is sent to, for example, an acoustic device (not illustrated), the acoustic device notifying the operator of an "abnormality occurrence" by emitting a sound such as a voice, a speaker, a buzzer, or a chime when receiving the alarm signal. As a result, the operator can reliably and easily recognize the occurrence of an abnormality. The operator can also, for example, easily take measures such as replacing components related to the abnormality or removing the cause of the abnormality. The alarm signal output from the abnormality detecting unit 15 may be used for an emergency stop process of the motor drive device 100.

During the execution of the brake actuation process, the brake release preparation process and the brake release process, the power source control unit 16 outputs the output ON signal for controlling the power source 11 so as to output the voltage as long as the occurrence of an abnormality is not detected by the abnormality detecting unit 15, and outputs the output OFF signal for controlling the power source 11 so as not to output the voltage when the occurrence of an abnormality is detected by the abnormality detecting unit 15. As an alternative example, during the execution of the brake actuation process and the brake release preparation process, the power source control unit 16 may output the output OFF signal regardless of whether or not the abnormality detecting unit 15 detects an abnormality.

An arithmetic processing device (processor) is provided in the brake control device 1. The arithmetic processing device includes the brake control unit 12, the abnormality detecting unit 15, and the power source control unit 16. Each unit included in the arithmetic processing device is, for example, a function module achieved through a computer program executed by the processor. For example, in a case where the brake control unit 12, the abnormality detecting unit 15 and the power source control unit 16 are assembled in the form of a computer program, the function of each unit can be achieved by operating the arithmetic processing device in accordance with the computer program. The computer program for executing each process of the brake control unit 12, the abnormality detecting unit 15 and the power source control unit 16 may be provided in the form of being recorded on a computer-readable recording medium such as a semiconductor memory, a magnetic recording medium, or an optical recording medium. Alternatively, the brake control unit 12, the abnormality detecting unit 15 and/or the power source control unit 16 may be achieved as a semiconductor integrated circuit in which the computer program for achieving the function of each unit is written.

Subsequently, a brake control process and a state detection process in the brake control device 1 according to the first embodiment of the present disclosure are described.

Figure 3B:
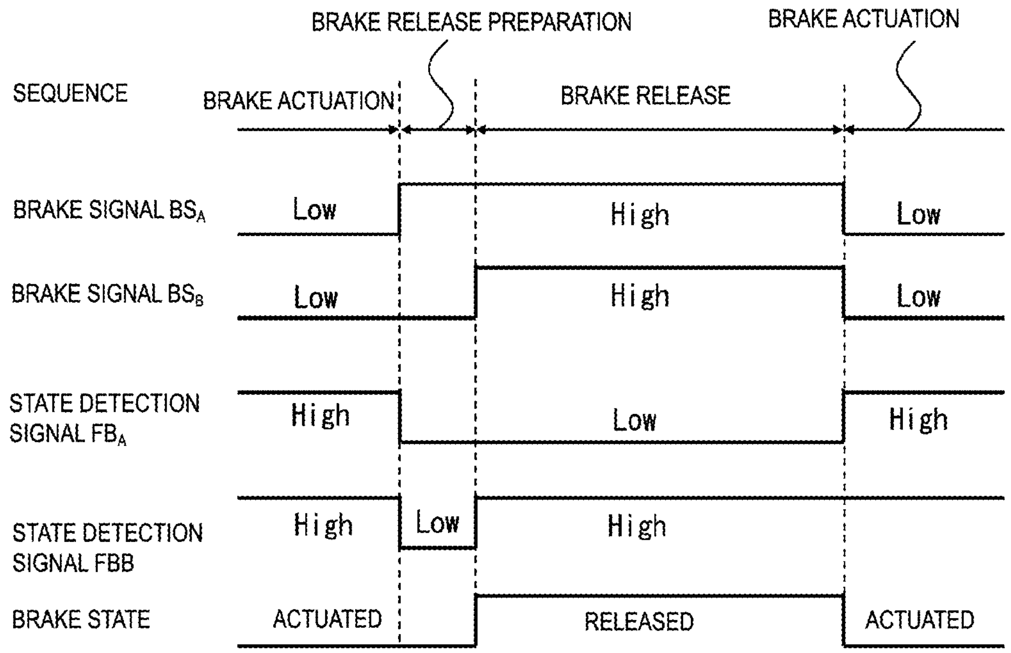
FIG. 3B is a diagram for describing each signal and brake state in a normal state in the brake control device according to the first embodiment of the present disclosure, and a timing chart illustrating each signal and brake state.

FIG. 3A is a diagram for describing each signal and brake state in a normal state in the brake control device according to the first embodiment of the present disclosure, and a table illustrating each signal and brake state. FIG. 3B is a diagram for describing each signal and brake state in a normal state in the brake control device according to the first embodiment of the present disclosure, and a timing chart illustrating each signal and brake state. It should be noted that the "brake control signal" is denoted as "brake signal" in FIGS. 3A and 3B for the sake of simplifying the drawings.

The contents of the control process executed in the brake control device 1 in the first embodiment of the present disclosure are divided into three processes, i.e., the brake actuation process, the brake release preparation process, and the brake release process. A state where the brake of the brake device 2 on the motor 3 is actuated is achieved by executing the brake actuation process. A state where the brake of the brake device 2 on the motor 3 is released is achieved by executing the brake release process. When releasing the brake being actuated on the motor 3, the brake actuation process is terminated to execute the brake release preparation process, and subsequently the brake release preparation process is terminated to execute the brake release process. When actuating the brake on the motor 3 from the state where the brake on the motor 3 is released, the brake release process is terminated to execute the brake actuation process.

The brake actuation process, the brake release preparation process, and the brake release process executed in the brake control device 1 in the first embodiment is described in more detail as follows. In the following description, the positive-side opening and closing switch 21A and the negative-side opening and closing switch 21B are normally open switches as an example.

In the brake actuation process, the brake control unit 12 outputs the brake control signals $BS_A$ and $BS_B$ for controlling the positive-side opening and closing switch 21A and the negative-side opening and closing switch 21B to open. Since the positive-side opening and closing switch 21A and the negative-side opening and closing switch 21B are normally open switches, the brake control unit 12 outputs a Low signal as the brake control signal $BS_A$ for the positive-side opening and closing switch 21A and a Low signal as the brake control signal $BS_B$ for the negative-side opening and closing switch 21B. Since the abnormality detecting unit 15 does not detect the occurrence of an abnormality when no abnormality occurs in the positive-side opening and closing switch 21A, the negative-side opening and closing switch 21B, and devices related to these switches, the power source control unit 16 outputs the output ON signal to the power source 11, and thus, the DC voltage (in the example illustrated in FIG. 1, the DC voltage of 24 V) is output from the power source 11. Since the positive-side opening and closing switch 21A and the negative-side opening and closing switch 21B are opened through the brake actuation process, an electrical path from the positive electrode terminal of the power source 11 to the negative electrode terminal of the power source 11 via the brake device 2 is blocked. Accordingly, when no abnormality occurs in the positive-side opening and closing switch 21A, the negative-side opening and closing switch 21B and the devices related to these switches, the voltage of the power source 11 is not applied to the brake coil 115 of the brake device 2 due to the brake control unit 12 executing the brake actuation process. Thus, as illustrated in FIG. 2A, the armature 112 is strongly pressed against the friction plate 111 through the elastic force of the spring 114, the friction plate 111 is sandwiched by the armature 112 and the end plate 113, and cannot rotate, consequently, the shaft 121 of the motor 3 coupled to the friction plate 111 can also no longer rotate, giving rise to the state where the brake is actuated on the motor 3. Since no current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both High.

The brake release preparation process is executed between the brake actuation process and the brake release process when transitioning from the brake actuation process to the brake release process. In the brake release preparation process, the brake control unit 12 outputs the brake control signals $BS_A$ and $BS_B$ for controlling the positive-side opening and closing switch 21A to close and the negative-side opening and closing switch 21B to open. Since the positive-side opening and closing switch 21A and the negative-side opening and closing switch 21B are normally open switches, the brake control unit 12 outputs a High signal as the brake control signal $BS_A$ for the positive-side opening and closing switch 21A and a Low signal as the brake control signal $BS_B$ for the negative-side opening and closing switch 21B. Since the abnormality detecting unit 15 does not detect the occurrence of an abnormality when no abnormality occurs in the positive-side opening and closing switch 21A, the negative-side opening and closing switch 21B, and devices related to these switches, the power source control unit 16 outputs the output ON signal to the power source 11, and thus, the DC voltage (in the example illustrated in FIG. 1, the DC voltage of 24 V) is output from the power source 11. Since the positive-side opening and closing switch 21A is closed, but the negative-side opening and closing switch 21B is opened, the electrical path from the positive electrode terminal of the power source 11 to the negative electrode terminal of the power source 11 via the brake device 2 is blocked. Accordingly, when no abnormality occurs in the positive-side opening and closing switch 21A, the negative-side opening and closing switch 21B and the devices related to these switches, the voltage of the power source 11 is not applied to the brake coil 115 of the brake device 2 due to the brake control unit 12 executing the brake release preparation process. Thus, as illustrated in FIG. 2A, the armature 112 is strongly pressed against the friction plate 111 through the elastic force of the spring 114, the friction plate 111 is sandwiched by the armature 112 and the end plate 113, and cannot rotate, consequently, the shaft 121 of the motor 3 coupled to the friction plate 111 can also no longer rotate, giving rise to the state where the brake is actuated on the motor 3. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

In the brake release process, the brake control unit 12 outputs the brake control signals $BS_A$ and $BS_B$ for controlling the positive-side opening and closing switch 21A and the negative-side opening and closing switch 21B to close. Since the positive-side opening and closing switch 21A and the negative-side opening and closing switch 21B are normally open switches, the brake control unit 12 outputs a High signal as the brake control signal $BS_A$ for the positive-side opening and closing switch 21A and a High signal as the brake control signal $BS_B$ for the negative-side opening and closing switch 21B. Since the abnormality detecting unit 15 does not detect the occurrence of an abnormality when no abnormality occurs in the positive-side opening and closing switch 21A, the negative-side opening and closing switch 21B and devices related to these switches, the power source control unit 16 outputs the output ON signal to the power source 11, and thus, the DC voltage (in the example illustrated in FIG. 1, the DC voltage of 24 V) is output from the power source 11. Since the positive-side opening and closing switch 21A and the negative-side opening and closing switch 21B are closed through the brake release process, the electrical path from the positive electrode terminal of the power source 11 to the negative electrode terminal of the power source 11 via the brake device 2 is formed. Accordingly, when no abnormality occurs in the positive-side opening and closing switch 21A, the negative-side opening and closing switch 21B and the devices related to these switches, the voltage of the power source 11 is applied to the brake coil 115 of the brake device 2 due to the brake control unit 12 executing the brake release process. Thus, as illustrated in FIG. 2B, the electromagnetic force overcoming the elastic force of the spring 114 that has pressed the armature 112 against the friction plate 111 is generated in the core 116, causing the armature 112 to be attracted by the core 116, thus releasing the friction plate 111 from the contact with the armature 112 and the end plate 113. As a result, the friction plate 111 and thus the shaft 121 of the motor 3 can freely rotate, and the brake on the motor 3 is released. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

The contents of the state detection signals $FB_A$ and $FB_B$ in the brake actuation process, the brake release preparation process, and the brake release process in the above-described case where there is no abnormality in the positive-side opening and closing switch 21A, the negative-side opening and closing switch 21B and the devices related to these switches, i.e., in the normal state, are stored in advance in the abnormality detecting unit 15 so as to be available for the abnormality detection process described below.

Subsequently, the abnormality detection process in the brake control device 1 according to the first embodiment of the present disclosure is described. In the following description, the positive-side opening and closing switch 21A and the negative-side opening and closing switch 21B are normally open switches as an example.

Figure 4B:
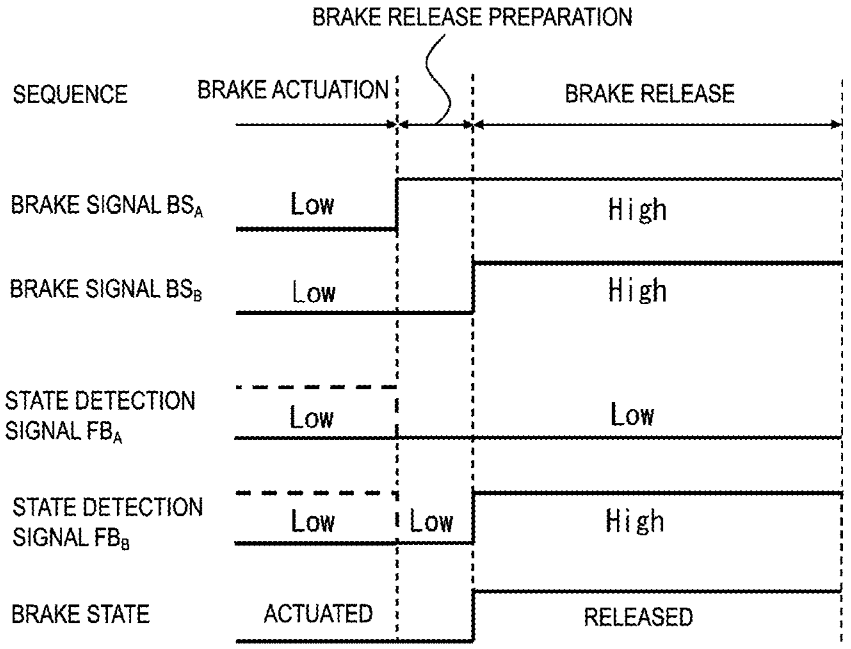
FIG. 4B is a diagram for describing each signal and brake state when only the positive-side opening and closing switch experiences a short circuit failure in the brake control device 1 according to the first embodiment of the present disclosure, and a timing chart illustrating each signal and brake state.

FIG. 4A is a diagram for describing each signal and brake state when only the positive-side opening and closing switch experiences a short circuit failure in the brake control device according to the first embodiment of the present disclosure, and a table illustrating each signal and brake state. FIG. 4B is a diagram for describing each signal and brake state when only the positive-side opening and closing switch experiences a short circuit failure in the brake control device according to the first embodiment of the present disclosure, and a timing chart illustrating each signal and brake state. It should be noted that the "brake control signal" is denoted as "brake signal" in FIGS. 4A and 4B for the sake of simplifying the drawings.

In the brake actuation process, the brake control unit 12 outputs a Low signal being the open command as the brake control signal $BS_A$ for the positive-side opening and closing switch 21A, and a Low signal being the open command as the brake control signal $BS_B$ for the negative-side opening and closing switch 21B. At this time, when the positive-side opening and closing switch 21A experiences a short circuit failure, the positive-side opening and closing switch 21A remains in the closed state even when the Low signal being the open command as the brake control signal $BS_A$ is output for the positive-side opening and closing switch 21A. On the other hand, in response to outputting the Low signal being the open command as the brake control signal $BS_B$ for the negative-side opening and closing switch 21B, the negative-side opening and closing switch 21B is caused to be in the opened state. Accordingly, when the positive-side opening and closing switch 21A experiences a short circuit failure, the electrical path from the positive electrode terminal of the power source 11 to the drain of the negative-side opening and closing switch 21B via the positive-side opening and closing switch 21A and the brake device 2 is formed during the brake actuation process period. However, since the negative-side opening and closing switch 21B is open, the voltage is not applied to the brake device 2. This gives rise to the state where the brake is actuated on the motor 3. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low. As a result, during the execution of the brake actuation process, when no abnormality occurs in the positive-side opening and closing switch 21A, the negative-side opening and closing switch 21B, and the devices related to these switches, the state detection signal $FB_A$ and the state detection signal $FB_B$ are both High, but when a short circuit failure of the positive-side opening and closing switch 21A has occurred, the state detection signal $FB_A$ and the state detection signal $FB_B$ are both Low. During the execution of the brake actuation process, the abnormality detecting unit 15 detects whether or not an abnormality occurs, based on the combination of the contents of the brake control signals $BS_A$ and $BS_B$ and the contents of the state detection signals $FB_A$ and $FB_B$. More specifically, during the execution of the brake actuation process, the abnormality detecting unit 15 determines that no abnormality occurs when the brake control signals $BS_A$ and $BS_B$ are both Low and the state detection signals $FB_A$ and $FB_B$ are both High, and determines that an abnormality occurs (i.e., a short circuit failure of the positive-side opening and closing switch 21A) when the brake control signals $BS_A$ and $BS_B$ are both Low and the state detection signals $FB_A$ and $FB_B$ are both Low. When detecting the occurrence of an abnormality during the execution of the brake actuation process, the abnormality detecting unit 15 outputs the alarm signal.

Figure 5B:
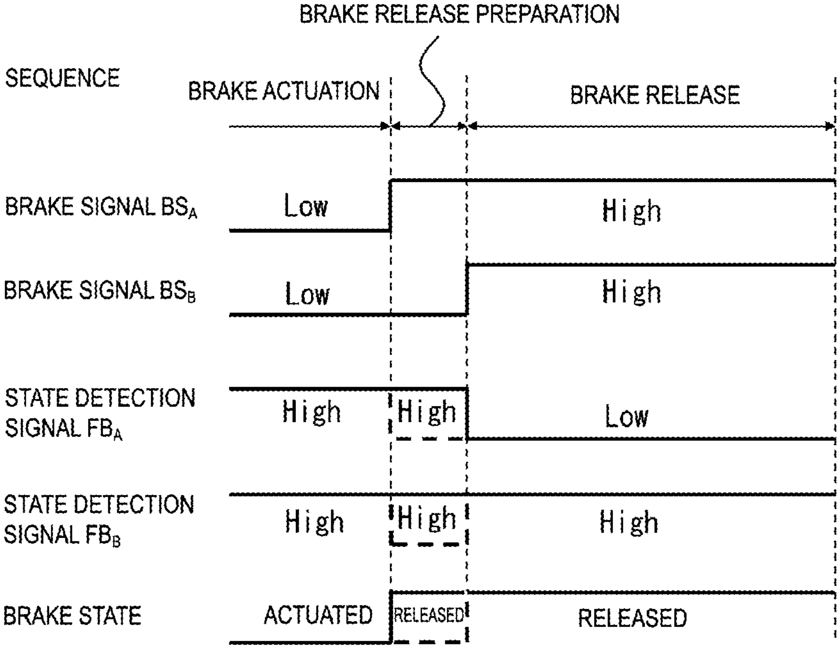
FIG. 5B is a diagram for describing each signal and brake state when only the negative-side opening and closing switch experiences a short circuit failure in the brake control device in the case where a constant voltage is output without the output control of the power source, and a timing chart illustrating each signal and brake state.

FIG. 5A is a diagram for describing each signal and brake state when only the negative-side opening and closing switch experiences a short circuit failure in the brake control device in a case where a constant voltage is output without output control of the power source, and a table illustrating each signal and brake state. FIG. 5B is a diagram for describing each signal and brake state when only the negative-side opening and closing switch experiences a short circuit failure in the brake control device in the case where a constant voltage is output without the output control of the power source, and a timing chart illustrating each signal and brake state. It should be noted that the “brake control signal” is denoted as “brake signal” in FIGS. 5A and 5B for the sake of simplifying the drawings.

FIGS. 5A and 5B illustrate each signal and brake state when a short circuit failure occurs only in the negative-side opening and closing switch 21B under the assumption that the power source 11 is not an output controllable power source (i.e., a power source with a variable output), but a power source that outputs a constant voltage (e.g., 24 V). In the case where the positive-side opening and closing switch 21A is in a normal state and the negative-side opening and closing switch 21B experiences a short circuit failure, the state detection signals $FB_A$ and $FB_B$ are both High during the execution of the brake actuation process, and the state detection signal $FB_A$ is Low and the state detection signal $FB_B$ is High during the execution of the brake release preparation process. During the execution of the brake release preparation process, since the negative-side opening and closing switch 21B experiences a short circuit failure regardless of the Low signal being the open command being output as the brake control signal $BS_B$ for the negative-side opening and closing switch 21B, the negative-side opening and closing switch 21B is caused to be in the closed state. Accordingly, when the negative-side opening and closing switch 21B experiences a short circuit failure, the electrical path from the positive electrode terminal of the power source 11 to the negative electrode terminal of the power source 11 via the positive-side opening and closing switch 21A, the brake device 2, and the negative-side opening and closing switch 21B is formed during the brake release preparation process period. As a result, the voltage of the power source 11 is applied to the brake coil 115 of the brake device 2, giving rise to the state where the brake on the motor 3 is released. As a result, when the short circuit failure of the negative-side opening and closing switch 21B occurs during the execution of the brake release preparation process, there is the risk of a state being caused where the brake that is normally actuated is released. The electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. On the other hand, the electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. As a result, during the execution of the brake release preparation process, the state detection signal $FB_A$ and the state detection signal $FB_B$ are both Low when no abnormality occurs in the positive-side opening and closing switch 21A, the negative-side opening and closing switch 21B and the devices related to these switches, but when only the negative-side opening and closing switch 21B experiences a short circuit failure, the state detection signal $FB_A$ is Low and the state detection signal $FB_B$ is High. During the execution of the brake release preparation process, the abnormality detecting unit 15 detects whether or not an abnormality occurs, based on the combination of the contents of the brake control signals $BS_A$ and $BS_B$ and the contents of the state detection signals $FB_A$ and $FB_B$. More specifically, during the execution of the brake release preparation process, the abnormality detecting unit 15 determines that no abnormality occurs when the brake control signal $BS_A$ is High, the brake control signal $BS_B$ is Low, and the state detection signals $FB_A$ and $FB_B$ are both Low, and the brake control unit 12 terminates the brake release preparation process and executes the brake release process. During the execution of the brake release preparation process, the abnormality detecting unit 15 determines that an abnormality occurs (i.e., the short circuit failure of the negative-side opening and closing switch 21B) when the brake control signal $BS_A$ is High, the brake control signal $BS_B$ is Low, the state detection signal $FB_A$ is Low, and the state detection signal $FB_B$ is High.

It should be noted that when a short circuit failure of the negative-side opening and closing switch 21B occurs during the brake release preparation process period, a dangerous state where the brake on the motor 3 is released may occur, therefore, a time period during which the brake release preparation process is executed may be set to be shorter than a response time of the brake device 2 to a brake command. By setting the time period during which the brake release preparation process is executed As a result, even when a short circuit failure of the negative-side opening and closing switch 21B has occurred, the short circuit failure of the negative-side opening and closing switch 21B can be detected while avoiding the release of the brake of the brake device 2 on the motor 3.

Figure 6B:
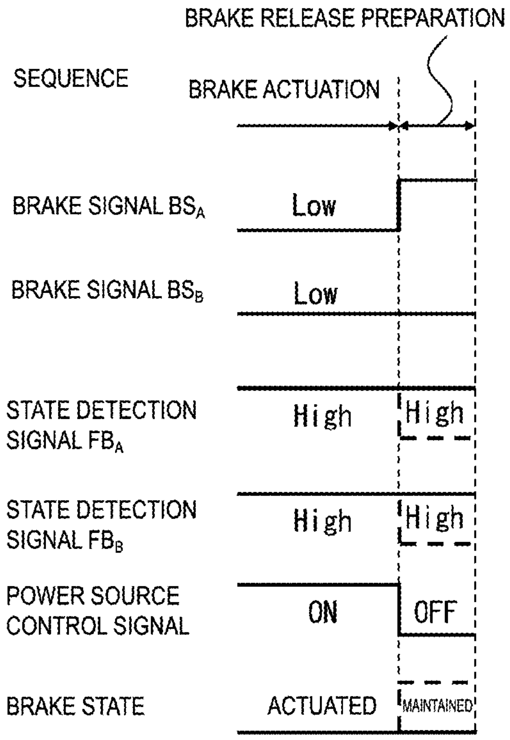
FIG. 6B is a diagram for describing each signal and brake state when only the negative-side opening and closing switch experiences a short circuit failure in the brake control device including the output controllable power source according to the first embodiment of the present disclosure, and a timing chart illustrating each signal and brake state.

FIG. 6A is a diagram for describing each signal and brake state when only the negative-side opening and closing switch experiences a short circuit failure in the brake control device including the output controllable power source according to the first embodiment of the present disclosure, and a table illustrating each signal and brake state. FIG. 6B is a diagram for describing each signal and brake state when only the negative-side opening and closing switch experiences a short circuit failure in the brake control device including the output controllable power source according to the first embodiment of the present disclosure, and a timing chart illustrating each signal and brake state. It should be noted that the "brake control signal" is denoted as "brake signal" in FIGS. 6A and 6B for the sake of simplifying the drawings.

As described above with reference to FIGS. 5A and 5B, the abnormality detecting unit 15 determines that an abnormality occurs (i.e., the short circuit failure of the negative-side opening and closing switch 21B) when the state detection signals $FB_A$ and $FB_B$ are both High during the execution of the brake actuation process, and the state detection signal $FB_A$ is Low and the state detection signal $FB_B$ is High during the execution of the brake release preparation process. In this case, when the short circuit failure of the negative-side opening and closing switch 21B occurs during the execution of the brake release preparation process, the abnormality detecting unit 15 outputs the alarm signal since the state occurs where the brake that is normally actuated is released. As illustrated in FIG. 6A, when the abnormality detecting unit 15 has detected the occurrence of an abnormality during the brake release preparation process period, the power source control unit 16 outputs the output OFF signal for controlling the power source 11 so as not to output the voltage as the power source control signal CTRP for the output controllable power source 11. As a result, the power source 11 does not output the DC voltage, i.e., the DC output voltage of the power source 11 is 0 V, i.e., the voltage of the power source 11 is not applied to the brake coil 115 of the brake device 2. This gives rise to the state where the brake is actuated on the motor 3. As a result, it is possible to avoid releasing the brake during the occurrence of an abnormality (when the negative-side opening and closing switch 21B experiences a short circuit failure).

Figure 7B:
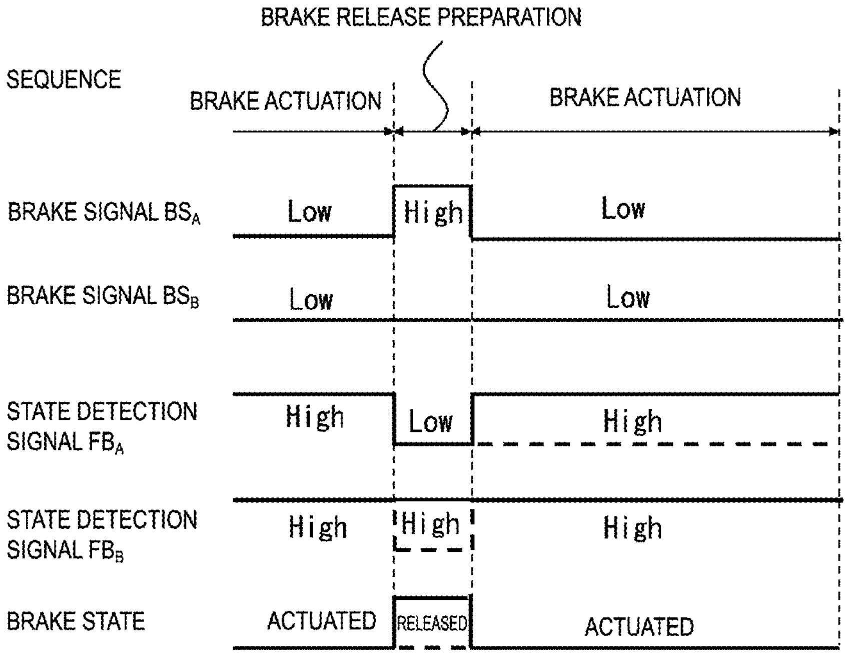
FIG. 7B is a diagram for describing each signal and brake state when only the negative-side opening and closing switch experiences a short circuit failure in the brake control device including the returning sequence of the brake actuation process according to the first embodiment of the present disclosure, and a timing chart illustrating each signal and brake state.

FIG. 7A is a diagram for describing each signal and brake state when only the negative-side opening and closing switch experiences a short circuit failure in the brake control device including a returning sequence of the brake actuation process according to the first embodiment of the present disclosure, and a table illustrating each signal and brake state. FIG. 7B is a diagram for describing each signal and brake state when only the negative-side opening and closing switch experiences a short circuit failure in the brake control device including the returning sequence of the brake actuation process according to the first embodiment of the present disclosure, and a timing chart illustrating each signal and brake state. It should be noted that the "brake control signal" is denoted as "brake signal" in FIGS. 7A and 7B for the sake of simplifying the drawings.

As described above with reference to FIGS. 5A and 5B, the abnormality detecting unit 15 determines that an abnormality occurs (i.e., the short circuit failure of the negative-side opening and closing switch 21B) when the state detection signals $FB_A$ and $FB_B$ are both High during the execution of the brake actuation process, and the state detection signal $FB_A$ is Low and the state detection signal $FB_B$ is High during the execution of the brake release preparation process. In this case, the brake control unit 12 terminates the brake release preparation process and executes the brake actuation process instead of the brake release process. Even when the short circuit failure of the negative-side opening and closing switch 21B has occurred, since at least the positive-side opening and closing switch 21A is opened due to the brake control unit 12 executing the brake actuation process, the voltage of the power source 11 is not applied to the brake coil 115 of the brake device 2. This gives rise to the state where the brake is actuated on the motor 3. As a result, it is possible to avoid releasing the brake during the occurrence of an abnormality (when the negative-side opening and closing switch 21B experiences a short circuit failure).

Figure 8B:
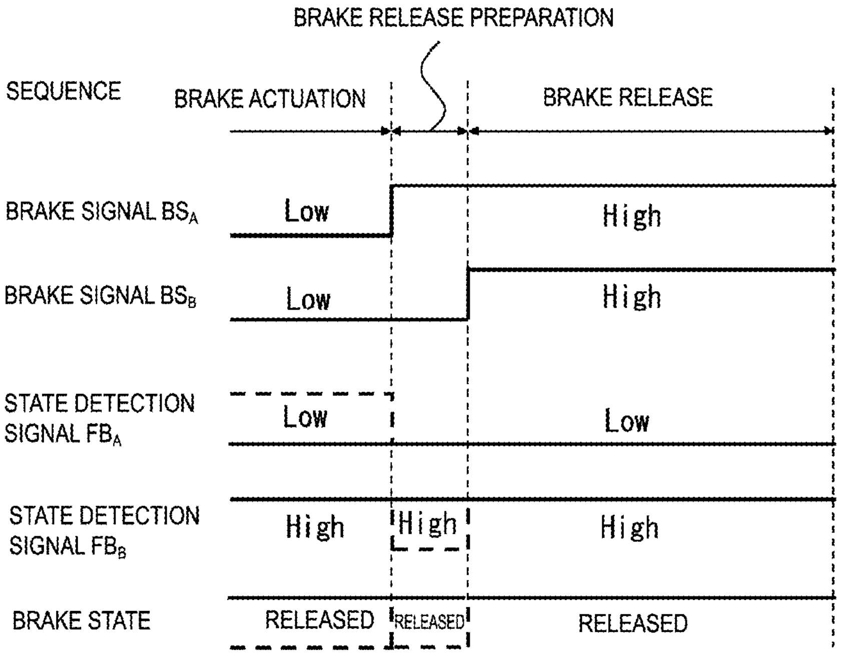
FIG. 8B is a diagram for describing each signal and brake state when both the positive-side opening and closing switch and the negative-side opening and closing switch experience a short circuit failure in the brake control device in the case where a constant voltage is output without the output control of the power source, and a timing chart illustrating each signal and brake state.

FIG. 8A is a diagram for describing each signal and brake state when both the positive-side opening and closing switch and the negative-side opening and closing switch experience a short circuit failure in the brake control device in the case where a constant voltage is output without the output control of the power source, and a table illustrating each signal and brake state. FIG. 8B is a diagram for describing each signal and brake state when both the positive-side opening and closing switch and the negative-side opening and closing switch experience a short circuit failure in the brake control device in the case where a constant voltage is output without the output control of the power source, and a timing chart illustrating each signal and brake state. It should be noted that the "brake control signal" is denoted as "brake signal" in FIGS. 8A and 8B for the sake of simplifying the drawings.

FIGS. 8A and 8B illustrate each signal and brake state when a short circuit failure occurs in both the positive-side opening and closing switch 21A and the negative-side opening and closing switch 21B under the assumption that the power source 11 is not an output controllable power source (i.e., a power source with a variable output), but a power source that outputs a constant voltage (e.g., 24 V). In the case where a short circuit failure occurs in both the positive-side opening and closing switch 21A and the negative-side opening and closing switch 21B, even when the Low signal being the open command is output as the brake control signal $BS_A$ for the positive-side opening and closing switch 21A and the Low signal being the open command is output as the brake control signal $BS_B$ for the negative-side opening and closing switch 21B through the brake actuation process, both the positive-side opening and closing switch 21A and the negative-side opening and closing switch 21B are caused to be in the closed state. Accordingly, the electrical path from the positive electrode terminal of the power source 11 to the negative electrode terminal of the power source 11 via the positive-side opening and closing switch 21A, the brake device 2 and the negative-side opening and closing switch 21B is formed. As a result, the voltage of the power source 11 is applied to the brake coil 115 of the brake device 2, giving rise to the state where the brake on the motor 3 is released. As a result, when the short circuit failures of both the positive-side opening and closing switch 21A and the negative-side opening and closing switch 21B occur during the execution of the brake actuation process, there is the risk of the state being caused where the brake that is normally actuated is released. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. On the other hand, the electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. As a result, during the brake actuation process period, when no abnormality occurs in the positive-side opening and closing switch 21A, the negative-side opening and closing switch 21B and the devices related to these switches, the state detection signal $FB_A$ and the state detection signal $FB_B$ are both High, but when both the positive-side opening and closing switch 21A and the negative-side opening and closing switch 21B experience a short circuit failure, the state detection signal $FB_A$ is Low and the state detection signal $FB_B$ is High.

In the case where a short circuit failure occurs in both the positive-side opening and closing switch 21A and the negative-side opening and closing switch 21B, even when the High signal being the open command is output as the brake control signal $BS_A$ for the positive-side opening and closing switch 21A and the Low signal being the open command is output as the brake control signal $BS_B$ for the negative-side opening and closing switch 21B through the brake release preparation process, both the positive-side opening and closing switch 21A and the negative-side opening and closing switch 21B are caused to be in the closed state. Accordingly, the electrical path from the positive electrode terminal of the power source 11 to the negative electrode terminal of the power source 11 via the positive-side opening and closing switch 21A, the brake device 2 and the negative-side opening and closing switch 21B is formed. As a result, the voltage of the power source 11 is applied to the brake coil 115 of the brake device 2, giving rise to the state where the brake on the motor 3 is released. As a result, when the short circuit failures of both the positive-side opening and closing switch 21A and the negative-side opening and closing switch 21B occur during the execution of the brake release preparation process, there is the risk of the state arising where the brake that is normally actuated is released. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element of the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. On the other hand, the electrical path from the negative electrode terminal of the brake device 2 to the drain of the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High. As a result, during the execution of the brake release preparation process, when no abnormality occurs in the positive-side opening and closing switch 21A, the negative-side opening and closing switch 21B and the devices related to these switches, the state detection signal $FB_A$ and the state detection signal $FB_B$ are both High, but when both the positive-side opening and closing switch 21A and the negative-side opening and closing switch 21B experience a short circuit failure, the state detection signal $FB_A$ is Low and the state detection signal $FB_B$ is High.

As a result, when a short circuit failure of both the positive-side opening and closing switch 21A and the negative-side opening and closing switch 21B has occurred, the state detection signals $FB_A$ and $FB_B$ have a signal state different from the normal state both during the execution of the brake actuation process and during the execution of the brake release preparation process of the brake control unit 12.

Figure 9B:
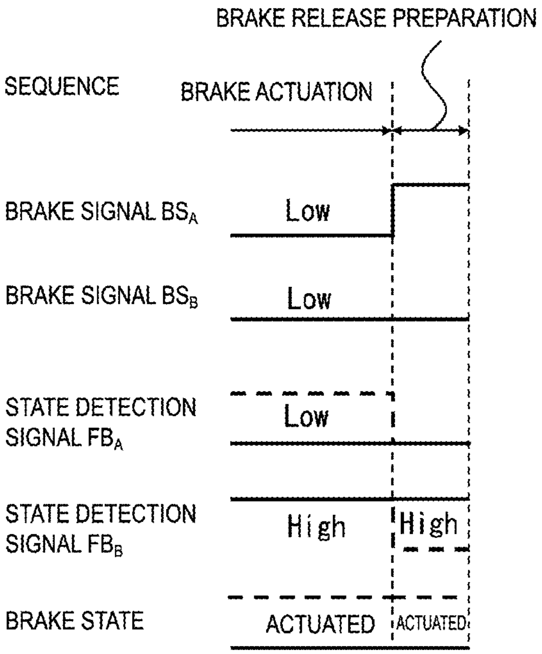
FIG. 9B is a diagram for describing each signal and brake state when both the positive-side opening and closing switch and the negative-side opening and closing switch experience a short circuit failure in the brake control device including the output controllable power source according to the first embodiment of the present disclosure, and a timing chart illustrating each signal and brake state.

FIG. 9A is a diagram for describing each signal and brake state when both the positive-side opening and closing switch and the negative-side opening and closing switch experience a short circuit failure in the brake control device including the output controllable power source according to the first embodiment of the present disclosure, and a table illustrating each signal and brake state. FIG. 9B is a diagram for describing each signal and brake state when both the positive-side opening and closing switch and the negative-side opening and closing switch experience a short circuit failure in the brake control device including the output controllable power source according to the first embodiment of the present disclosure, and a timing chart illustrating each signal and brake state. It should be noted that the "brake control signal" is denoted as "brake signal" in FIGS. 9A and 9B for the sake of simplifying the drawings.

As described above with reference to FIGS. 8A and 8B, in the case where the abnormality detecting unit 15 has detected the occurrence of an abnormality both during the execution of the brake actuation process and during the execution of the brake release preparation process, the abnormality detecting unit 15 outputs the alarm signal, since the brake is in the released state, although the break is normally actuated through the brake actuation process and the brake release preparation process, when a short circuit failure occurs in both the positive-side opening and closing switch 21A and the negative-side opening and closing switch 21B. As illustrated in FIG. 9A, when the abnormality detecting unit 15 has detected the occurrence of an abnormality during the execution of the brake actuation process and during the execution of the brake release preparation process, the power source control unit 16 outputs the output OFF signal for controlling the power source 11 so as not to output the voltage as the power source control signal CTRP for the output controllable power source 11. As a result, the power source 11 does not output the DC voltage, i.e., the DC output voltage of the power source 11 is 0 V. Thus, the voltage of the power source 11 is not applied to the brake coil 115 of the brake device 2, giving rise to the state where the brake is actuated on the motor 3. As a result, it is possible to avoid a situation where releasing of the brake continues when an abnormality occurs (when the positive-side opening and closing switch 21A and the negative-side opening and closing switch 21B experience a short circuit failure).

Figure 10:
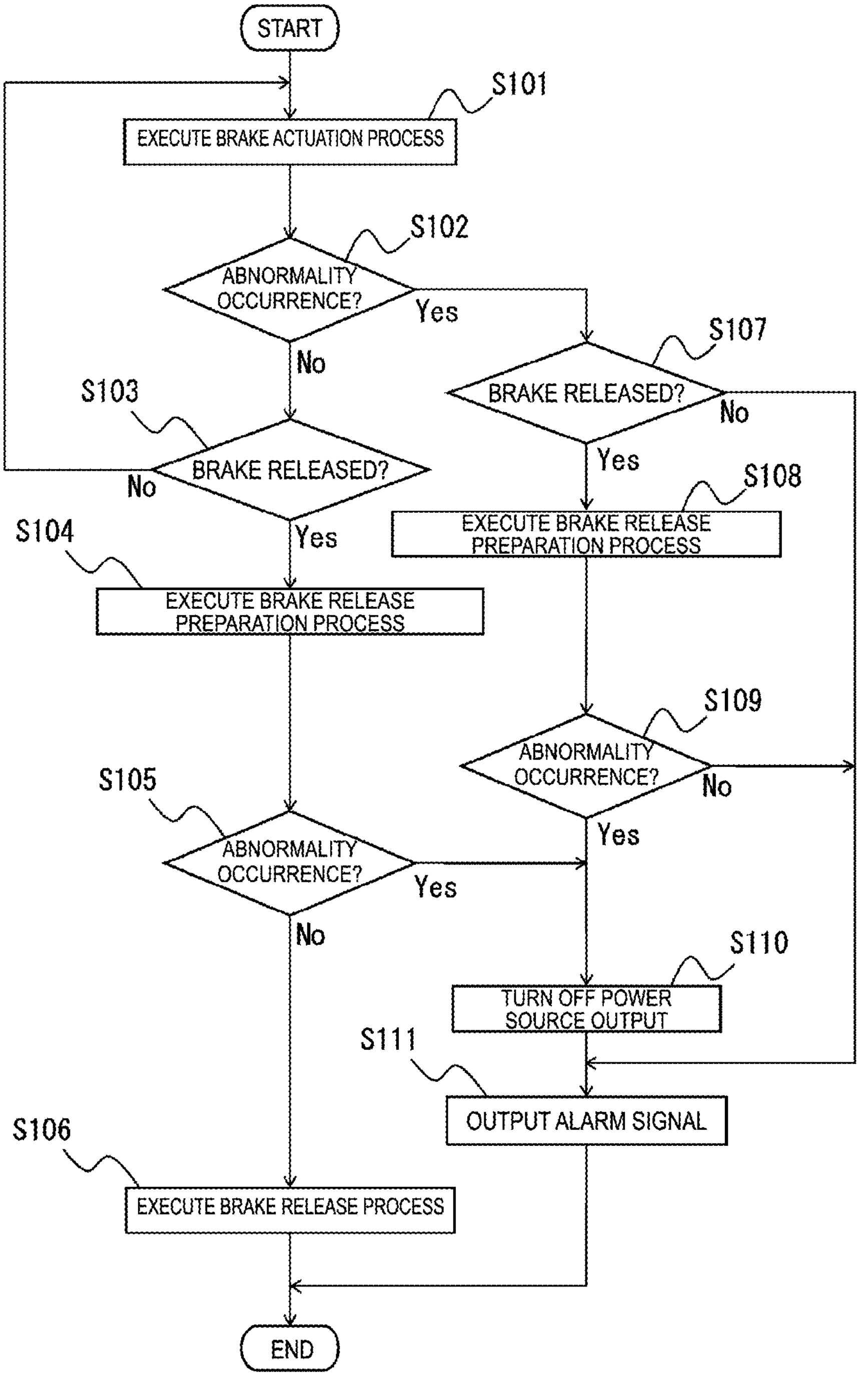
FIG. 10 is a flowchart illustrating an operation flow until the release of the brake of the brake device actuated on the motor in the brake control device according to the first embodiment of the present disclosure.

FIG. 10 is a flowchart illustrating an operation flow until the release of the brake of the brake device actuated on the motor in the brake control device according to the first embodiment of the present disclosure.

During the execution period of the brake actuation process, the brake release preparation process and the brake release process, the state detecting unit 14 outputs the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

In step S101, the brake actuation process is executed. In the brake actuation process, the brake control unit 12 outputs the brake control signals $BS_A$ and $BS_B$ for controlling the positive-side opening and closing switch 21A and the negative-side opening and closing switch 21B to open.

In step S102, during the execution of the brake actuation process, the abnormality detecting unit 15 detects whether or not an abnormality occurs (i.e., the short circuit failure of the positive-side opening and closing switch 21A), based on the combination of the contents of the brake control signals $BS_A$ and $BS_B$, and the contents of the state detection signals $FB_A$ and $FB_B$. When the occurrence of an abnormality is detected in step S102, the process proceeds to step S107. On the other hand, when the occurrence of an abnormality is not detected in step S102, the process proceeds to step S103.

In step S103, the brake control unit 12 determines whether or not a brake release command has been received from the host controller (not illustrated). Examples of the host controller include a motor controller that controls the motor 3 being a braking target of the brake device 2, or a host controller at a higher level than the motor controller (e.g., a numerical value controller or a robot controller). When it is determined in step S103 that the brake release command has not been received, the process is returned to step S101, and the execution of the brake actuation process is continued. When it is determined in step S103 that the brake release command has been received, the process proceeds to step S104.

In step S104, the brake control unit 12 executes the brake release preparation process. In the brake release preparation process, the brake control unit 12 outputs the brake control signals $BS_A$ and $BS_B$ for controlling the positive-side opening and closing switch 21A to close and the negative-side opening and closing switch 21B to open.

In step S105, during the execution of the brake release preparation process, the abnormality detecting unit 15 detects whether or not an abnormality occurs (i.e., the short circuit failure of the negative-side opening and closing switch 21B), based on the combination of the contents of the brake control signals $BS_A$ and $BS_B$ and the contents of the state detection signals $FB_A$ and $FB_B$. When the occurrence of an abnormality is detected in step S105, the process proceeds to step S110. On the other hand, when the occurrence of an abnormality is not detected in step S105, the process proceeds to step S106.

In step S106, the brake release process is executed. In the brake release process, the brake control unit 12 outputs the brake control signals $BS_A$ and $BS_B$ for controlling the positive-side opening and closing switch 21A and the negative-side opening and closing switch 21B to close. The brake release process is executed As a result in step S106 when the occurrence of an abnormality is not detected in step S102 during the execution of the brake actuation process and the occurrence of an abnormality is not detected in step S105 during the execution of the brake release preparation process, and thus the brake can be safely released.

When the occurrence of an abnormality is detected in step S105, the power source control unit 16 outputs the output OFF signal for controlling the power source 11 so as not to output the voltage as the power source control signal CTRP for the output controllable power source 11 in step S110. As a result, the power source 11 does not output the DC voltage, i.e., the DC output voltage of the power source 11 is 0 V, i.e., the voltage of the power source 11 is not applied to the brake coil 115 of the brake device 2. This gives rise to the state where the brake is actuated on the motor 3. As a result, it is possible to avoid releasing the brake during the occurrence of an abnormality.

In step S111, the abnormality detecting unit 15 outputs the alarm signal to notify the operator of the occurrence of an abnormality.

In step S102, when the abnormality detecting unit 15 detects the occurrence of an abnormality during the execution of the brake actuation process, the brake control unit 12 determines in step S107 whether or not the brake release command has been received from the host controller (not illustrated).

When it is determined in step S107 that the brake release command has not been received, the process proceeds to step S111. The abnormality detected in step S102 executed before step S107 is the short circuit failure of the positive-side opening and closing switch 21A. As described above with reference to FIGS. 4A and 4B, safety is ensured because the brake of the brake device 2 is actuated even with the short circuit failure of the positive-side opening and closing switch 21A, but the abnormality detecting unit 15 outputs the alarm signal in step S111 to notify the operator of the occurrence of an abnormality.

When it is determined in step S107 that the brake release command has been received, the process proceeds to step S108. In step S108, the brake control unit 12 executes the brake release preparation process. In the brake release preparation process, the brake control unit 12 outputs the brake control signals $BS_A$ and $BS_B$ for controlling the positive-side opening and closing switch 21A to close and the negative-side opening and closing switch 21B to open.

In step S109, during the execution of the brake release preparation process, the abnormality detecting unit 15 detects whether or not an abnormality occurs (i.e., the short circuit failure of the negative-side opening and closing switch 21B) based on the combination of the contents of the brake control signals $BS_A$ and $BS_B$ and the contents of the state detection signals $FB_A$ and $FB_B$.

When the occurrence of an abnormality is detected in step S109, the process proceeds to step S110 and the power source control unit 16 outputs the output OFF signal since the short circuit failures of both the positive-side opening and closing switch 21A and the negative-side opening and closing switch 21B described with reference to FIGS. 8A, 8B, 9A, and 9B are occurring. As a result, the power source 11 does not output the DC voltage, i.e., the DC output voltage of the power source 11 is 0 V, and the voltage of the power source 11 is not applied to the brake coil 115 of the brake device 2. This gives rise to the state where the brake is actuated on the motor 3. That is, it is possible to avoid releasing the brake when an abnormality occurs. In step S111 following step S110, the abnormality detecting unit 15 outputs the alarm signal to notify the operator of the occurrence of an abnormality.

When the occurrence of an abnormality is not detected in step S109, only the short circuit failure of the positive-side opening and closing switch 21A described with reference to FIGS. 4A and 4B is occurring. In this case, the safety is ensured because the brake of the brake device 2 is actuated, but the abnormality detecting unit 15 outputs the alarm signal in step S111 to notify the operator of the occurrence of an abnormality.

As described above, the brake control device 1 according to the first embodiment of the present disclosure allows the brake of the brake device 2 actuated on the motor 3 to be released only when no abnormality occurs. Even when an abnormality occurs at the time of releasing the brake of the brake device 2 actuated on the motor 3, the release of the brake can be avoided.

Subsequently, the second embodiment of the present disclosure is described. The power source 11 in the first embodiment is an output controllable power source based on the power source control signal CTRP from the power source control unit 16, and is therefore more likely to have a failure than a power source that outputs a constant voltage at all times. The power source 11 of the second embodiment of the present disclosure can detect the occurrence of an abnormality. The occurrence of an abnormality in the power source can be detected through a first power source inspection process executed between the brake actuation process and the brake release preparation process, or a second power source inspection process executed between the brake release process and the brake actuation process.

Figure 11:
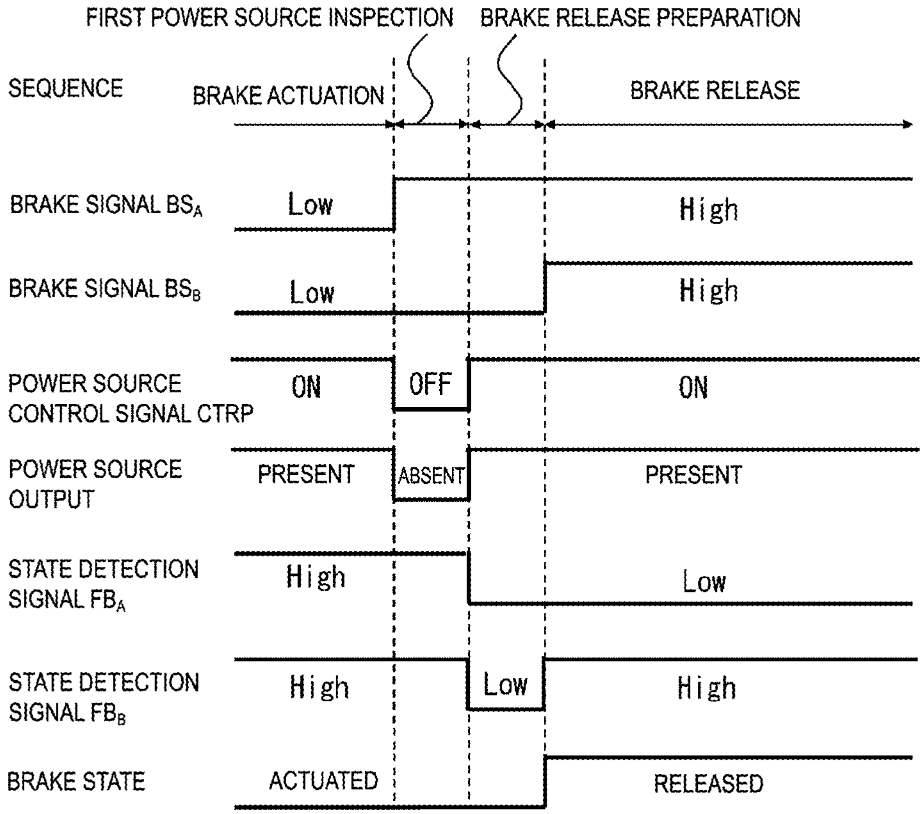
FIG. 11 is a diagram illustrating an example of each signal and brake state in a normal state of the power source in the brake control device having a first power source inspection function according to the second embodiment of the present disclosure.
Figure 12:
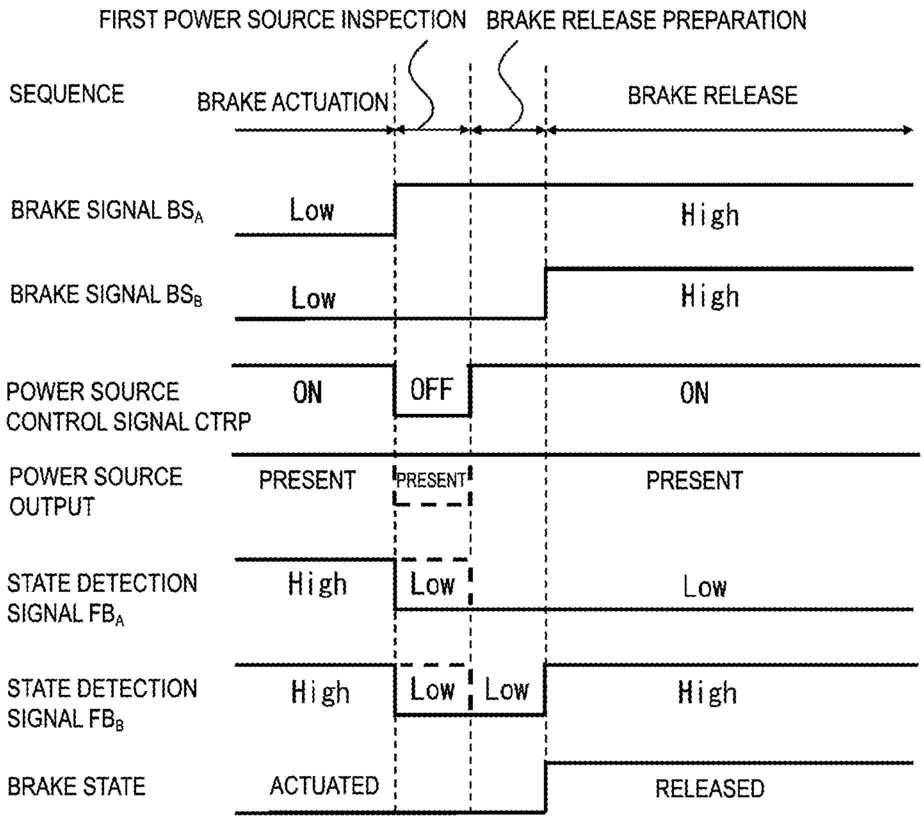
FIG. 12 is a diagram illustrating an example of each signal and brake state of an abnormal state of the power source in the brake control device having the first power source inspection function according to the second embodiment of the present disclosure.

FIG. 11 is a diagram illustrating an example of each signal and brake state in a normal state of the power source in the brake control device having a first power source inspection function according to the second embodiment of the present disclosure. FIG. 12 is a diagram illustrating an example of each signal and brake state in an abnormal state of the power source in the brake control device having the first power source inspection function according to the second embodiment of the present disclosure. In FIGS. 11 and 12, for the sake of simplifying the description, it is assumed that no abnormality occurs, such as the short circuit failure of the positive-side opening and closing switch 21A and/or the negative-side opening and closing switch 21B that may be detected during the execution of the brake actuation process and the brake release preparation process. The “brake control signal” is denoted as “brake signal” in FIGS. 11 and 12 for the sake of simplifying the drawings.

The first power source inspection process is executed before executing the brake release preparation process when transitioning from the brake actuation process to the brake release preparation process. In the first power source inspection process, the power source control unit 16 outputs the output OFF signal as the power source control signal CTRP for the power source 11, and the brake control unit 12 outputs the brake control signals $BS_A$ and $BS_B$ for controlling the positive-side opening and closing switch 21A to close and the negative-side opening and closing switch 21B to open similar to as in the brake release preparation process. Since the positive-side opening and closing switch 21A and the negative-side opening and closing switch 21B are normally open switches, the brake control unit 12 outputs a High signal as the brake control signal $BS_A$ for the positive-side opening and closing switch 21A and a Low signal as the brake control signal $BS_B$ for the negative-side opening and closing switch 21B.

As illustrated in FIG. 11, when the power source 11 is in a normal state, the power source 11 does not output the DC voltage in response to the output OFF signal received from the power source control unit 16, i.e., the DC output voltage of the power source 11 is 0 V during the first power source inspection process period. As a result, the electrical path from the positive electrode terminal of the power source 11 to the positive electrode terminal of the brake device 2 via the positive-side opening and closing switch 21A has the same potential as the output voltage of the positive electrode terminal of the power source 11 (in the example illustrated in FIG. 1, 0 V). Thus, since the current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2 is High. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

The contents of the state detection signals $FB_A$ and $FB_B$ in the first power source inspection process in the above-described case where the power source 11 is in a normal state are stored in advance in the abnormality detecting unit 15 so as to be available in the abnormality detection process for the power source 11.

When a "continuing to output the voltage without responding to the output OFF signal" failure occurs in the power source 11, the power source 11 continues to output the DC voltage (e.g., 24 V) even when the output OFF signal is received from the power source control unit 16, as illustrated in FIG. 12. As a result, the electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

As a result, when the power source 11 is in a normal state, the state detection signals $FB_A$ and $FB_B$ during the first power source inspection process period are both High, but when an abnormality occurs in the power source 11, the state detection signals $FB_A$ and $FB_B$ during the first power source inspection process period are both Low. Thus, during the first power source inspection process period, the abnormality detecting unit 15 detects whether or not an abnormality occurs in the power source 11 based on the combination of the contents of the brake control signals $BS_A$ and $BS_B$, the contents of the state detection signals $FB_A$ and $FB_B$, and contents of the power source control signal CTRP. In the example illustrated in FIG. 1, during the first power source inspection process period, the abnormality detecting unit 15 determines that no abnormality occurs in the power source 11 when the state detection signals $FB_A$ and $FB_B$ are both High, and determines that an abnormality occurs in the power source 11 when the state detection signals $FB_A$ and $FB_B$ are both Low. The abnormality detecting unit 15 outputs the alarm signal when the occurrence of an abnormality in the power source 11 is detected. The alarm signal output from the abnormality detecting unit 15 is sent to, for example, the display part (not illustrated), and the display part, for example, notifies the operator of an "abnormality occurrence in the power source". Examples of the display part include a single display device, a display device attached to the motor drive device 100, a display device attached to the host controller (not illustrated), and a display device attached to a personal computer and a mobile terminal. For example, the alarm signal output from the abnormality detecting unit 15 is sent to, for example, a light-emitting device (not illustrated) such as an LED or a lamp, the light-emitting device notifying the operator of an "abnormality occurrence" by emitting light when receiving the alarm signal. For example, the alarm signal output from the abnormality detecting unit 15 is sent to, for example, the acoustic device (not illustrated), the acoustic device notifying the operator of an "abnormality occurrence in the power source" by emitting a sound such as a voice, a speaker, a buzzer, or a chime when receiving the alarm signal. As a result, the operator can reliably and easily recognize the occurrence of an abnormality in the power source. The operator can also, for example, easily take measures such as replacing components related to the abnormality or removing the cause of the abnormality. The alarm signal output from the abnormality detecting unit 15 may be used for the emergency stop process of the motor drive device 100.

Figure 13:
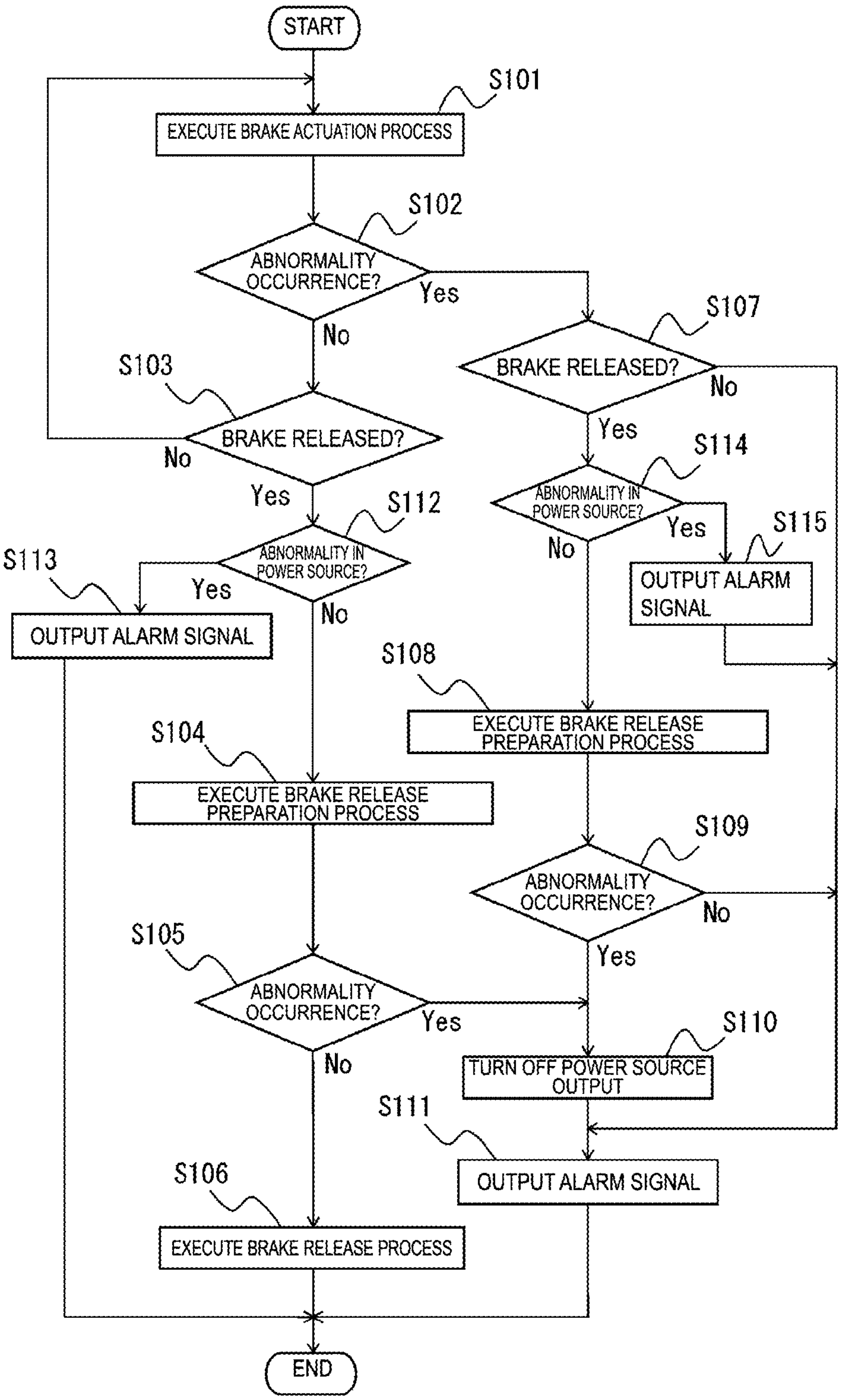
FIG. 13 is a flowchart illustrating an operation flow when releasing the brake of the brake device actuated on the motor in the brake control device according to the second embodiment of the present disclosure.

FIG. 13 is a flowchart illustrating an operation flow when releasing the brake of the brake device actuated on the motor in the brake control device according to the second embodiment of the present disclosure.

During the execution period of the brake actuation process, the first power source inspection process, the brake release preparation process and the brake release process, the state detecting unit 14 outputs the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

In step S101, the brake actuation process is executed. In the brake actuation process, the brake control unit 12 outputs the brake control signals $BS_A$ and $BS_B$ for controlling the positive-side opening and closing switch 21A and the negative-side opening and closing switch 21B to open. The power source control unit 16 outputs the output ON signal to the power source 11.

In step S102, during the execution of the brake actuation process, the abnormality detecting unit 15 detects whether or not an abnormality occurs (i.e., the short circuit failure of the positive-side opening and closing switch 21A) based on the combination of the contents of the brake control signals $BS_A$ and $BS_B$ and the contents of the state detection signals $FB_A$ and $FB_B$. When the occurrence of an abnormality is detected in step S102, the process proceeds to step S107. On the other hand, when the occurrence of an abnormality is not detected in step S102, the process proceeds to step S103.

In step S103, the brake control unit 12 determines whether or not a brake release command has been received from the host controller (not illustrated). When it is determined in step S103 that the brake release command has not been received, the process is returned to step S101, and the execution of the brake actuation process is continued. When it is determined in step S103 that the brake release command has been received, the process proceeds to step S112.

In step S112, the first power source inspection process is executed. In the first power source inspection process, the power source control unit 16 outputs the output OFF signal as the power source control signal CTRP for the power source 11, and the brake control unit 12 outputs the brake control signals $BS_A$ and $BS_B$ for controlling the positive-side opening and closing switch 21A to close and the negative-side opening and closing switch 21B to open. During the first power source inspection process period, the abnormality detecting unit 15 detects whether or not an abnormality occurs in the power source 11 based on the combination of the contents of the brake control signal $BS_A$ and $BS_B$, the contents of the state detection signals $FB_A$ and $FB_B$, and the contents of the power source control signal CTRP.

When the occurrence of an abnormality in the power source 11 is detected in step S112, the process proceeds to step S113. In step S113, the abnormality detecting unit 15 outputs the alarm signal to notify the operator of the occurrence of an abnormality in the power source 11. Thereafter, the processing is terminated.

When the occurrence of an abnormality in the power source 11 is not detected in step S112, the process proceeds to step S104.

In step S104, the brake control unit 12 executes the brake release preparation process. In the brake release preparation process, the brake control unit 12 outputs the brake control signals $BS_A$ and $BS_B$ for controlling the positive-side opening and closing switch 21A to close and the negative-side opening and closing switch 21B to open.

In step S105, during the execution of the brake release preparation process, the abnormality detecting unit 15 detects whether or not an abnormality occurs (i.e., the short circuit failure of the negative-side opening and closing switch 21B) based on the combination of the contents of the brake control signals $BS_A$ and $BS_B$ and the contents of the state detection signals $FB_A$ and $FB_B$. When the occurrence of an abnormality is detected in step S105, the process proceeds to step S110. On the other hand, when the occurrence of an abnormality is not detected in step S105, the process proceeds to step S106.

In step S106, the brake release process is executed. In the brake release process, the brake control unit 12 outputs the brake control signals $BS_A$ and $BS_B$ for controlling the positive-side opening and closing switch 21A and the negative-side opening and closing switch 21B to close. The brake release process is executed As a result in step S106 when the occurrence of an abnormality is not detected in step S102 during the execution of the brake actuation process and the occurrence of an abnormality is not detected in step S105 during the execution of the brake release preparation process, and thus the brake can be safely released.

When the occurrence of an abnormality is detected in step S105, the power source control unit 16 outputs the output OFF signal for controlling the power source 11 so as not to output the voltage as the power source control signal CTRP for the output controllable power source 11 in step S110. As a result, the power source 11 does not output the DC voltage, i.e., the DC output voltage of the power source 11 is 0 V, i.e., the voltage of the power source 11 is not applied to the brake coil 115 of the brake device 2. This gives rise to the state where the brake is actuated on the motor 3. As a result, it is possible to avoid releasing the brake during the occurrence of an abnormality.

In step S111, the abnormality detecting unit 15 outputs the alarm signal to notify the operator of the occurrence of an abnormality.

In step S102, when the abnormality detecting unit 15 detects the occurrence of an abnormality during the execution of the brake actuation process, the brake control unit 12 determines in step S107 whether or not the brake release command has been received from the host controller (not illustrated).

When it is determined in step S107 that the brake release command has not been received, the process proceeds to step S111. The abnormality detected in step S102 executed before step S107 is the short circuit failure of the positive-side opening and closing switch 21A. As described above with reference to FIGS. 4A and 4B, safety is ensured because the brake of the brake device 2 is actuated even with the short circuit failure of the positive-side opening and closing switch 21A, but the abnormality detecting unit 15 outputs the alarm signal in step S111 to notify the operator of the occurrence of an abnormality.

When it is determined in step S107 that the brake release command has been received, the process proceeds to step S114.

In step S114, the first power source inspection process is executed. In the first power source inspection process, the power source control unit 16 outputs the output OFF signal as the power source control signal CTRP for the power source 11, and the brake control unit 12 outputs the brake control signals $BS_A$ and $BS_B$ for controlling the positive-side opening and closing switch 21A to close and the negative-side opening and closing switch 21B to open. During the first power source inspection process period, the abnormality detecting unit 15 detects whether or not an abnormality occurs in the power source 11 based on the combination of the contents of the brake control signals $BS_A$ and $BS_B$, the contents of the state detection signals $FB_A$ and $FB_B$ and the contents of the power source control signal CTRP.

When the occurrence of an abnormality in the power source 11 is detected in step S114, the process proceeds to step S111. In step S111, the abnormality detecting unit 15 outputs the alarm signal to notify the operator of the occurrence of an abnormality in the power source 11. Thereafter, the processing is terminated.

When the occurrence of an abnormality in the power source 11 is not detected in step S114, the process proceeds to step S108. In step S108, the brake release preparation process is executed. In the brake release preparation process, the brake control unit 12 outputs the brake control signals $BS_A$ and $BS_B$ for controlling the positive-side opening and closing switch 21A to close and the negative-side opening and closing switch 21B to open.

In step S109, during the execution of the brake release preparation process, the abnormality detecting unit 15 detects whether or not an abnormality occurs (i.e., the short circuit failure of the negative-side opening and closing switch 21B), based on the combination of the contents of the brake control signals $BS_A$ and $BS_B$ and the contents of the state detection signals $FB_A$ and $FB_B$.

When the occurrence of an abnormality is detected in step S109, the process proceeds to step S110 and the power source control unit 16 outputs the output OFF signal, since the short circuit failures of both the positive-side opening and closing switch 21A and the negative-side opening and closing switch 21B described with reference to FIGS. 8A, 8B, 9A, and 9B are occurring. As a result, the power source 11 does not output the DC voltage, i.e., the DC output voltage of the power source 11 is 0 V, and the voltage of the power source 11 is not applied to the brake coil 115 of the brake device 2. This gives rise to the state where the brake is actuated on the motor 3. As a result, it is possible to avoid releasing the brake during the occurrence of an abnormality. In step S111 following step S110, the abnormality detecting unit 15 outputs the alarm signal to notify the operator of the occurrence of an abnormality.

When the occurrence of an abnormality is not detected in step S109, only the short circuit failure of the positive-side opening and closing switch 21A described with reference to FIGS. 4A and 4B is occurring. In this case, the safety is ensured because the brake of the brake device 2 is actuated, but the abnormality detecting unit 15 outputs the alarm signal in step S111 to notify the operator of the occurrence of an abnormality.

It should be noted that in the brake control device 1 having the first power source inspection function according to the second embodiment of the present disclosure, an operation flow other than described with reference to FIG. 13 may also be employed as the operation flow to transition from the brake actuation process to the brake release process via the brake release preparation process. For example, when at least one selected from the group consisting of the occurrence of an abnormality to be detected during the execution of the brake actuation process by the abnormality detecting unit 15, the occurrence of an abnormality to be detected during the execution of the brake release preparation process by the abnormality detecting unit 15, and the occurrence of an abnormality in the power source 11 is not detected, safety can be ensured because the brake of the brake device 2 can be actuated due to the abnormality not being detected (i.e., any of the positive-side opening and closing switch 21A, the negative-side opening and closing switch 21B, or the output controllable power source 11). Accordingly, when at least one selected from the group consisting of the occurrence of an abnormality to be detected during the execution of the brake actuation process by the abnormality detecting unit 15, the occurrence of an abnormality to be detected during the execution of the brake release preparation process by the abnormality detecting unit 15, and the occurrence of an abnormality in the power source 11 is not detected, the brake control unit 12 may operate the brake control device 1 through an operation flow to terminate the brake release preparation process and execute the brake release process.

Subsequently, the second power source inspection process is described.

Figure 14:
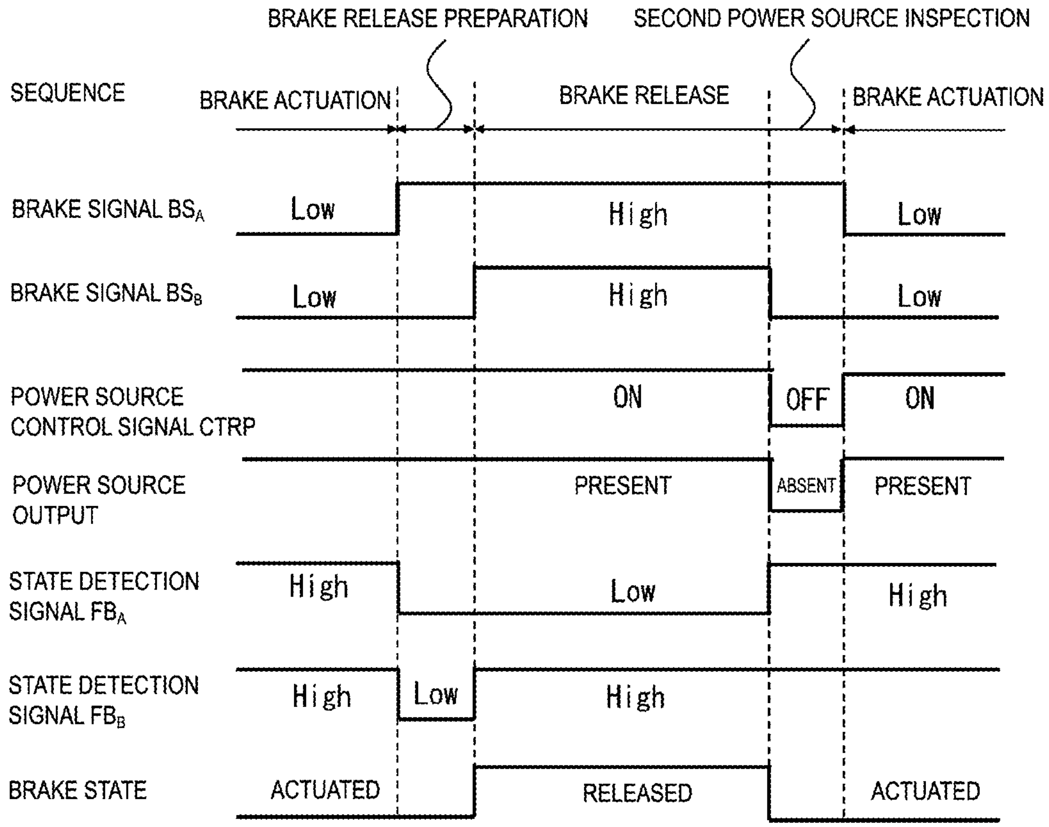
FIG. 14 is a diagram illustrating an example of each signal and brake state in a normal state of the power source in the brake control device having a second power source inspection function according to the second embodiment of the present disclosure.
Figure 15:
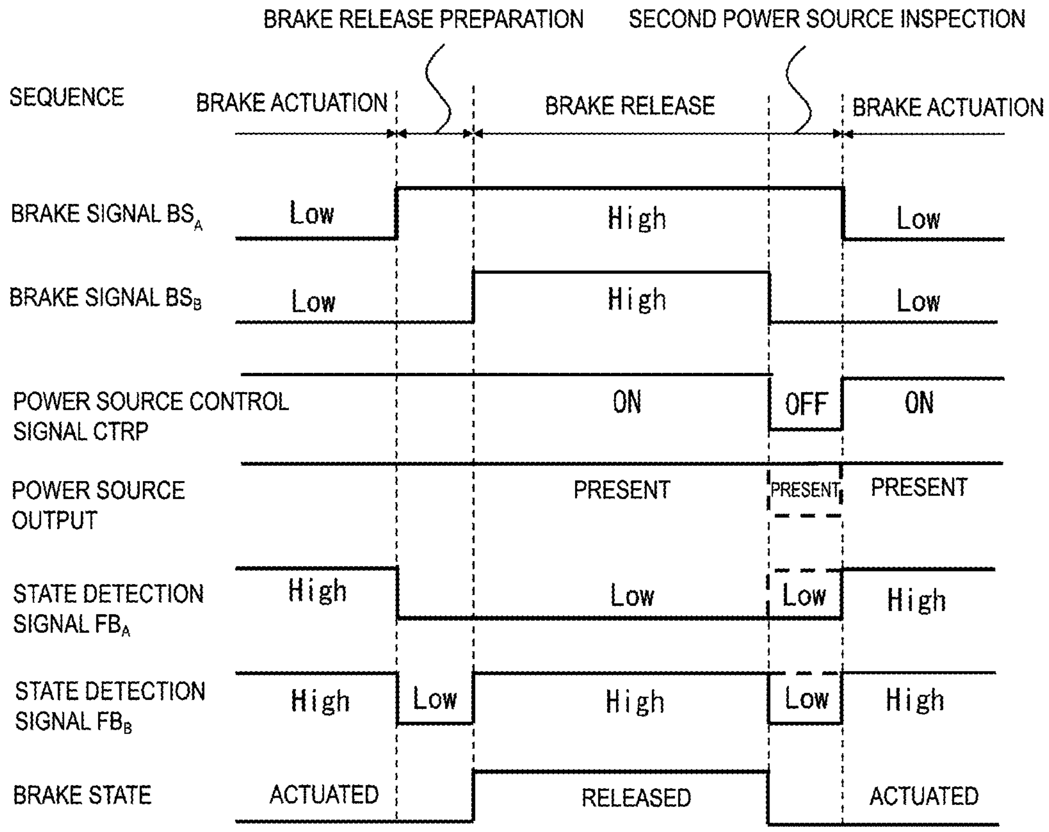
FIG. 15 is a diagram illustrating an example of each signal and brake state of an abnormal state of the power source in the brake control device having the second power source inspection function according to the second embodiment of the present disclosure.

FIG. 14 is a diagram illustrating an example of each signal and brake state in a normal state of the power source in the brake control device having a second power source inspection function according to the second embodiment of the present disclosure. FIG. 15 is a diagram illustrating an example of each signal and brake state of an abnormal state of the power source in the brake control device having the second power source inspection function according to the second embodiment of the present disclosure. In FIGS. 14 and 15, for the sake of simplifying the description, it is assumed that no abnormality occurs such as the short circuit failure of the positive-side opening and closing switch 21A and/or the negative-side opening and closing switch 21B that may be detected during the execution of the brake actuation process and the brake release preparation process. The "brake control signal" is denoted as "brake signal" in FIGS. 14 and 15 for the sake of simplifying the drawings.

The second power source inspection process is executed before executing the brake actuation process when transitioning from the brake release process to the brake actuation process. In the second power source inspection process, the power source control unit 16 outputs the output OFF signal as the power source control signal CTRP for the power source 11, and the brake control unit 12 outputs the brake control signals $BS_A$ and $BS_B$ for controlling the positive-side opening and closing switch 21A to close and the negative-side opening and closing switch 21B to open as in the brake release preparation process. Since the positive-side opening and closing switch 21A and the negative-side opening and closing switch 21B are normally open switches, the brake control unit 12 outputs a High signal as the brake control signal $BS_A$ for the positive-side opening and closing switch 21A and a Low signal as the brake control signal $BS_B$ for the negative-side opening and closing switch 21B.

As illustrated in FIG. 14, when the power source 11 is in a normal state, the power source 11 does not output the DC voltage in response to the output OFF signal received from the power source control unit 16, i.e., the DC output voltage of the power source 11 is 0 V during the second power source inspection process period. As a result, the electrical path from the positive electrode terminal of the power source 11 to the positive electrode terminal of the brake device 2 via the positive-side opening and closing switch 21A has the same potential as the output voltage of the positive electrode terminal of the power source 11 (in the example illustrated in FIG. 1, 0 V). Thus, since the current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2 is High. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

The contents of the state detection signals $FB_A$ and $FB_B$ in the second power source inspection process in the above-described case where the power source 11 is in a normal state are stored in advance in the abnormality detecting unit 15 so as to be available in the abnormality detection process for the power source 11.

When the "continuing to output the voltage without responding to the output OFF signal" failure occurs in the power source 11, the power source 11 continues to output the DC voltage (e.g., 24 V) even when the output OFF signal is received from the power source control unit 16, as illustrated in FIG. 15. As a result, the electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

As a result, when the power source 11 is in a normal state, the state detection signals $FB_A$ and $FB_B$ during the second power source inspection process period are both High, but when an abnormality occurs in the power source 11, the state detection signals $FB_A$ and $FB_B$ during the second power source inspection process period are both Low. Thus, during the second power source inspection process period, the abnormality detecting unit 15 detects whether or not an abnormality occurs in the power source 11 based on the combination of the contents of the brake control signals $BS_A$ and $BS_B$, the contents of the state detection signals $FB_A$ and $FB_B$ and the contents of the power source control signal CTRP. In the example illustrated in FIG. 15, during the second power source inspection process period, the abnormality detecting unit 15 determines that no abnormality occurs in the power source 11 when the state detection signals $FB_A$ and $FB_B$ are both High, and determines that an abnormality occurs in the power source 11 when the state detection signals $FB_A$ and $FB_B$ are both Low. The abnormality detecting unit 15 outputs the alarm signal when the occurrence of an abnormality in the power source 11 is detected. The alarm signal output from the abnormality detecting unit 15 is sent to, for example, the display part (not illustrated), and the display part, for example, notifies the operator of an "abnormality occurrence in the power source". Examples of the display part include a single display device, a display device attached to the host controller (not illustrated), a display device attached to the motor drive device 100, and a display device attached to a personal computer and a mobile terminal. For example, the alarm signal output from the abnormality detecting unit 15 is sent to, for example, a light-emitting device (not illustrated) such as an LED or a lamp, the light-emitting device notifying the operator of an "abnormality occurrence" by emitting light when receiving the alarm signal. For example, the alarm signal output from the abnormality detecting unit 15 is sent to, for example, the acoustic device (not illustrated), the acoustic device notifying the operator of an "abnormality occurrence in the power source" by emitting a sound such as a voice, a speaker, a buzzer, or a chime when receiving the alarm signal. As a result, the operator can reliably and easily recognize the occurrence of an abnormality in the power source. The operator can also, for example, easily take measures such as replacing components related to the abnormality or removing the cause of the abnormality. The alarm signal output from the abnormality detecting unit 15 may be used for the emergency stop process of the motor drive device 100.

Figure 16:
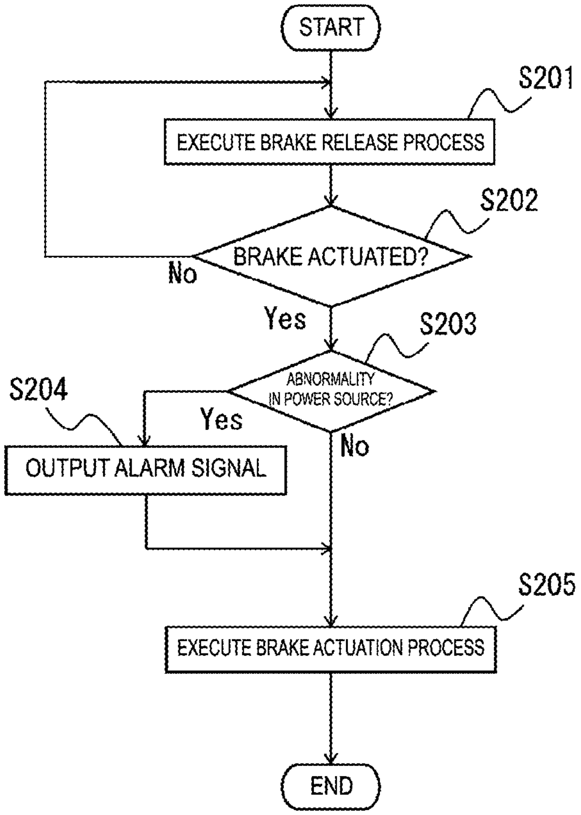
FIG. 16 is a flowchart illustrating an operation flow when actuating the brake of the brake device released from the motor in the brake control device according to the second embodiment of the present disclosure.

FIG. 16 is a flowchart illustrating an operation flow when actuating the brake of the brake device released from the motor in the brake control device according to the second embodiment of the present disclosure.

During the execution period of the brake release process, the second power source inspection process and the brake actuation process, the state detecting unit 14 outputs the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

In step S201, the brake release process is executed. In the brake release process, the brake control unit 12 outputs the brake control signals $BS_A$ and $BS_B$ for controlling the positive-side opening and closing switch 21A and the negative-side opening and closing switch 21B to close. The power source control unit 16 outputs the output ON signal to the power source 11.

In step S202, the brake control unit 12 determines whether or not the brake actuation command has been received from the host controller (not illustrated). When it is determined in step S202 that the brake actuation command has not been received, the process is returned to step S201, and the execution of the brake release process is continued. When it is determined in step S202 that the brake release command has been received, the process proceeds to step S203.

In step S203, the second power source inspection process is executed. In the second power source inspection process, the power source control unit 16 outputs the output OFF signal as the power source control signal CTRP for the power source 11, and the brake control unit 12 outputs the brake control signals $BS_A$ and $BS_B$ for controlling the positive-side opening and closing switch 21A to close and the negative-side opening and closing switch 21B to open. During the second power source inspection process period, the abnormality detecting unit 15 detects whether or not an abnormality occurs in the power source 11 based on the combination of the contents of the brake control signals $BS_A$ and $BS_B$, the contents of the state detection signals $FB_A$ and $FB_B$ and the contents of the power source control signal CTRP.

When the occurrence of an abnormality in the power source 11 is detected in step S203, the process proceeds to step S204, and when the occurrence of an abnormality in the power source 11 is not detected in step S203, the process proceeds to step S205.

In step S204, the abnormality detecting unit 15 outputs the alarm signal to notify the operator of the occurrence of an abnormality in the power source 11. After the execution of step S204, the process proceeds to step S205 to ensure safety by actuating the brake.

In step S205, the brake actuation process is executed. In the brake actuation process, the brake control unit 12 outputs the brake control signals $BS_A$ and $BS_B$ for controlling the positive-side opening and closing switch 21A and the negative-side opening and closing switch 21B to open.

As described above, the brake control device 1 according to the second embodiment of the present disclosure can detect the occurrence of an abnormality in the power source 11. The brake of the brake device 2 actuated on the motor 3 can be released only when no abnormality occurs. Even when an abnormality occurs at the time of releasing the brake of the brake device 2 actuated on the motor 3, the release of the brake can be avoided. It should be noted that the first power source inspection process and the second power source inspection process may be executed in combination, or only one of the processes may also be executed individually. That is, any of the following aspects may be used: "executing the first power source inspection process when transitioning from the brake actuation process to the brake release preparation process, and executing the second power source inspection process when transitioning from the brake release process to the brake actuation process", "executing only the first power source inspection process when transitioning from the brake actuation process to the brake release preparation process", and "executing only the second power source inspection process when transitioning from the brake release process to the brake actuation process".

Subsequently, a third embodiment of the present disclosure is described. In the third embodiment, an opening and closing switch making up an opening and closing unit is provided in one of the electrical path between the positive electrode terminal of the power source and the positive electrode terminal of the brake device, or the electrical path between the negative electrode terminal of the power source and the negative electrode terminal of the brake device.

Figure 17:
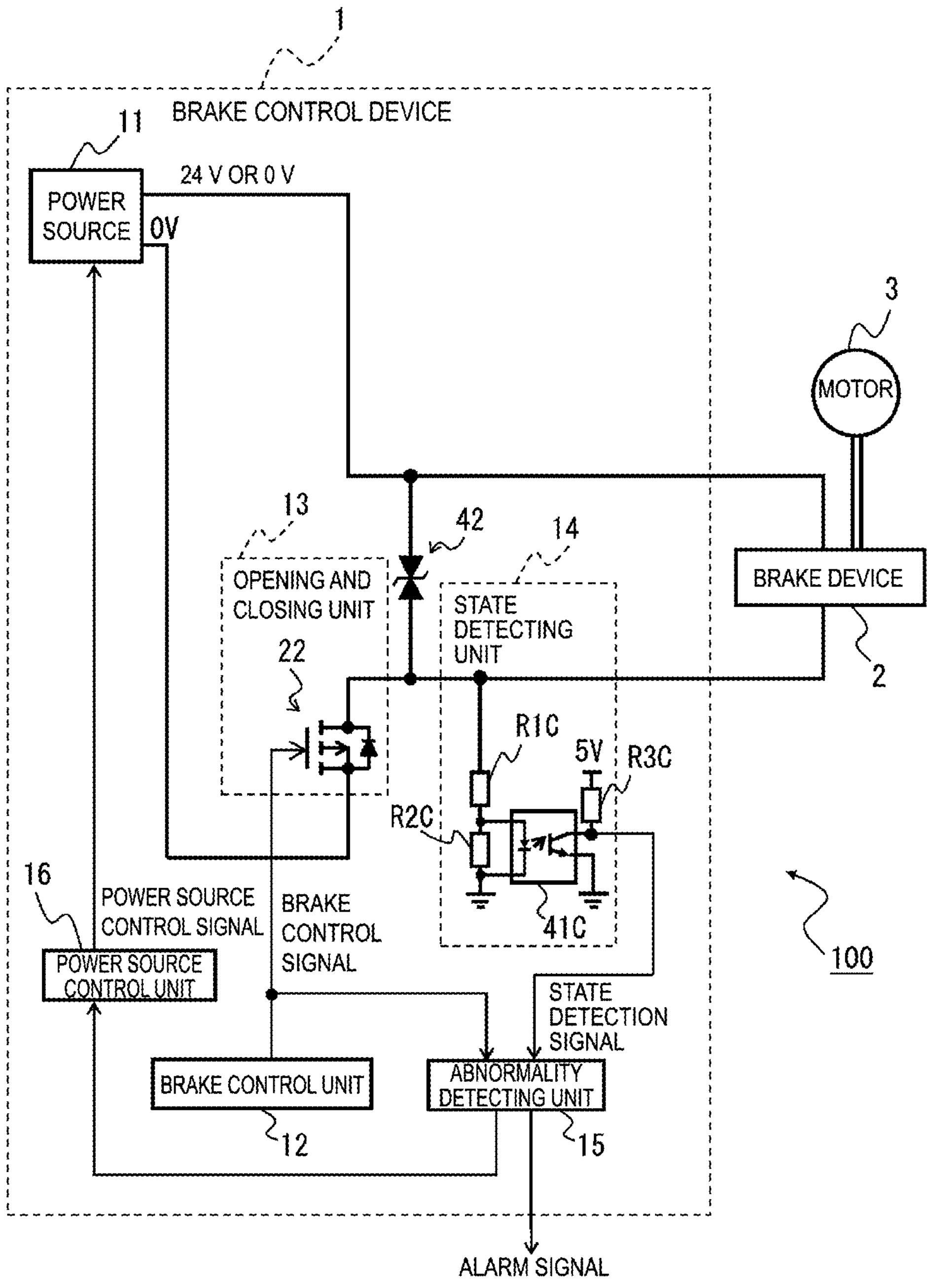
FIG. 17 is a diagram illustrating the brake control device and the motor drive device including the same according to third and fourth embodiments of the present disclosure.

FIG. 17 is a diagram illustrating the brake control device and the motor drive device including the same according to third and fourth embodiments of the present disclosure. FIG. 17 is also applicable to the fourth embodiment described below.

In the third embodiment, the opening and closing unit 13 includes at least one opening and closing switch to open and close one of the electrical path between the positive electrode terminal of the power source 11 and the positive electrode terminal of the brake device 2, and the electrical path between the negative electrode terminal of the power source 11 and the negative electrode terminal of the brake device 2. In the example illustrated in FIG. 17, as an example, the opening and closing unit 13 includes one opening and closing switch 22 to open and close the electrical path between the negative electrode terminal of the power source 11 and the negative electrode terminal of the brake device 2. In the example illustrated in FIG. 17, one opening and closing switch is provided in one of the electrical paths, but two or more opening and closing switches may be provided in one of the electrical paths. For example, two opening and closing switches connected in series may be provided in the electrical path between the negative electrode terminal of the power source 11 and the negative electrode terminal of the brake device 2, and in this case, the two opening and closing switches are controlled to open and close through the same brake control signal BS.

The opening and closing switch 22 is a normally open switch as an example. Examples of the semiconductor switching element making up the opening and closing switch 22 include FETs, IGBTs, thyristors, GTOs, and transistors, but other semiconductor switching elements may also be used. In the following, a case where the opening and closing switch 22 includes a FET is described. It should be noted that in a case where the opening and closing switch 22 includes a thyristor and a GTO, the present embodiment is applied by reading "gate" as "base", "drain" as "anode", and "source" as "cathode". In a case where the opening and closing switch 22 includes a transistor, the present embodiment is applied by reading "gate" as "base", "drain" as "collector", and "source" as "emitter".

The brake control unit 12 outputs a brake control signal BS to open and close the opening and closing switch 22 in the opening and closing unit 13. The brake control signal BS output from the brake control unit 12 is sent to the opening and closing switch 22 and the abnormality detecting unit 15. Contents of a control process executed by the brake control unit 12 in the third embodiment of the present disclosure are divided into two processes, i.e., the brake actuation process and the brake release process, and the brake control signal BS corresponding to each process is sent to the opening and closing switch 22. The brake actuation process and the brake release process in the brake control device 1 will be described in detail below.

The state detecting unit 14 includes, for example, a photocoupler 41C, a voltage divider resistors R1C and R2C, and a pull-up resistor R3C for generating a state detection signal FB indicating a potential state of an electrical path between a drain of the opening and closing switch 22 in the opening and closing unit 13 and the negative electrode terminal of the brake device 2. One end of the voltage divider resistor R1C is connected to the electrical path connecting the negative electrode terminal of the brake device 2 and the drain of the opening and closing switch 22, and the other end of the voltage divider resistor R1C is connected to one end of the voltage divider resistor R2C. The other end of the voltage divider resistor R2C is grounded. A light-emitting element in the photocoupler 41C is connected in parallel to the voltage divider resistor R2C. One end of a light-receiving element in the photocoupler 41C is connected to the pull-up resistor R3C, and the other end of the light-receiving element in the photocoupler 41C is grounded. It should be noted that while the state detecting unit 14 includes a photocoupler and various resistors in the example illustrated in FIG. 17, the state detecting unit 14 may include a power source that outputs a reference voltage for isolating the High state and the Low state (the reference voltage may be generated using a method such as resistor division instead of using the power source), and a comparator that compares the reference voltage and the voltage applied to the voltage divider resistor R2C and outputs a High signal or a Low signal based on a result of the comparison.

The abnormality detecting unit 15 detects whether or not an abnormality occurs based on the combination of the contents of the brake control signal BS and the contents of the state detection signal FB. The abnormality detection process of the abnormality detecting unit 15 will be described in detail below. The abnormality detecting unit 15 has a function of outputting an alarm signal when the occurrence of an abnormality is detected.

An abnormality detected by the abnormality detecting unit 15 includes a short circuit failure of the opening and closing switch 22, a short circuit of a cable between the opening and closing switch 22 and the brake device 2 and an external circuit, and a failure of the state detecting unit 14. For example, in a case where the opening and closing switch 22 does not respond to a received open command due to a failure of a drive circuit of the opening and closing switch 22, causing the opening and closing switch 22 to remain in the closed state, the failure can be regarded as "a short circuit failure of the opening and closing switch 22".

The power source 11, the power source control unit 16, the brake device 2, and the motor 3 are as described in detail in the first embodiment.

Subsequently, a brake control process and a state detection process in the brake control device 1 according to the third embodiment of the present disclosure are described.

Figure 18B:
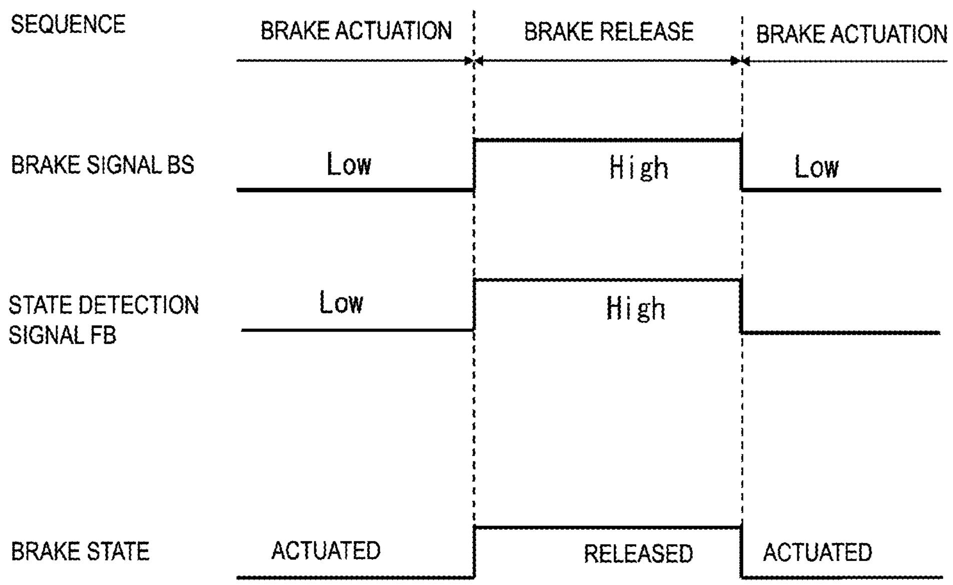
FIG. 18B is a diagram for describing each signal and brake state in a normal state in the brake control device 1 according to the third embodiment of the present disclosure, and a timing chart illustrating each signal and brake state.

FIG. 18A is a diagram for describing each signal and brake state in a normal state in the brake control device 1 according to the third embodiment of the present disclosure, and a table illustrating each signal and brake state. FIG. 18B is a diagram for describing each signal and brake state in a normal state in the brake control device 1 according to the third embodiment of the present disclosure, and a timing chart illustrating each signal and brake state. It should be noted that the "brake control signal" is denoted as "brake signal" in FIGS. 18A and 18B for the sake of simplifying the drawings.

The contents of the control process executed in the brake control device 1 in the third embodiment of the present disclosure are divided into two processes, i.e., the brake actuation process and the brake release process. The state where the brake of the brake device 2 on the motor 3 is actuated is achieved by executing the brake actuation process. The state where the brake of the brake device 2 on the motor 3 is released is achieved by executing the brake release process. When releasing the brake actuated on the motor 3, the brake actuation process is terminated the brake release process is executed. When actuating the brake on the motor 3 from the state where the brake on the motor 3 is released, the brake release process is terminated to execute the brake actuation process. In the following description, the opening and closing switch 22 is a normally open switch as an example.

In the brake actuation process, the brake control unit 12 outputs the brake control signal BS for controlling the opening and closing switch 22 to open. Since the opening and closing switch 22 is a normally open switch, the brake control unit 12 outputs a Low signal as the brake control signal BS for the opening and closing switch 22. When no abnormality occurs in the opening and closing switch 22 and devices related thereto, the power source control unit 16 outputs the output ON signal to the power source 11 since the abnormality detecting unit 15 does not detect the occurrence of an abnormality, and consequently the DC voltage (in the example illustrated in FIG. 17, the DC voltage of 24 V) is output from the power source 11. Since the opening and closing switch 22 is opened through the brake actuation process, the electrical path from the positive electrode terminal of the power source 11 to the negative electrode terminal of the power source 11 via the brake device 2 is blocked. Accordingly, when no abnormality occurs in the opening and closing switch 22 and the devices related thereto, the voltage of the power source 11 is not applied to the brake coil 115 of the brake device 2 due to the brake control unit 12 executing the brake actuation process. This gives rise to the state where the brake is actuated on the motor 3. Since the opening and closing switch 22 is opened, the current that flows out from the positive electrode terminal of the power source 11 flows through the brake device 2 and the voltage divider resistors R1C and R2C. Thus, the light-emitting element in the photocoupler 41C emits light, and consequently an output side of the photocoupler 41C is Low. Thus, the state detection signal FB indicating the potential state of the electrical path between the drain of the opening and closing switch 22 in the opening and closing unit 13 and the negative electrode terminal of the brake device 2 is Low.

In the brake release process, the brake control unit 12 outputs the brake control signal BS for controlling the opening and closing switch 22 to close. Since the opening and closing switch 22 is a normally open switch, the brake control unit 12 outputs a High signal as the brake control signal BS for the opening and closing switch 22. When no abnormality occurs in the opening and closing switch 22 and the devices related thereto, the power source control unit 16 outputs the output ON signal to the power source 11 since the abnormality detecting unit 15 does not detect the occurrence of an abnormality, and consequently, the DC voltage (in the example illustrated in FIG. 1, the DC voltage of 24 V) is output from the power source 11. Since the opening and closing switch 22 is closed through the brake release process, the electrical path from the positive electrode terminal of the power source 11 to the negative electrode terminal of the power source 11 via the brake device 2 is formed. Accordingly, when no abnormality occurs in the opening and closing switch 22 and the devices related thereto, the voltage of the power source 11 is applied to the brake coil 115 of the brake device 2 due to the brake release process being executed. This gives rise to the state where the brake on the motor 3 is released. The electrical path from the negative electrode terminal of the brake device 2 to the negative electrode terminal of the power source 11 via the opening and closing switch 22 has the same potential as 0 V, which is the potential of the negative electrode terminal of the power source 11. Thus, since the current does not flow through the voltage divider resistors R1C and R2C in the state detecting unit 14, the light-emitting element in the photocoupler 41C does not emit light, and consequently the output side of the photocoupler 41C is High. Thus, the state detection signal FB indicating the potential state of the electrical path between the drain of the opening and closing switch 22 in the opening and closing unit 13 and the negative electrode terminal of the brake device 2 is High.

The contents of the state detection signal FB in the brake actuation process and the brake release process in the above-described case where there is no abnormality in the opening and closing switch 22 and the devices related thereto, i.e., in the normal state, are stored in advance in the abnormality detecting unit 15 so as to be available for the abnormality detection process.

Figure 19B:
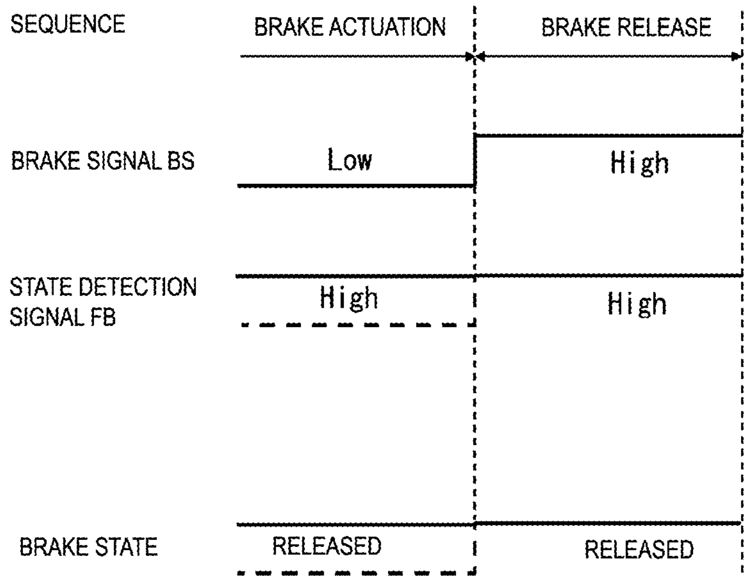
FIG. 19B is a diagram for describing each signal and brake state when the opening and closing switch experiences a short circuit failure in the brake control device in the case where a constant voltage is output without the output control of the power source, and a timing chart illustrating each signal and brake state.

FIG. 19A is a diagram for describing each signal and brake state when the opening and closing switch experiences a short circuit failure in the brake control device in the case where a constant voltage is output without the output control of the power source, and a table illustrating each signal and brake state. FIG. 19B is a diagram for describing each signal and brake state when the opening and closing switch experiences a short circuit failure in the brake control device in the case where a constant voltage is output without the output control of the power source, and a timing chart illustrating each signal and brake state. It should be noted that the "brake control signal" is denoted as "brake signal" in FIGS. 19A and 19B for the sake of simplifying the drawings.

FIGS. 19A and 19B illustrate each signal and brake state when a short circuit failure occurs in the opening and closing switch 22 under the assumption that the power source 11 is not an output controllable power source (i.e., a power source with a variable output), but a power source that outputs a constant voltage (e.g., 24 V). When the opening and closing switch 22 experiences a short circuit failure, since the opening and closing switch 22 experiences a short circuit failure regardless of the Low signal being the open command being output as the brake control signal BS for the opening and closing switch 22, the opening and closing switch 22 is caused to be into the closed state, during the brake actuation process period. Accordingly, the electrical path from the positive electrode terminal of the power source 11 to the negative electrode terminal of the power source 11 via the brake device 2 and the opening and closing switch 22 is formed. As a result, the voltage of the power source 11 is applied to the brake device 2, giving rise to the state where the brake on the motor 3 is released. As a result, when the short circuit failure of the opening and closing switch 22 occurs during the execution of the brake release preparation process, there is the risk of the state being caused where the brake that is normally actuated is released. The electrical path from the negative electrode terminal of the brake device 2 to the drain of the opening and closing switch 22 has the same potential as 0 V, which is the potential of the negative electrode terminal of the power source 11. Thus, since the current does not flow through the voltage divider resistors R1C and R2C in the state detecting unit 14, the light-emitting element in the photocoupler 41C does not emit light, and consequently the output side of the photocoupler 41C is High. Thus, the state detection signal FB indicating the potential state of the electrical path between the drain of the opening and closing switch 22 in the opening and closing unit 13 and the negative electrode terminal of the brake device 2 is High. As a result, during the brake actuation process period, the state detection signal FB is Low when no abnormality occurs in the opening and closing switch 22 and the devices related thereto, but the state detection signal FB is High when the short circuit failure of the opening and closing switch 22 occurs. During the execution of the brake actuation process, the abnormality detecting unit 15 detects whether or not an abnormality occurs based on the combination of the contents of the brake control signal BS and the contents of the state detection signal FB. More specifically, when transitioning from the brake actuation process to the brake release process, the abnormality detecting unit 15 determines that no abnormality occurs when the brake control signal BS is Low and the state detection signal FB is Low during the execution of the brake actuation process immediately before the brake release process, and the brake control unit 12 terminates the brake actuation process and executes the brake release process. When transitioning from the brake actuation process to the brake release process, the abnormality detecting unit 15 determines that an abnormality occurs (i.e., the short circuit failure of the opening and closing switch 22) when the brake control signal BS is Low and the state detection signal FB is High during the execution of the brake actuation process immediately before the brake release process.

Figure 20B:
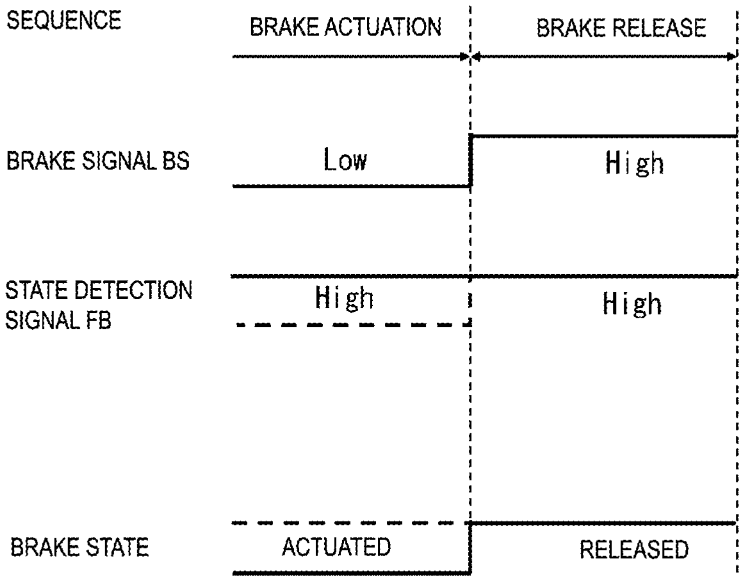
FIG. 20B is a diagram for describing each signal and brake state when the opening and closing switch experiences a short circuit failure in the brake control device including the output controllable power source according to the third embodiment of the present disclosure, and a timing chart illustrating each signal and brake state.

FIG. 20A is a diagram for describing each signal and brake state when the opening and closing switch experiences a short circuit failure in the brake control device including an output controllable power source according to the third embodiment of the present disclosure, and a table illustrating each signal and brake state. FIG. 20B is a diagram for describing each signal and brake state when the opening and closing switch experiences a short circuit failure in the brake control device including the output controllable power source according to the third embodiment of the present disclosure, and a timing chart illustrating each signal and brake state. It should be noted that the "brake control signal" is denoted as "brake signal" in FIGS. 20A and 20B for the sake of simplifying the drawings.

As described above with reference to FIGS. 19A and 19B, during the execution of the brake actuation process, the abnormality detecting unit 15 determines that an abnormality occurs (i.e., the short circuit failure of the opening and closing switch 22) when the brake control signal BS is Low and the state detection signal FB is High. When the short circuit failure of the opening and closing switch 22 occurs during the brake actuation process period, the abnormality detecting unit 15 outputs the alarm signal since the state occurs where the brake that is normally actuated is released. As illustrated in FIG. 20A, in a case where the abnormality detecting unit 15 detects the occurrence of an abnormality during the execution of the brake actuation process immediately before the brake release process when transitioning from the brake actuation process to the brake release process, the power source control unit 16 outputs the output OFF signal for controlling the power source 11 so as not to output the voltage as the power source control signal CTRP for the output controllable power source 11. As a result, the power source 11 does not output the DC voltage, i.e., the DC output voltage of the power source 11 is 0 V, i.e., the voltage of the power source 11 is not applied to the brake coil 115 of the brake device 2. This gives rise to the state where the brake is actuated on the motor 3. As a result, it is possible to avoid releasing the brake during the occurrence of an abnormality (when the opening and closing switch 22 experiences a short circuit failure) can be avoided.

As described above, the brake control device 1 according to the third embodiment of the present disclosure allows the brake of the brake device 2 actuated on the motor 3 to be released only when no abnormality occurs. Even when an abnormality occurs at the time of releasing the brake of the brake device 2 actuated on the motor 3, the release of the brake can be avoided.

Subsequently, the fourth embodiment of the present disclosure is described. The power source 11 in the third embodiment is an output controllable power source based on the power source control signal CTRP from the power source control unit 16, and is therefore more likely to have a failure than a power source that outputs a constant voltage at all times. The power source 11 of the fourth embodiment of the present disclosure enables detection of the occurrence of an abnormality. The occurrence of an abnormality in the power source can be detected through a power source inspection process executed between the brake actuation process and the brake release process.

FIG. 21A is a diagram illustrating an example of each signal and brake state in the brake control device having a power source inspection function according to the fourth embodiment of the present disclosure, and an example of each signal and brake state in a normal state of the power source. FIG. 21B is a diagram illustrating an example of each signal and brake state in the brake control device having the power source inspection function according to the fourth embodiment of the present disclosure, and an example of each signal and brake state in an abnormal state of the power source. In FIGS. 21A and 21B, for the sake of simplifying the description, it is assumed that no abnormality occurs, such as the short circuit failure of the opening and closing switch 22 that may be detected during the execution of the brake actuation process and the brake release process. The "brake control signal" is denoted as "brake signal" in FIGS. 21A and 21B for the sake of simplifying the drawings.

The power source inspection process is executed before executing the brake actuation process when transitioning from the brake actuation process to the brake release process. During the power source inspection process period, the power source control unit 16 outputs the output OFF signal as the power source control signal CTRP for the power source 11, and the brake control unit 12 outputs the brake control signal BS for controlling the opening and closing switch 22 to open similar to as in the brake actuation process. Since the opening and closing switch 22 is a normally open switch, the brake control unit 12 outputs a Low signal as the brake control signal BS for the opening and closing switch 22.

As illustrated in FIG. 21A, when the power source 11 is in a normal state, the power source 11 does not output the DC voltage in response to the output OFF signal received from the power source control unit 16, i.e., the DC output voltage of the power source 11 is 0 V during the power source inspection process period. As a result, the electrical path from the positive electrode terminal of the power source 11 to the negative electrode terminal of the power source 11 via the brake device 2 and the opening and closing switch 22 has the same potential as 0 V, which is the potential of the positive electrode terminal and the negative electrode terminal of the power source 11. Thus, the light-emitting element in the photocoupler 41C does not emit light because the current does not flow through the voltage divider resistors R1C and R2C in the state detecting unit 14, and consequently the output side of the photocoupler 41B is High. Thus, the state detection signal FB indicating the potential state of the electrical path between the drain of the opening and closing switch 22 in the opening and closing unit 13 and the negative electrode terminal of the brake device 2 is High.

The contents of the state detection signal FB in the power source inspection process in the above-described case where the power source 11 is in a normal state are stored in advance in the abnormality detecting unit 15 so as to be available for the abnormality detection process for the power source 11.

When the "continuing to output the voltage without responding to the output OFF signal" failure occurs in the power source 11, the power source 11 continues to output the DC voltage (e.g., 24 V) even when the output OFF signal is received from the power source control unit 16, as illustrated in FIG. 21B. As a result, the electrical path from the positive electrode terminal of the power source 11 to the positive electrode terminal of the brake device 2 has the same potential as the voltage output by the positive electrode terminal of the power source 11 (in the example illustrated in FIG. 1, 24 V). Since the electrical path from the negative electrode terminal of the brake device 2 to the negative electrode terminal of the power source 11 is blocked by the opening and closing switch 22 in the open state, the current that flows out from the positive electrode terminal of the power source 11 flows through the brake device 2 and the voltage divider resistors R1C and R2C. Thus, the light-emitting element in the photocoupler 41C emits light, and consequently the output side of the photocoupler 41C is Low. Thus, the state detection signal FB indicating the potential state of the electrical path between the drain of the opening and closing switch 22 in the opening and closing unit 13 and the negative electrode terminal of the brake device 2 is Low.

As a result, when the power source 11 is in a normal state, the state detection signal FB during the power source inspection process period is High, but when an abnormality occurs in the power source 11, the state detection signal FB during the power source inspection process period is Low. Thus, during the power source inspection process period, the abnormality detecting unit 15 detects whether or not an abnormality occurs in the power source 11 based on the combination of the contents of the brake control signal BS, the contents of the state detection signal FB and the contents of the power source control signal CTRP. In the example illustrated in FIG. 17, during the power source inspection process period, the abnormality detecting unit 15 determines that no abnormality occurs in the power source 11 when the state detection signal FB is High, and determines that an abnormality occurs in the power source 11 when the state detection signal FB is Low. The abnormality detecting unit 15 outputs the alarm signal when the occurrence of an abnormality in the power source 11 is detected. The alarm signal output from the abnormality detecting unit 15 is sent to, for example, the display part (not illustrated), and the display part, for example, notifies the operator of an "abnormality occurrence in the power source". Examples of the display part include a single display device, a display device attached to the motor drive device 100, a display device attached to the host controller (not illustrated), and a display device attached to a personal computer and a mobile terminal. For example, the alarm signal output from the abnormality detecting unit 15 is sent to, for example, a light-emitting device (not illustrated) such as an LED or a lamp, the light-emitting device notifying the operator of an "abnormality occurrence in the power source" by emitting light when receiving the alarm signal. For example, the alarm signal output from the abnormality detecting unit 15 is sent to, for example, the acoustic device (not illustrated), the acoustic device notifying the operator of an "abnormality occurrence in the power source" by emitting a sound such as a voice, a speaker, a buzzer, or a chime when receiving the alarm signal. As a result, the operator can reliably and easily recognize the occurrence of an abnormality in the power source. The operator can also, for example, easily take measures such as replacing components related to the abnormality or removing the cause of the abnormality. The alarm signal output from the abnormality detecting unit 15 may be used for the emergency stop process of the motor drive device 100.

Figure 22:
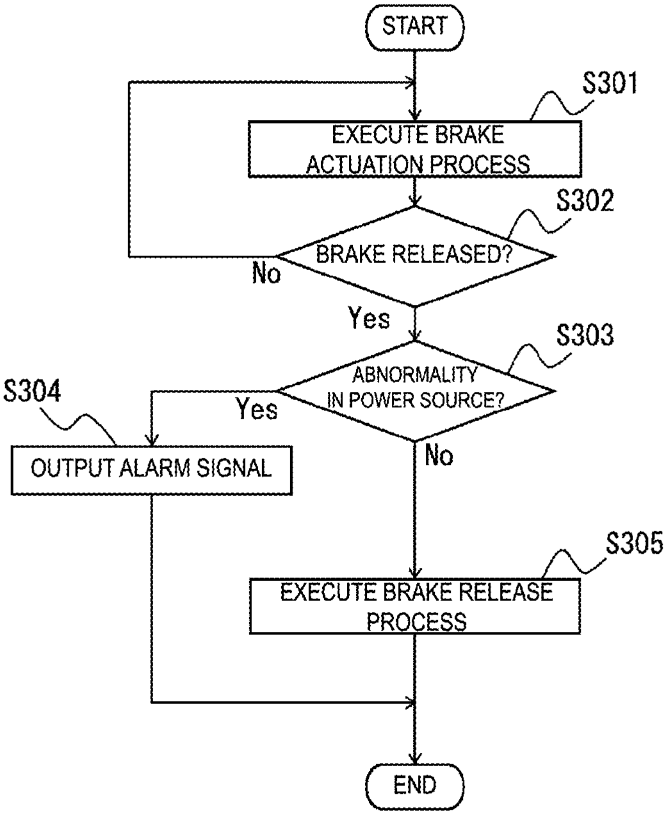
FIG. 22 is a flowchart illustrating an operation flow when releasing the brake of the brake device actuated on the motor in the brake control device according to the fourth embodiment of the present disclosure.

FIG. 22 is a flowchart illustrating an operation flow when releasing the brake of the brake device actuated on the motor in the brake control device according to the fourth embodiment of the present disclosure.

During the execution period of the brake actuation process, the power source inspection process and the brake release process, the state detecting unit 14 outputs the state detection signal FB indicating the potential state of the electrical path between the drain of the opening and closing switch 22 in the opening and closing unit 13 and the negative electrode terminal of the brake device 2.

In step S301, the brake actuation process is executed. In the brake actuation process, the brake control unit 12 outputs the brake control signal BS for controlling the opening and closing switch 22 to open. The power source control unit 16 outputs the output ON signal to the power source 11.

In step S302, the brake control unit 12 determines whether or not the brake release command has been received from the host controller (not illustrated). When it is determined in step S302 that the brake release command has not been received, the process is returned to step S301, and the execution of the brake actuation process is continued. When it is determined in step S302 that the brake release command has been received, the process proceeds to step S303.

In step S303, the power source inspection process is executed. In the power source inspection process, the power source control unit 16 outputs the output OFF signal as the power source control signal CTRP for the power source 11, and the brake control unit 12 outputs the brake control signal BS for controlling the opening and closing switch 22 to open. During the power source inspection process period, the abnormality detecting unit 15 detects whether or not an abnormality occurs in the power source 11 based on the combination of the contents of the brake control signal BS, the contents of the state detection signal FB and the contents of the power source control signal CTRP.

When the occurrence of an abnormality in the power source 11 is detected in step S303, the process proceeds to step S304. In step S304, the abnormality detecting unit 15 outputs the alarm signal to notify the operator of the occurrence of an abnormality in the power source 11. Thereafter, the processing is terminated. That is, in this case, the brake control unit 12 continues the execution of the brake actuation process, and does not execute the brake release process.

When the occurrence of an abnormality in the power source 11 is not detected in step S303, the process proceeds to step S305. In step S305, the brake release process is executed. In the brake release process, the brake control unit 12 outputs the brake control signal BS for controlling the opening and closing switch 22 to close. The brake release process is executed As a result in step S305 when the occurrence of an abnormality is not detected in step S302 during the execution of the brake actuation process, and thus the brake can be safely released.

Subsequently, a fifth embodiment of the present disclosure is described. The fifth embodiment of the present disclosure further includes, as compared to the second embodiment, a brake lock switch that short-circuits between the input terminals of the brake device 2 when an abnormality occurs, and a brake lock switch control unit including the brake lock switch.

Figure 23:
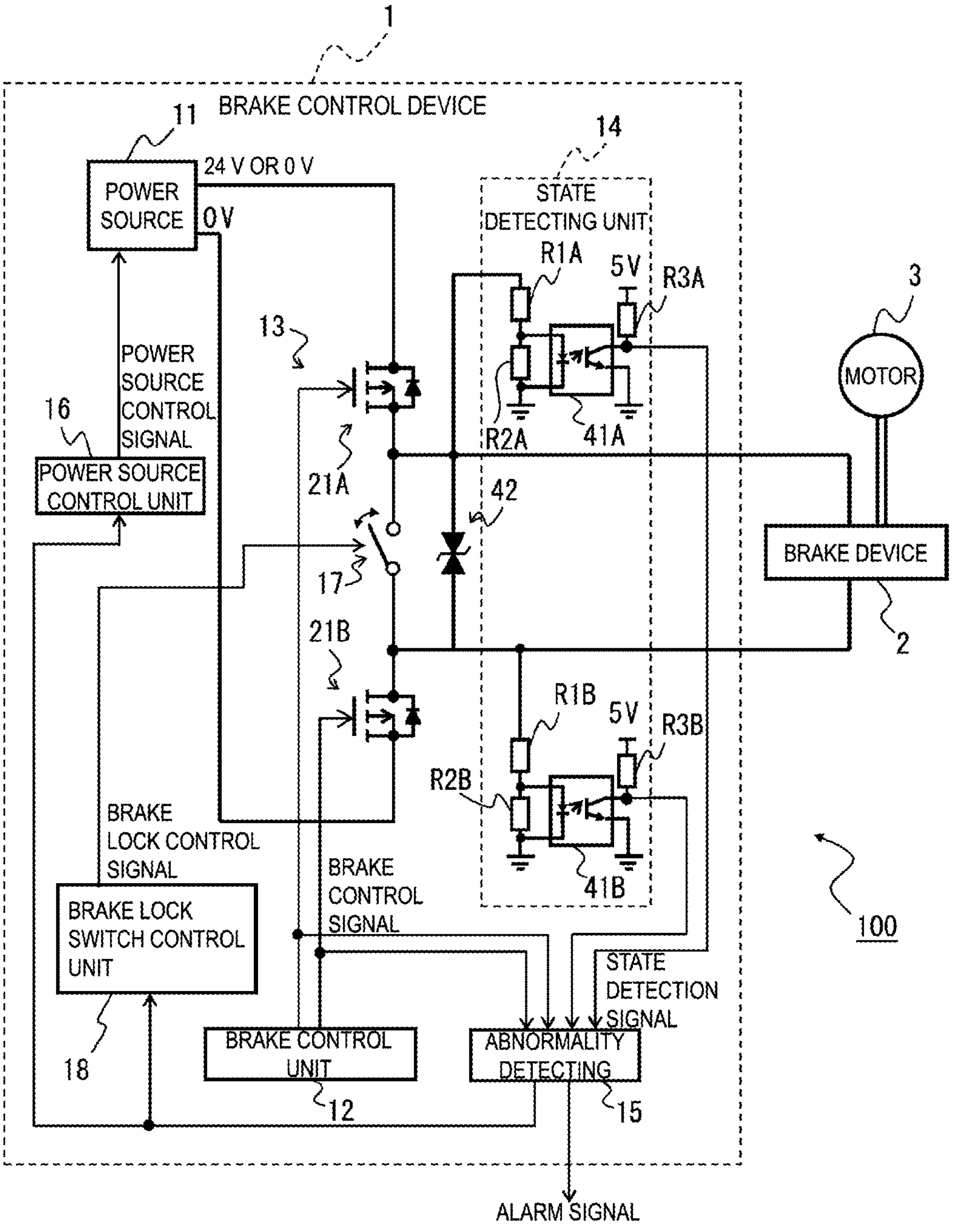
FIG. 23 is a diagram illustrating a brake control device and a motor drive device including the same according to a fifth embodiment of the present disclosure.

FIG. 23 is a diagram illustrating a brake control device and a motor drive device including the same according to the fifth embodiment of the present disclosure.

A brake control device 1 according to the fifth embodiment further includes a brake lock switch 17 and a brake lock switch control unit 18 in the brake control device 1 according to the second embodiment illustrated in FIG. 1.

The brake lock switch 17 is connected between the input terminals of the brake device 2 (i.e., between the positive electrode terminal and the negative electrode terminal of the brake device 2) so as to be connected in parallel to the brake device 2, and opens and closes the electrical path in response to a brake lock control signal received from the brake lock switch control unit 18. The brake lock switch 17 may include a semiconductor switching element, or a mechanical switch such as a relay. Examples of the semiconductor switching element making up the brake lock switch 17 include FETs, IGBTs, thyristors, GTOs, and transistors, but other semiconductor switching elements may also be used. In the example illustrated in FIG. 23, the brake lock switch 17 is a normally off relay as an example.

As the brake lock control signal for the brake lock switch 17, the brake lock switch control unit 18 outputs a close signal for controlling the brake lock switch 17 to close when the occurrence of an abnormality is detected by the abnormality detecting unit 15, and outputs an open signal for controlling the brake lock switch 17 to open when the occurrence of an abnormality is not detected by the abnormality detecting unit 15.

The brake lock switch control unit 18 is provided in an arithmetic processing device (processor) provided in the brake control device 1. The brake lock switch control unit 18 provided in the arithmetic processing device is, for example, a function module achieved through a computer program executed by the processor. For example, in a case where the brake lock switch control unit 18 is assembled in the form of a computer program, the function of the brake lock switch control unit 18 can be achieved by operating the arithmetic processing device in accordance with the computer program. The computer program for executing the processing of the brake lock switch control unit 18 may be provided in the form of being recorded on a computer-readable recording medium such as a semiconductor memory, a magnetic recording medium, or an optical recording medium. Alternatively, the brake lock switch control unit 18 may be achieved as a semiconductor integrated circuit in which a computer program for achieving the function is written.

FIGS. 24A to 27 are diagrams illustrating an example of each signal and brake state in the brake control device according to the fifth embodiment of the present disclosure. In FIGS. 24A to 27, the "brake control signal" is denoted as "brake signal" and "power source-ON-control process" is denoted as "power source control" for the sake of simplifying the drawings. In the following description, the positive-side opening and closing switch 21A and the negative-side opening and closing switch 21B are normally open switches as an example.

FIG. 24A is a diagram illustrating an example of each signal and brake state in the brake control device according to the fifth embodiment of the present disclosure, and an example of each signal and brake state in a normal state. FIG. 24B is a diagram illustrating an example of each signal and brake state in the brake control device according to the fifth embodiment of the present disclosure, and an example of each signal and brake state in an abnormal state of the power source. FIG. 25A is a diagram illustrating an example of each signal and brake state in the brake control device according to the fifth embodiment of the present disclosure, and an example of each signal and brake state when the negative-side opening and closing switch experiences a short circuit failure. FIG. 25B is a diagram illustrating an example of each signal and brake state in the brake control device according to the fifth embodiment of the present disclosure, and an example of each signal and brake state when the positive-side opening and closing switch experiences a short circuit failure. FIG. 26A is a diagram illustrating an example of each signal and brake state in the brake control device according to the fifth embodiment of the present disclosure, and an example of each signal and brake state in a case where a first protecting operation process is performed when the positive-side opening and closing switch and the negative-side opening and closing switch experience a short circuit failure. FIG. 26B is a diagram illustrating an example of each signal and brake state in the brake control device according to the fifth embodiment of the present disclosure, and an example of each signal and brake state in a case where a second protecting operation process is performed when the positive-side opening and closing switch and the negative-side opening and closing switch experience a short circuit failure. FIG. 27 is a diagram illustrating an example of each signal and brake state in the brake control device according to the fifth embodiment of the present disclosure, and an example of each signal and brake state in a case where a third protecting operation process is performed when the positive-side opening and closing switch and the negative-side opening and closing switch experience a short circuit failure.

Contents of the control process in the brake control device 1 in the fifth embodiment of the present disclosure is divided into five processes, i.e., the brake actuation process, a first brake release preparation process, a power source-ON-control process, a second brake release preparation process and the brake release process, and the brake control signal, the power source control signal and the brake lock control signal corresponding to each process are generated. During the execution of the brake actuation process, the first brake release preparation process, the power source-ON-control process, the second brake release preparation process, and the brake release process, the state detecting unit 14 generates the state detection signal $FB_A$ indicating the potential state of the electrical path between the source of the positive-side opening and closing switch 21A in the opening and closing unit 13 and the positive electrode terminal of the brake device 2, and the state detection signal $FB_B$ indicating the potential state of the electrical path between the drain of the negative-side opening and closing switch 21B in the opening and closing unit 13 and the negative electrode terminal of the brake device 2.

First, a case where there is no abnormality in each device in the brake control device 1 according to the fifth embodiment of the present disclosure is described with reference to FIG. 24A.

In the brake actuation process, the power source control unit 16 outputs the output OFF signal, the brake control unit 12 outputs the brake control signals $BS_A$ and $BS_B$ for controlling the positive-side opening and closing switch 21A and the negative-side opening and closing switch 21B to open, and the brake lock switch control unit 18 outputs the brake lock control signal for controlling the brake lock switch 17 to open. Since the positive-side opening and closing switch 21A and the negative-side opening and closing switch 21B are normally open switches, the brake control unit 12 outputs a Low signal as the brake control signal $BS_A$ for the positive-side opening and closing switch 21A and a Low signal as the brake control signal $BS_B$ for the negative-side opening and closing switch 21B. The power source 11 that has received the output OFF signal does not output the DC voltage, i.e., the DC output voltage of the power source 11 is 0 V. Since the positive-side opening and closing switch 21A and the negative-side opening and closing switch 21B are opened through the brake actuation process, the electrical path from the positive electrode terminal of the power source 11 to the negative electrode terminal of the power source 11 via the brake device 2 is blocked. Accordingly, when no abnormality occurs in each device in the brake control device 1, the brake control unit 12 executes the brake actuation process, and thus the voltage of the power source 11 is not applied to the brake coil 115 of the brake device 2. This gives rise to the state where the brake is actuated on the motor 3. Since no current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both High.

The first brake release preparation process is executed after the brake actuation process when transitioning from the brake actuation process to the brake release process. During the first brake release preparation process period, the power source control unit 16 outputs the output OFF signal as the power source control signal CTRP for the power source 11, the brake control unit 12 outputs the brake control signals $BS_A$ and $BS_B$ for controlling the positive-side opening and closing switch 21A to close and the negative-side opening and closing switch 21B to open, and the brake lock switch control unit 18 outputs the brake lock control signal for controlling the brake lock switch 17 to open. Since the positive-side opening and closing switch 21A and the negative-side opening and closing switch 21B are normally open switches, the brake control unit 12 outputs a High signal as the brake control signal $BS_A$ for the positive-side opening and closing switch 21A and a Low signal as the brake control signal $BS_B$ for the negative-side opening and closing switch 21B. The power source 11 that has received the output OFF signal does not output the DC voltage, i.e., the DC output voltage of the power source 11 is 0 V. Since the negative-side opening and closing switch 21B is opened, the electrical path from the positive electrode terminal of the power source 11 to the negative electrode terminal of the power source 11 via the brake device 2 is blocked. Accordingly, when no abnormality occurs in each device in the brake control device 1, a first brake actuation process is executed, and thus the voltage of the power source 11 is not applied to the brake coil 115 of the brake device 2. This gives rise to the state where the brake is actuated on the motor 3. Since no current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both High. As a result, when no abnormality occurs in each device in the brake control device 1, the state detection signals $FB_A$ and $FB_B$ during the first brake release preparation process period are the same as the state detection signals $FB_A$ and $FB_B$ during the brake actuation process period.

The power source-ON-control process is executed after the first brake release preparation process when transitioning from the brake actuation process to the brake release process. During the power source-ON-control process period, the power source control unit 16 outputs the output ON signal as the power source control signal CTRP for the power source 11, the brake control unit 12 outputs the brake control signals $BS_A$ and $BS_B$ for controlling the positive-side opening and closing switch 21A to close and the negative-side opening and closing switch 21B to open, and the brake lock switch control unit 18 outputs the brake lock control signal for controlling the brake lock switch 17 to open. Since the positive-side opening and closing switch 21A and the negative-side opening and closing switch 21B are normally open switches, the brake control unit 12 outputs a High signal as the brake control signal $BS_A$ for the positive-side opening and closing switch 21A and a Low signal as the brake control signal $BS_B$ for the negative-side opening and closing switch 21B. The DC voltage (in the example illustrated in FIG. 23, the DC voltage of 24 V) is output from the power source 11 that has received the output ON signal. Since the positive-side opening and closing switch 21A is closed, but the negative-side opening and closing switch 21B is opened, the electrical path from the positive electrode terminal of the power source 11 to the negative electrode terminal of the power source 11 via the brake device 2 is blocked. Accordingly, when no abnormality occurs in each device in the brake control device 1, the voltage of the power source 11 is not applied to the brake coil 115 of the brake device 2. This gives rise to the state where the brake is actuated on the motor 3. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 23, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

The second brake release preparation process is executed after the power source-ON-control when transitioning from the brake actuation process to the brake release process. During the second brake release preparation process period, the power source control unit 16 outputs the output ON signal as the power source control signal CTRP for the power source 11, the brake control unit 12 outputs the brake control signals $BS_A$ and $BS_B$ for controlling the positive-side opening and closing switch 21A and the negative-side opening and closing switch 21B to open, and the brake lock switch control unit 18 outputs the brake lock control signal for controlling the brake lock switch 17 to open. Since the positive-side opening and closing switch 21A and the negative-side opening and closing switch 21B are normally open switches, the brake control unit 12 outputs a Low signal as the brake control signal $BS_A$ for the positive-side opening and closing switch 21A and a Low signal as the brake control signal $BS_B$ for the negative-side opening and closing switch 21B. The DC voltage (in the example illustrated in FIG. 23, the DC voltage of 24 V) is output from the power source 11 that has received the output ON signal. Since the positive-side opening and closing switch 21A and the negative-side opening and closing switch 21B are opened, the electrical path from the positive electrode terminal of the power source 11 to the negative electrode terminal of the power source 11 via the brake device 2 is blocked. Accordingly, when no abnormality occurs in each device in the brake control device 1, the voltage of the power source 11 is not applied to the brake coil 115 of the brake device 2. This gives rise to the state where the brake is actuated on the motor 3. Since no current flows through the voltage divider resistors R1A and R2A and the voltage divider resistors R1B and R2B in the state detecting unit 14, the light-emitting elements in the photocouplers 41A and 41B do not emit light, and consequently the output sides of the photocouplers 41A and 41B are High. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both High.

The brake release process is executed after the second brake release preparation process when transitioning from the brake actuation process to the brake release process. During the brake release process period, the power source control unit 16 outputs the output ON signal as the power source control signal CTRP for the power source 11, the brake control unit 12 outputs the brake control signals $BS_A$ and $BS_B$ for controlling the positive-side opening and closing switch 21A and the negative-side opening and closing switch 21B to close, and the brake lock switch control unit 18 outputs the brake lock control signal for controlling the brake lock switch 17 to open. Since the positive-side opening and closing switch 21A and the negative-side opening and closing switch 21B are normally open switches, the brake control unit 12 outputs a High signal as the brake control signal $BS_A$ for the positive-side opening and closing switch 21A and a High signal as the brake control signal $BS_B$ for the negative-side opening and closing switch 21B. When no abnormality occurs in each device in the brake control device 1, the DC voltage (in the example illustrated in FIG. 23, the DC voltage of 24 V) is output from the power source 11. Since the positive-side opening and closing switch 21A and the negative-side opening and closing switch 21B are closed through the brake release process, the electrical path from the positive electrode terminal of the power source 11 to the negative electrode terminal of the power source 11 via the brake device 2 is formed. Accordingly, when no abnormality occurs in the positive-side opening and closing switch 21A, the negative-side opening and closing switch 21B and the devices related to these switches, the voltage of the power source 11 is applied to the brake coil 115 of the brake device 2 due to the brake control unit 12 executing the brake release process. This gives rise to the state where the brake on the motor 3 is released. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 23, 24 V). Thus, since the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

The contents of the state detection signals $FB_A$ and $FB_B$ in the brake actuation process, the first brake release preparation process, the power source-ON-control process, the second brake release preparation process and the brake release process in the above-described case where there is no abnormality in the positive-side opening and closing switch 21A, the negative-side opening and closing switch 21B, the devices related to these switches and the power source 11, i.e., in the normal state, are stored in advance in the abnormality detecting unit 15 so as to be available for the abnormality detection process described below.

Subsequently, a case where a failure has occurred in the power source 11 is described with reference to FIG. 24B.

When the “continuing to output the voltage without responding to the output OFF signal” failure occurs in the power source 11, the power source 11 continues to output the DC voltage (e.g., 24 V) even when the output OFF signal is received from the power source control unit 16 during the brake actuation process period and during the first brake release preparation process period. When such a failure occurs in the power source 11, there is no change from the normal state during the brake actuation process period in the state detection signals $FB_A$ and $FB_B$ output from the state detecting unit 14, but a signal state different from the normal state occurs during the first brake release preparation process period. That is, since the positive-side opening and closing switch 21A is closed and the negative-side opening and closing switch 21B is opened during the first brake release preparation process period, the electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently the output sides of the photocouplers 41A and 41B are Low. Thus, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

When the "continuing to output the voltage without responding to the output OFF signal" failure has occurred in the power source 11 As a result, the state detection signals $FB_A$ and $FB_B$ during the first brake release preparation process period differ from the state detection signals $FB_A$ and $FB_B$ during the brake actuation process period. During the execution of the first brake release preparation process, the abnormality detecting unit 15 detects whether or not an abnormality occurs in the power source 11 based on the combination of the contents of the brake control signals $BS_A$ and $BS_B$ and the contents of the state detection signals $FB_A$ and $FB_B$. More specifically, when the state detection signals $FB_A$ and $FB_B$ during the first brake release preparation process period differ from the state detection signals $FB_A$ and $FB_B$ during the brake actuation process period (when the state detection signals $FB_A$ and $FB_B$ during the first brake release preparation process period are both Low), the abnormality detecting unit 15 determines that a failure has occurred in the power source 11, and outputs the alarm signal. When the state detection signals $FB_A$ and $FB_B$ during the first brake release preparation process period are the same as the state detection signals $FB_A$ and $FB_B$ during the brake actuation process period (when the state detection signals $FB_A$ and $FB_B$ during the first brake release preparation process period are both High), the abnormality detecting unit 15 determines that no failure has occurred in the power source 11. It should be noted that even when the abnormality detecting unit 15 has detected a failure in the power source 11 during the first brake release preparation process period, the voltage of the power source 11 is not applied to the brake coil 115 of the brake device 2 because the electrical path from the positive electrode terminal of the power source 11 to the negative electrode terminal of the power source 11 via the brake device 2 is blocked due to the negative-side opening and closing switch 21B being opened. This gives rise to the state where the brake is actuated on the motor 3, and safety is ensured.

Subsequently, a case where the short circuit failure of the negative-side opening and closing switch 21B has occurred is described with reference to FIG. 25A.

When the short circuit failure of the negative-side opening and closing switch 21B has occurred, the state detection signal $FB_B$ output from the state detecting unit 14 during the power source-ON-control process period differs from the signal state in the normal state. That is, during the power source-ON-control process period, the positive-side opening and closing switch 21A is closed and the negative-side opening and closing switch 21B is opened in the normal state, but when a short circuit failure of the negative-side opening and closing switch 21B occurs, the negative-side opening and closing switch 21B is caused to be in the same state as the closed state. During the power source-ON-control process period, the DC voltage (in the example illustrated in FIG. 1, the DC voltage of 24 V) is output from the power source 11 that has received the output ON signal. Since both the positive-side opening and closing switch 21A and the negative-side opening and closing switch 21B are caused to be in the closed state due to the short circuit failure of the negative-side opening and closing switch 21B, the electrical path from the positive electrode terminal of the power source 11 to the negative electrode terminal of the power source 11 via the brake device 2 is formed. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element in the photocoupler 41A emits light, and consequently the output side of the photocoupler 41A is Low. The state detection signal $FB_A$ indicating the potential state of the electrical path between the source of the positive-side opening and closing switch 21A and the positive electrode terminal of the brake device 2 is Low. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

As a result, when a short circuit failure has occurred in the negative-side opening and closing switch 21B, the state detection signal $FB_B$ output from the state detecting unit 14 during the power source-ON-control process period differs from the signal state in the normal state. During the execution of the power source-ON-control process, the abnormality detecting unit 15 detects whether or not the short circuit failure occurs in the negative-side opening and closing switch 21B based on the combination of the contents of the brake control signals $BS_A$ and $BS_B$ and the contents of the state detection signals $FB_A$ and $FB_B$. More specifically, during the execution of the power source-ON-control process, the abnormality detecting unit 15 determines that no short circuit failure occurs in the negative-side opening and closing switch 21B when the state detection signals $FB_A$ and $FB_B$ are both Low, and determines that an abnormality occurs (i.e., the short circuit failure of the negative-side opening and closing switch 21B) when the state detection signal $FB_A$ is Low and the state detection signal $FB_B$ is High. When the occurrence of an abnormality is detected during the execution of the power source-ON-control process, the abnormality detecting unit 15 outputs the alarm signal.

Subsequently, a case where the short circuit failure of the positive-side opening and closing switch 21A has occurred is described with reference to FIG. 25B.

When the short circuit failure of the positive-side opening and closing switch 21A has occurred, the state detection signals $FB_A$ and $FB_B$ output from the state detecting unit 14 during the second brake release preparation process period differ from the signal state in the normal state. Specifically, the positive-side opening and closing switch 21A and the negative-side opening and closing switch 21B are both opened in the normal state during the second brake release preparation process period, but when the short circuit failure of the positive-side opening and closing switch 21A occurs, the positive-side opening and closing switch 21A is caused to be in the same state as the closed state. During the second brake release preparation process period, the DC voltage (in the example illustrated in FIG. 1, the DC voltage of 24 V) is output from the power source 11 that has received the output ON signal. Since the positive-side opening and closing switch 21A is caused to be in the closed state due to the short circuit failure of the positive-side opening and closing switch 21A, the electrical path from the positive electrode terminal of the power source 11 to the drain of the negative-side opening and closing switch 21B via the positive-side opening and closing switch 21A and the brake device 2 is formed. The electrical path from the positive electrode terminal of the power source 11 to the drain of the negative-side opening and closing switch 21B via the positive-side opening and closing switch 21A and the brake device 2 has the same potential as the voltage output by the positive electrode terminal of the power source 11 (in the example illustrated in FIG. 1, 24 V). Thus, since the current flows through the voltage divider resistors R1A and R2A and the voltage divider resistors R1B and R2B in the state detecting unit 14, the light-emitting elements in the photocouplers 41A and 41B emit light, and consequently, the output sides of the photocouplers 41A and 41B are both Low. Accordingly, the state detection signal $FB_A$ indicating the potential state of the electrical path between the source of the positive-side opening and closing switch 21A and the positive electrode terminal of the brake device 2, and the state detection signal $FB_B$ indicating the potential state of the electrical path between the drain of the negative-side opening and closing switch 21B and the negative electrode terminal of the brake device 2 are both Low.

As a result, when a short circuit failure of the positive-side opening and closing switch 21A has occurred, the state detection signals $FB_A$ and $FB_B$ output from the state detecting unit 14 during the second brake release preparation process period differ from the signal state in the normal state. During the execution of the second brake release preparation process, the abnormality detecting unit 15 detects whether or not the short circuit failure occurs in the positive-side opening and closing switch 21A based on the combination of the contents of the brake control signals $BS_A$ and $BS_B$ and the contents of the state detection signals $FB_A$ and $FB_B$. More specifically, during the execution of the second brake release preparation process, the abnormality detecting unit 15 determines that no short circuit failure occurs in the positive-side opening and closing switch 21A when the state detection signals $FB_A$ and $FB_B$ are both High, and determines that an abnormality occurs (i.e., the short circuit failure of the positive-side opening and closing switch 21A) when the state detection signals $FB_A$ and $FB_B$ are both Low. When the occurrence of an abnormality is detected during the execution of the second brake release preparation process, the abnormality detecting unit 15 outputs the alarm signal. It should be noted that the voltage of the power source 11 is not applied to the brake coil 115 of the brake device 2 because the electrical path from the positive electrode terminal of the power source 11 to the negative electrode terminal of the power source 11 via the brake device 2 is blocked due to the negative-side opening and closing switch 21B being opened. This gives rise to the state where the brake is actuated on the motor 3, and safety is ensured.

Subsequently, a case where the first protecting operation process is performed when the positive-side opening and closing switch 21A and the negative-side opening and closing switch 21B experience a short circuit failure is described with reference to FIG. 26A.

When the short circuit failure has occurred in both the positive-side opening and closing switch 21A and the negative-side opening and closing switch 21B, the state detection signals $FB_A$ and $FB_B$ output from the state detecting unit 14 during the power source-ON-control process period and the second brake release preparation process period differ from the signal state in the normal state. Specifically, the positive-side opening and closing switch 21A is closed and the negative-side opening and closing switch 21B is opened during the power source-ON-control process period in the normal state, and the positive-side opening and closing switch 21A and the negative-side opening and closing switch 21B are both opened during the second brake release preparation process period, but when a short circuit failure occurs in both the positive-side opening and closing switch 21A and the negative-side opening and closing switch 21B, the negative-side opening and closing switch 21B is caused to be in the same state as the closed state. During the power source-ON-control process period, the DC voltage (in the example illustrated in FIG. 23, the DC voltage of 24 V) is output from the power source 11 that has received the output ON signal. Since both the positive-side opening and closing switch 21A and the negative-side opening and closing switch 21B are caused to be in the closed state due to the short circuit failures of both the positive-side opening and closing switch 21A and the negative-side opening and closing switch 21B, the electrical path from the positive electrode terminal of the power source 11 to the negative electrode terminal of the power source 11 via the brake device 2 is formed. The electrical path from the positive electrode terminal of the power source 11 to the positive electrode terminal of the brake device 2 via the positive-side opening and closing switch 21A has the same potential as the voltage output by the positive electrode terminal of the power source 11 (in the example illustrated in FIG. 1, 24 V). Thus, since the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path between the source of the positive-side opening and closing switch 21A and the positive electrode terminal of the brake device 2 is Low. The electrical path from the negative electrode terminal of the brake device 2 to the negative electrode terminal of the power source 11 via the negative-side opening and closing switch 21B has the same potential as 0 V, which is the potential of the negative electrode terminal of the power source 11. Thus, since the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path between the drain of the negative-side opening and closing switch 21B and the negative electrode terminal of the brake device 2 is High.

As a result, when the short circuit failure has occurred in both the positive-side opening and closing switch 21A and the negative-side opening and closing switch 21B, the state detection signals $FB_A$ and $FB_B$ output from the state detecting unit 14 during the power source-ON-control process period and the second brake release preparation process period differ from the signal state in the normal state. During the execution of the power source-ON-control process period and the second brake release preparation process, the abnormality detecting unit 15 detects whether or not the short circuit failure occurs in the positive-side opening and closing switch 21A, based on the combination of the contents of the brake control signals $BS_A$ and $BS_B$ and the contents of the state detection signals $FB_A$ and $FB_B$. More specifically, during the execution of the power source-ON-control process and the second brake release preparation process, the abnormality detecting unit 15 determines that an abnormality occurs (i.e., the short circuit failures of both the positive-side opening and closing switch 21A and the negative-side opening and closing switch 21B) when the state detection signal $FB_A$ is Low and the state detection signal $FB_B$ is High, and outputs the alarm signal.

When the short circuit failure of the negative-side opening and closing switch 21B occurs during the power source-ON-control process period and during the second brake release preparation process period, the dangerous state may occur where the brake on the motor 3 is released. In view of this, a time period during which the power source-ON-control process is executed may be set to be shorter than the response time of the brake device 2 to the brake command. Likewise, a time period during which the second brake release preparation process is executed may be set to be shorter than the response time of the brake device 2 to the brake command. By setting the time periods during which the power source-ON-control process and the second brake release preparation process are executed As a result, even when a short circuit failure of the negative-side opening and closing switch 21B has occurred, the short circuit failure can be detected while avoiding the release of the brake of the brake device 2 on the motor 3.

As described above, when a short circuit failure has occurred in both the positive-side opening and closing switch 21A and the negative-side opening and closing switch 21B, the electrical path from the positive electrode terminal of the power source 11 to the negative electrode terminal of the power source 11 via the positive-side opening and closing switch 21A, the brake device 2 and the negative-side opening and closing switch 21B is formed. As a result, the voltage of the power source 11 is applied to the brake device 2, and there is the risk of giving rise to the state where the brake on the motor 3 is released. In view of this, when the abnormality detecting unit 15 determines that the short circuit failures in both the positive-side opening and closing switch 21A and the negative-side opening and closing switch 21B have occurred, the first protecting operation process is executed after the second brake release preparation process.

In the first protecting operation process, the power source control unit 16 outputs the output OFF signal as the power source control signal CTRP for the power source 11, the brake control unit 12 outputs the Low signal being the brake control signals $BS_A$ and $BS_B$ for controlling the positive-side opening and closing switch 21A and the negative-side opening and closing switch 21B to open, and the brake lock switch control unit 18 outputs the close signal for controlling the brake lock switch 17 to close as the brake lock control signal for the brake lock switch 17. As a result, the power source 11 does not output the DC voltage, i.e., the DC output voltage of the power source 11 is 0 V, the brake lock switch 17 is closed, and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

In the second protecting operation process being a modified example of the above-described first protecting operation process, the brake lock switch control unit 18 outputs the brake lock control signal to close the brake lock switch 17 as illustrated in FIG. 26B, but the power source control signal CTRP output by the power source control unit 16 to the power source 11 remains the output ON signal. As a result, the power source 11 outputs the DC voltage of 24 V, but the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

In the third protecting operation process being a modified example of the above-described first protecting operation process, the power source control unit 16 outputs the output OFF signal as the power source control signal CTRP for the power source 11 as illustrated in FIG. 27, but the brake lock control signal output by the brake lock switch control unit 18 to the brake lock switch 17 remains the open signal. As a result, since the brake lock switch 17 remains open, a short circuit is not made between the input terminals of the brake device 2 (i.e., between the positive electrode terminal and the negative electrode terminal of the brake device 2), but the power source 11 does not output the DC voltage, i.e., the DC output voltage of the power source 11 is 0 V, and therefore, the voltage of the power source 11 is not applied to the brake coil 115 of the brake device 2. This gives rise to the state where the brake is actuated on the motor 3, and safety is ensured.

Subsequently, a protecting operation process is described in a case where a device including an external power source is short-circuited to a brake cable of the brake device 2 in the brake control device 1 according to the fifth embodiment of the present disclosure.

Figure 28:
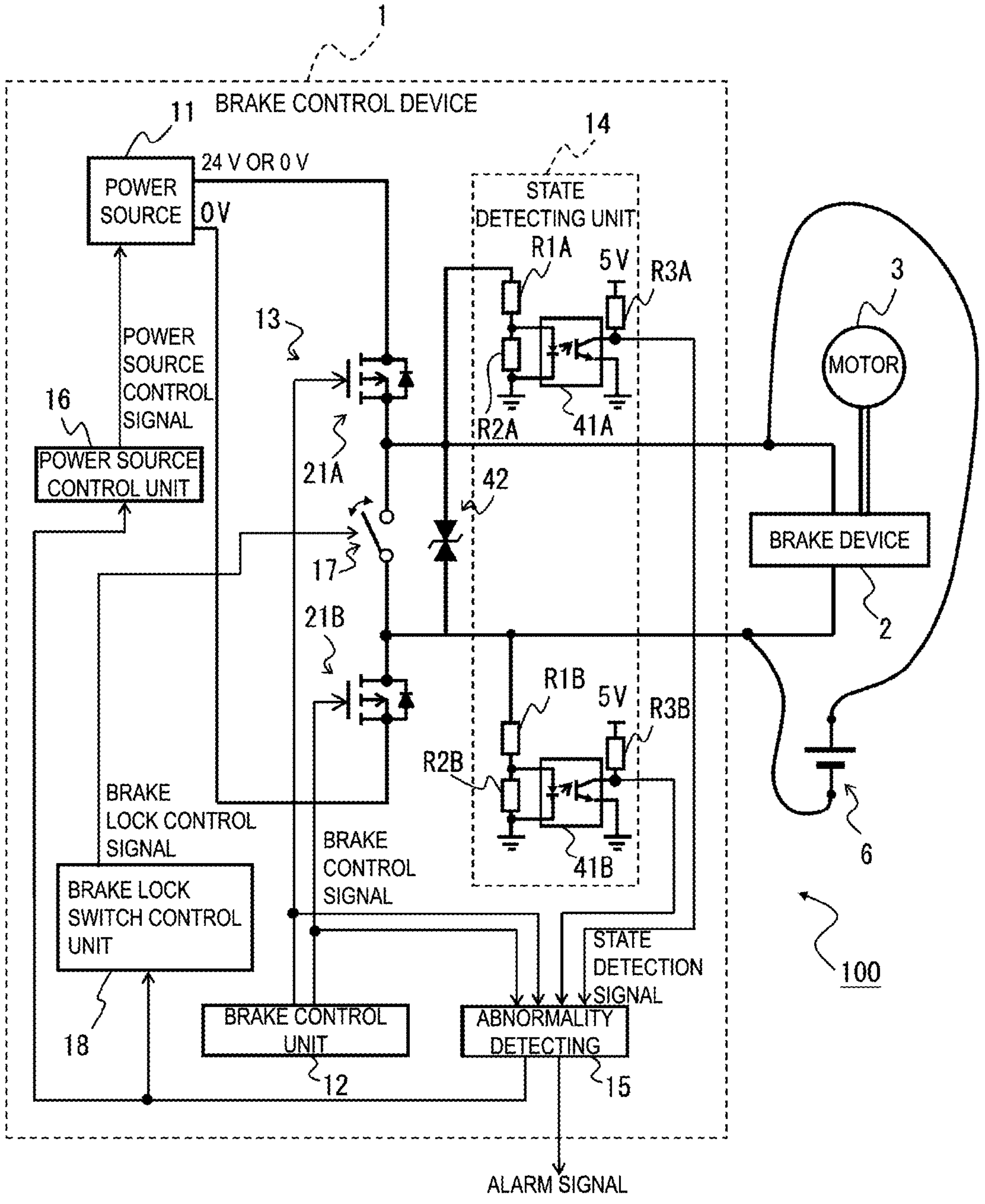
FIG. 28 is a diagram illustrating a case where a device including an external power source is short-circuited to a brake cable of the brake device in the brake control device and the motor drive device including the same according to the fifth embodiment of the present disclosure.

FIG. 28 is a diagram illustrating a case where a device including an external power source is short-circuited to a brake cable of the brake device in the brake control device and the motor drive device including the same according to the fifth embodiment of the present disclosure. FIG. 29A is a diagram illustrating an example of each signal and brake state in a case where the device including the external power source is short-circuited to the brake cable of the brake device as illustrated in FIG. 28 in the brake control device and the motor drive device including the same according to the fifth embodiment of the present disclosure, and an example of each signal and brake state in a case where the protecting operation process is not performed. FIG. 29B is a diagram illustrating an example of each signal and brake state in a case where the device including the external power source is short-circuited to the brake cable of the brake device as illustrated in FIG. 28 in the brake control device and the motor drive device including the same according to the fifth embodiment of the present disclosure, and an example of each signal and brake state in a case where the protecting operation process is performed. It should be noted that the "brake control signal" is denoted as "brake signal" in FIGS. 29A and 29B for the sake of simplifying the drawings.

As illustrated in FIG. 28, a short circuit may occur in which a positive electrode side of an external power source 6 makes contact with a brake cable connecting the positive electrode terminal of the brake device 2 and the source of the positive-side opening and closing switch 21A, and a negative electrode side of the external power source 6 makes contact with a brake cable connecting the negative electrode terminal of the brake device 2 and the drain of the negative-side opening and closing switch 21B. The external power source 6 is different from the power source 11. In this case, regardless of an operation state of the brake control device 1, the brake cable connecting the positive electrode terminal of the brake device 2 and the source of the positive-side opening and closing switch 21A has a positive potential (e.g., 12 V), and the brake cable connecting the negative electrode terminal of the brake device 2 and the drain of the negative-side opening and closing switch 21B is 0 V.

When the protecting operation is not performed as illustrated in FIG. 29A, the positive-side opening and closing switch 21A and the negative-side opening and closing switch 21B are both in the open state during the brake actuation process, but since the brake cable connecting the positive electrode terminal of the brake device 2 and the source of the positive-side opening and closing switch 21A has a positive potential (e.g., 12 V), the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path from the source of the positive-side opening and closing switch 21A to the positive electrode terminal of the brake device 2 is Low. Since the voltage of the external power source 6 is applied to the brake coil 115 of the brake device 2, there is the risk of giving rise to the state where the brake on the motor 3 is released, regardless of doing so during the execution of the brake actuation process. In view of this, during the execution of the brake actuation process, the abnormality detecting unit 15 determines that an abnormality has occurred and outputs the alarm signal, when the state detection signal $FB_A$ during the brake actuation process period differs from the state detection signal $FB_A$ in the normal state (when the state detection signal $FB_A$ is Low). When the abnormality detecting unit 15 determines that an abnormality has occurred during the brake actuation process period, the brake lock switch control unit 18 outputs the close signal for controlling the brake lock switch 17 to close as the brake lock control signal for the brake lock switch 17, as illustrated in FIG. 29B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 29A, the positive-side opening and closing switch 21A is in the closed state and the negative-side opening and closing switch 21B is in the open state during the first brake release preparation process, but since the brake cable connecting the positive electrode terminal of the brake device 2 and the source of the positive-side opening and closing switch 21A has a positive potential (e.g., 12 V). the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path from the source of the positive-side opening and closing switch 21A to the positive electrode terminal of the brake device 2 is Low. Since the voltage of the external power source 6 is applied to the brake coil 115 of the brake device 2, there is the risk of giving rise to the state where the brake on the motor 3 is released, regardless of doing so during the execution of the first brake release preparation process. In view of this, when the state detection signal $FB_A$ during the first brake release preparation process period differs from the state detection signal $FB_A$ in the normal state (when the state detection signal $FB_A$ is Low), the abnormality detecting unit 15 determines that an abnormality has occurred and outputs the alarm signal. When the abnormality detecting unit 15 determines that an abnormality has occurred during the first brake release preparation process period, the brake lock switch control unit 18 outputs the close signal for controlling the brake lock switch 17 to close as the brake lock control signal for the brake lock switch 17, as illustrated in FIG. 29B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 29A, the positive-side opening and closing switch 21A is in the closed state and the negative-side opening and closing switch 21B is in the open state during the power source-ON-control process, but since the brake cable connecting the negative electrode terminal of the brake device 2 and the drain of the negative-side opening and closing switch 21B is at 0 V, the current does not flow through the voltage divider resistors R1B and R2B in the state detecting unit 14, the light-emitting element in the photocoupler 41B does not emit light, and consequently the output side of the photocoupler 41B is High. Thus, the state detection signal $FB_B$ indicating the potential state of the electrical path from the negative electrode terminal of the brake device 2 to the drain of the negative-side opening and closing switch 21B is High. Since the voltage of the external power source 6 is applied to the brake coil 115 of the brake device 2, there is the risk of giving rise to the state where the brake on the motor 3 is released, regardless of doing so during the execution of the power source-ON-control process. In view of this, when the state detection signal $FB_B$ during the power source-ON-control process period differs from the state detection signal $FB_B$ in the normal state (when the state detection signal $FB_B$ is High), the abnormality detecting unit 15 determines that an abnormality has occurred and outputs the alarm signal. When the abnormality detecting unit 15 determines that an abnormality has occurred during the power source-ON-control process period, the power source control unit 16 outputs the output OFF signal as the power source control signal CTRP for the power source 11, and the brake lock switch control unit 18 outputs the close signal for controlling the brake lock switch 17 to close as the brake lock control signal for the brake lock switch 17, as illustrated in FIG. 29B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 29A, the positive-side opening and closing switch 21A and the negative-side opening and closing switch 21B are both in the open state during the second brake release preparation process, but since the brake cable connecting the source of the positive-side opening and closing switch 21A and the positive electrode terminal of the brake device 2 has a positive potential (e.g., 12 V), the current flows through the voltage divider resistors R1A and R2A in the state detecting unit 14, the light-emitting element in the photocoupler 41A emits light, and consequently the output side of the photocoupler 41A is Low. Thus, the state detection signal $FB_A$ indicating the potential state of the electrical path from the source of the positive-side opening and closing switch 21A to the positive electrode terminal of the brake device 2 is Low. Since the voltage of the external power source 6 is applied to the brake coil 115 of the brake device 2, there is the risk of giving rise to the state where the brake on the motor 3 is released, regardless of doing so during the execution of the second brake release preparation process. In view of this, when the state detection signal $FB_A$ during the second brake release preparation process period differs from the state detection signal $FB_A$ in the normal state (when the state detection signal $FB_A$ is Low), the abnormality detecting unit 15 determines that an abnormality has occurred and outputs the alarm signal. The abnormality detecting unit 15 determines that an abnormality has occurred during the second brake release preparation process period, the brake lock switch control unit 18 outputs the close signal for controlling the brake lock switch 17 to close as the brake lock control signal for the brake lock switch 17, as illustrated in FIG. 29B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the above-described cable short circuit with the external power source 6 occurs during the first brake release preparation process period, the power source-ON-control process period and the second brake release preparation process period, the dangerous state may occur where the brake on the motor 3 is released. In view of this, a time period during which the first brake release preparation process in response to the brake command is executed may be set to be shorter than the response time of the brake device 2. Likewise, the time period during which the power source-ON-control process is executed may be set to be shorter than the response time of the brake device 2 to the brake command. Likewise, the time period during which the second brake release preparation process is executed is set to be shorter than the response time of the brake device 2. By setting each of the time periods during which the first brake release preparation process, the power source-ON-control process and the second brake release preparation process are executed As a result, even when a short circuit failure of the negative-side opening and closing switch 21B has occurred, the short circuit failure can be detected while avoiding the release of the brake of the brake device 2 on the motor 3.

Figure 30:
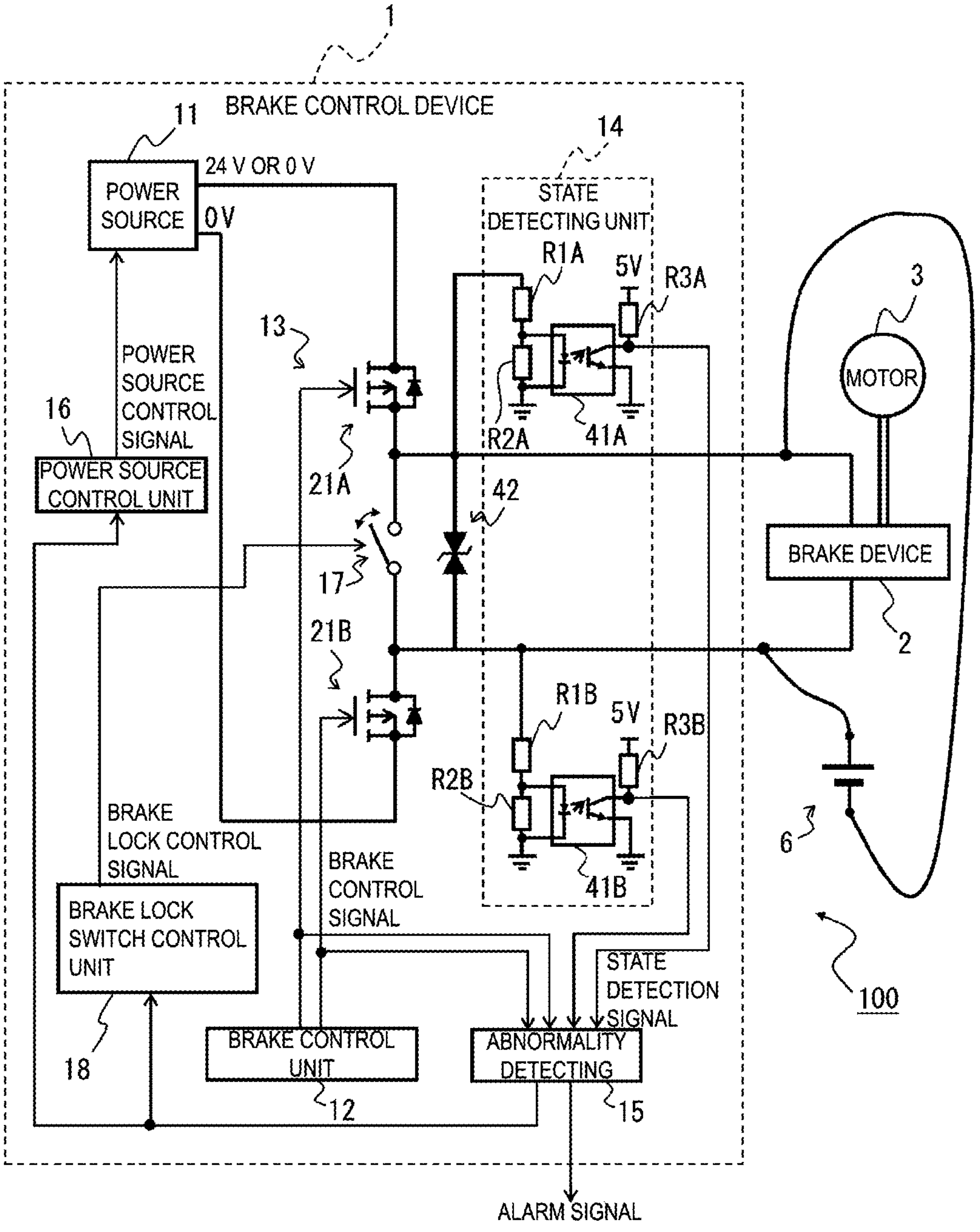
FIG. 30 is a diagram illustrating a case where the device including the external power source is short-circuited to a brake cable of the brake device in the brake control device and the motor drive device including the same according to the fifth embodiment of the present disclosure.

FIG. 30 is a diagram illustrating a case where the device including the external power source is short-circuited to a brake cable of the brake device in the brake control device and the motor drive device including the same according to the fifth embodiment of the present disclosure. FIG. 31A is a diagram illustrating an example of each signal and brake state in a case where the device including the external power source is short-circuited to the brake cable of the brake device as illustrated in FIG. 30 in the brake control device and the motor drive device including the same according to the fifth embodiment of the present disclosure, and an example of each signal and brake state in a case where the protecting operation process is not performed. FIG. 31B is a diagram illustrating an example of each signal and brake state in a case where the device including the external power source is short-circuited to the brake cable of the brake device as illustrated in FIG. 30 in the brake control device and the motor drive device including the same according to the fifth embodiment of the present disclosure, and an example of each signal and brake state in a case where the protecting operation process is performed. It should be noted that the "brake control signal" is denoted as "brake signal" in FIGS. 31A and 31B for the sake of simplifying the drawings.

As illustrated in FIG. 30, a short circuit may occur in which the negative electrode side of the external power source 6 makes contact with a brake cable connecting the positive electrode terminal of the brake device 2 and the source of the positive-side opening and closing switch 21A, and the positive electrode side of the external power source 6 makes contact with a brake cable connecting the negative electrode terminal of the brake device 2 and the drain of the negative-side opening and closing switch 21B. The external power source 6 is different from the power source 11. In this case, regardless of the operation state of the brake control device 1, the brake cable connecting the positive electrode terminal of the brake device 2 and the source of the positive-side opening and closing switch 21A is 0 V, and the brake cable connecting the negative electrode terminal of the brake device 2 and the drain of the negative-side opening and closing switch 21B has a positive potential (e.g., 12 V). When the external power source 6 can be considered the same as the power source 11, it suffices to execute the protecting operation as in the above-described case where both the positive-side opening and closing switch 21A and the negative-side opening and closing switch 21B experience a short circuit failure.

When the protecting operation is not performed as illustrated in FIG. 31A, the positive-side opening and closing switch 21A and the negative-side opening and closing switch 21B are both in the open state during the brake actuation process, but since the brake cable connecting the negative electrode terminal of the brake device 2 and the drain of the negative-side opening and closing switch 21B has a positive potential (e.g., 12 V), the current flows through the voltage divider resistors R1B and R2B in the state detecting unit 14, the light-emitting element in the photocoupler 41B emits light, and consequently the output side of the photocoupler 41B is Low. Thus, the state detection signal $FB_B$ indicating the potential state of the electrical path from the negative electrode terminal of the brake device 2 to the drain of the negative-side opening and closing switch 21B is Low. Since the voltage of the external power source 6 is applied to the brake coil 115 of the brake device 2, there is the risk of giving rise to the state where the brake on the motor 3 is released, regardless of doing so during the execution of the brake actuation process. In view of this, during the execution of the brake actuation process, when the state detection signal $FB_B$ during the brake actuation process period differs from the state detection signal $FB_B$ in the normal state (when the state detection signal $FB_B$ is Low), the abnormality detecting unit 15 determines that an abnormality has occurred and outputs the alarm signal. When the abnormality detecting unit 15 determines that an abnormality has occurred during the brake actuation process period, the brake lock switch control unit 18 outputs the close signal for controlling the brake lock switch 17 to close as the brake lock control signal for the brake lock switch 17, as illustrated in FIG. 31B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 31A, the positive-side opening and closing switch 21A is in the closed state and the negative-side opening and closing switch 21B is in the open state during the first brake release preparation process, but since the brake cable connecting the negative electrode terminal of the brake device 2 and the drain of the negative-side opening and closing switch 21B has a positive potential (e.g., 12 V), the current flows through the voltage divider resistors R1B and R2B in the state detecting unit 14, the light-emitting element in the photocoupler 41B emits light, and consequently the output side of the photocoupler 41A is Low. Thus, the state detection signal $FB_B$ indicating the potential state of the electrical path from the negative electrode terminal of the brake device 2 to the drain of the negative-side opening and closing switch 21B is Low. Since the voltage of the external power source 6 is applied to the brake coil 115 of the brake device 2, there is the risk of giving rise to the state where the brake on the motor 3 is released, regardless of doing so during the execution of the first brake release preparation process. In view of this, when the state detection signal $FB_B$ differs from the state detection signal $FB_B$ in the normal state during the first brake release preparation process period (when the state detection signal $FB_A$ is Low), the abnormality detecting unit 15 determines that an abnormality has occurred and outputs the alarm signal. When the abnormality detecting unit 15 determines that an abnormality has occurred during the first brake release preparation process period, the brake lock switch control unit 18 outputs the close signal for controlling the brake lock switch 17 to close as the brake lock control signal for the brake lock switch 17, as illustrated in FIG. 31B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 31A, the positive-side opening and closing switch 21A is in the closed state and the negative-side opening and closing switch 21B is in the open state during the power source-ON-control process, but since the brake cable connecting the source of the positive-side opening and closing switch 21A and the positive electrode terminal of the brake device 2 is at 0 V, the current does not flow through the voltage divider resistors R1A and R2A in the state detecting unit 14, the light-emitting element in the photocoupler 41A does not emit light, and consequently the output side of the photocoupler 41A is High. Thus, the state detection signal $FB_A$ indicating the potential state of the electrical path from the source of the positive-side opening and closing switch 21A to the positive electrode terminal of the brake device 2 is High. Since the voltage of the external power source 6 is applied to the brake coil 115 of the brake device 2, there is the risk of giving rise to the state where the brake on the motor 3 is released, regardless of doing so during the execution of the power source-ON-control process. In view of this, when the state detection signal $FB_A$ during the power source-ON-control process period differs from the state detection signal $FB_A$ in the normal state (when the state detection signal $FB_A$ is High), the abnormality detecting unit 15 determines that an abnormality has occurred and outputs the alarm signal. When the abnormality detecting unit 15 determines that an abnormality has occurred during the power source-ON-control process period, the power source control unit 16 outputs the output OFF signal as the power source control signal CTRP for the power source 11, and the brake lock switch control unit 18 outputs the close signal for controlling the brake lock switch 17 to close as the brake lock control signal for the brake lock switch 17, as illustrated in FIG. 31B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

When the protecting operation is not performed as illustrated in FIG. 31A, the positive-side opening and closing switch 21A and the negative-side opening and closing switch 21B are both in the open state in the second brake release preparation process, but since the brake cable connecting the negative electrode terminal of the brake device 2 and the drain of the negative-side opening and closing switch 21B has a positive potential (e.g., 12 V), the current flows through the voltage divider resistors R1B and R2B in the state detecting unit 14, the light-emitting element in the photocoupler 41B emits light, and consequently the output side of the photocoupler 41B is Low. Thus, the state detection signal $FB_B$ indicating the potential state of the electrical path from the negative electrode terminal of the brake device 2 to the drain of the negative-side opening and closing switch 21B is Low. Since the voltage of the external power source 6 is applied to the brake coil 115 of the brake device 2, there is the risk of giving rise to the state where the brake on the motor 3 is released, regardless of doing so during the execution of the second brake release preparation process. In view of this, when the state detection signal $FB_B$ during the second brake release preparation process period differs from the state detection signal $FB_B$ in the normal state (when the state detection signal $FB_B$ in Low), the abnormality detecting unit 15 determines that an abnormality has occurred and outputs the alarm signal. When the abnormality detecting unit 15 determines that an abnormality has occurred during the second brake release preparation process period, the brake lock switch control unit 18 outputs the close signal for controlling the brake lock switch 17 to close as the brake lock control signal for the brake lock switch 17, as illustrated in FIG. 31B. As a result, the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

As described above, the brake control device 1 according to the fifth embodiment of the present disclosure allows the brake of the brake device 2 actuated on the motor 3 to be released only when no abnormality occurs. Even when an abnormality occurs at the time of releasing the brake of the brake device 2 actuated on the motor 3, the release of the brake can be avoided.

Subsequently, a sixth embodiment of the present disclosure is described. The sixth embodiment of the present disclosure further includes, as compared to the third embodiment, the brake lock switch that short-circuits between the input terminals of the brake device 2 when an abnormality occurs and the brake lock switch control unit including the brake lock switch.

Figure 32:
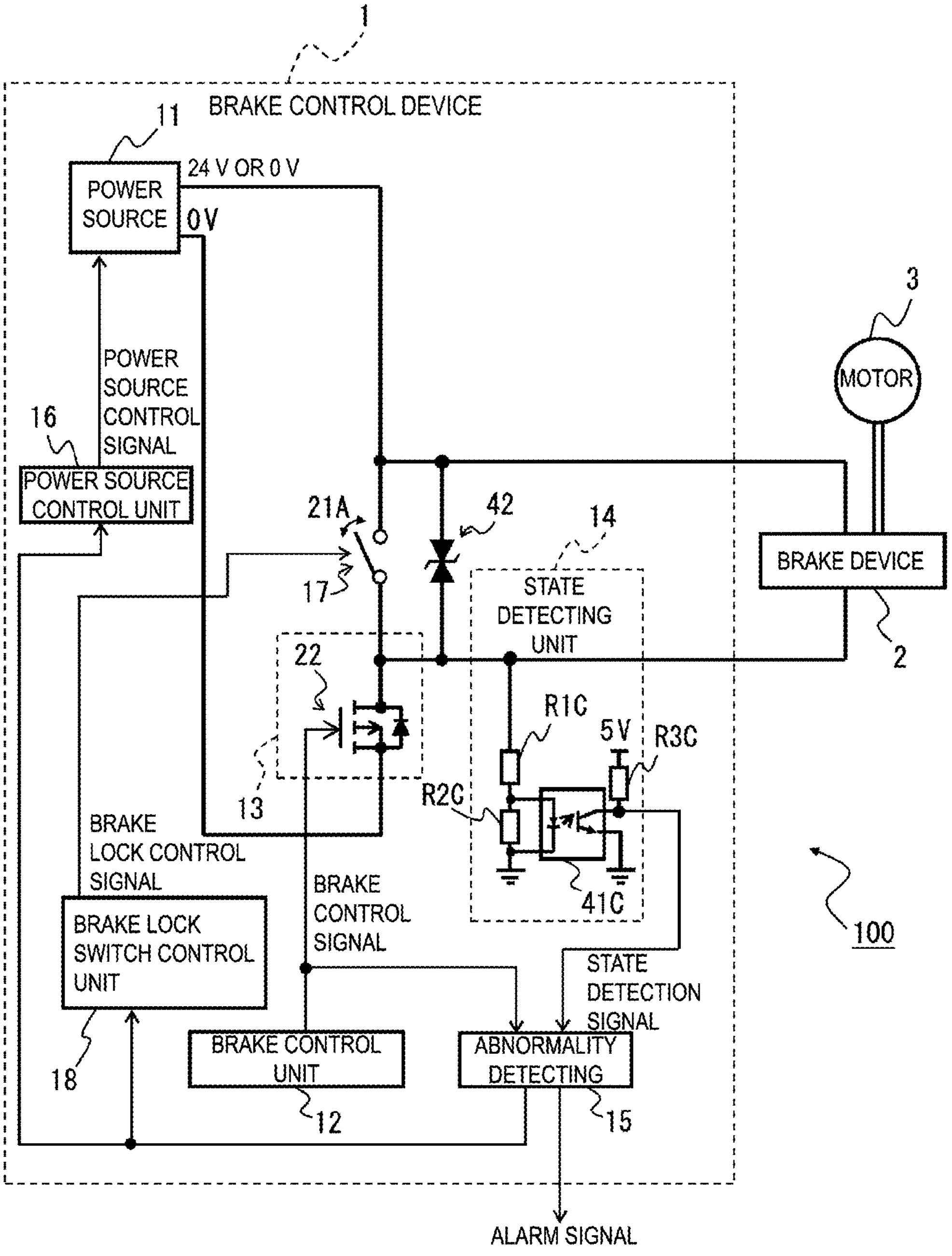
FIG. 32 is a diagram illustrating a brake control device and a motor drive device including the same according to a sixth embodiment of the present disclosure.

FIG. 32 is a diagram illustrating a brake control device and a motor drive device including the same according to a sixth embodiment of the present disclosure.

A brake control device 1 according to the sixth embodiment further includes the brake lock switch 17 and the brake lock switch control unit 18 in the brake control device 1 according to the third embodiment illustrated in FIG. 17.

The brake lock switch 17 is connected in parallel to the brake device 2 between the input terminals of the brake device 2 (i.e., between the positive electrode terminal and the negative electrode terminal of the brake device 2), and opens and closes the electrical path in response to the received brake lock control signal. One brake lock switch 17 is provided in the example illustrated in FIG. 32, but two or more brake lock switches connected in series may be provided, and in this case, these brake lock switches are controlled to open and close through the same brake lock switch control signal. The brake lock switch 17 may include a semiconductor switching element or a mechanical switch. Examples of the semiconductor switching element making up the brake lock switch 17 include FETs, IGBTs, thyristors, GTOs, and transistors, but other semiconductor switching elements may also be used. In the example illustrated in FIG. 32, the brake lock switch 17 is a normally off semiconductor switching element as an example.

As the brake lock control signal for the brake lock switch 17, the brake lock switch control unit 18 outputs the close signal for controlling the brake lock switch 17 to close when the occurrence of an abnormality is detected by the abnormality detecting unit 15, and outputs the open signal for controlling the brake lock switch 17 to open when the occurrence of an abnormality is not detected by the abnormality detecting unit 15.

The brake lock switch control unit 18 is provided in an arithmetic processing device (processor) provided in the brake control device 1. The brake lock switch control unit 18 provided in the arithmetic processing device is, for example, a function module achieved through a computer program executed by the processor. For example, in the case where the brake lock switch control unit 18 is assembled in the form of a computer program, the function of the brake lock switch control unit 18 can be achieved by operating the arithmetic processing device in accordance with the computer program. The computer program for executing the processing of the brake lock switch control unit 18 may be provided in the form of being recorded on a computer-readable recording medium such as a semiconductor memory, a magnetic recording medium, or an optical recording medium. Alternatively, the brake lock switch control unit 18 may be achieved as a semiconductor integrated circuit in which a computer program for achieving the function is written.

FIGS. 33A, 33B, 34A, 34B, and 34C are diagrams illustrating an example of each signal and brake state in the brake control device according to the sixth embodiment of the present disclosure. In FIGS. 33A, 33B, 34A, 34B, and 34C, the "brake control signal" is denoted as "brake signal" and "power source-ON-control process" is denoted as "power source control" for the sake of simplifying the drawings. In the following description, the opening and closing switch 22 is a normally open switch as an example.

FIG. 33A is a diagram illustrating an example of each signal and brake state in the brake control device according to the fifth embodiment of the present disclosure, and an example of each signal and brake state in a normal state. FIG. 33B is a diagram illustrating an example of each signal and brake state in the brake control device according to the fifth embodiment of the present disclosure, and an example of each signal and brake state when the opening and closing switch experiences a short circuit failure. FIG. 34A is a diagram illustrating an example of each signal and brake state in the brake control device according to the fifth embodiment of the present disclosure, and an example of each signal and brake state in a case where the first protecting operation process is performed when the opening and closing switch experiences a short circuit failure. FIG. 34B is a diagram illustrating an example of each signal and brake state in the brake control device according to the fifth embodiment of the present disclosure, and an example of each signal and brake state in a case where the second protecting operation process is performed when the opening and closing switch experiences a short circuit failure. FIG. 34C is a diagram illustrating an example of each signal and brake state in the brake control device according to the fifth embodiment of the present disclosure, and an example of each signal and brake state in a case where the third protecting operation process is performed when the opening and closing switch experiences a short circuit failure.

First, a case where there is no abnormality in each device in the brake control device according to the sixth embodiment of the present disclosure 1 is described with reference to FIG. 33A.

In the brake actuation process, the power source control unit 16 outputs the output OFF signal, the brake control unit 12 outputs the brake control signal BS for controlling the opening and closing switch 22 to open, and the brake lock switch control unit 18 outputs the brake lock control signal for controlling the brake lock switch 17 to open. Since the opening and closing switch 22 is a normally open switch, the brake control unit 12 outputs a Low signal as the brake control signal BS for the opening and closing switch 22. The power source 11 that has received the output OFF signal does not output the DC voltage, i.e., the DC output voltage of the power source 11 is 0 V. Since the opening and closing switch 22 is opened through the brake actuation process, the electrical path from the positive electrode terminal of the power source 11 to the negative electrode terminal of the power source 11 via the brake device 2 is blocked. Accordingly, when no abnormality occurs in each device in the brake control device 1, the brake control unit 12 executes the brake actuation process, and thus the voltage of the power source 11 is not applied to the brake coil 115 of the brake device 2. This gives rise to the state where the brake is actuated on the motor 3. Since the current does not flow through the voltage divider resistors R1C and R2C in the state detecting unit 14, the light-emitting element in the photocoupler 41C does not emit light, and consequently the output side of the photocoupler 41C is High. Thus, the state detection signal FB indicating the potential state of the electrical path between the drain of the opening and closing switch 22 and the negative electrode terminal of the brake device 2 is High.

The power source-ON-control process is executed between the brake actuation process and the brake release process when transitioning from the brake actuation process to the brake release process. During the power source-ON-control process period, the power source control unit 16 outputs the output ON signal as the power source control signal CTRP for the power source 11, the brake control unit 12 outputs the brake control signal BS for controlling the opening and closing switch 22 to open, and the brake lock switch control unit 18 outputs the brake lock control signal for controlling the brake lock switch 17 to open. Since the opening and closing switch 22 is a normally open switch, the brake control unit 12 outputs a Low signal as the brake control signal BS for the opening and closing switch 22. The DC voltage (in the example illustrated in FIG. 32, the DC voltage of 24 V) is output from the power source 11 that has received the output ON signal. Since the opening and closing switch 22 is opened, the electrical path from the positive electrode terminal of the power source 11 to the negative electrode terminal of the power source 11 via the brake device 2 is blocked. Accordingly, when no abnormality occurs in each device in the brake control device 1, the voltage of the power source 11 is not applied to the brake coil 115 of the brake device 2. This gives rise to the state where the brake is actuated on the motor 3. The electrical path from the positive electrode terminal of the power source 11 to the drain of the opening and closing switch 22 via the brake device 2 has the same potential as the voltage output by the positive electrode terminal of the power source 11 (in the example illustrated in FIG. 32, 24 V). Thus, since the current flows through the voltage divider resistors R1C and R2C in the state detecting unit 14, the light-emitting element in the photocoupler 41C emits light, and consequently the output side of the photocoupler 41C is Low. Thus, the state detection signal FB indicating the potential state of the electrical path between the drain of the opening and closing switch 22 and the negative electrode terminal of the brake device 2 is Low.

The brake release process is executed after the power source-ON-control process. During the brake release process period, the power source control unit 16 outputs the output ON signal as the power source control signal CTRP for the power source 11, the brake control unit 12 outputs the brake control signal BS for controlling the opening and closing switch 22 to close, and the brake lock switch control unit 18 outputs the brake lock control signal for controlling the brake lock switch 17 to open. Since the opening and closing switch 22 is a normally open switch, the brake control unit 12 outputs a High signal as the brake control signal BS for the opening and closing switch 22. When no abnormality occurs in each device in the brake control device 1, the DC voltage (in the example illustrated in FIG. 32, the DC voltage of 24 V) is output from the power source 11. Since the opening and closing switch 22 is closed through the brake release process, the electrical path from the positive electrode terminal of the power source 11 to the negative electrode terminal of the power source 11 via the brake device 2 is formed. Accordingly, when no abnormality occurs in the opening and closing switch 22 and the devices related thereto, the brake control unit 12 executes the brake release process, and thus the voltage of the power source 11 is applied to the brake coil 115 of the brake device 2. This gives rise to the state where the brake on the motor 3 is released. The electrical path from the negative electrode terminal of the brake device 2 to the negative electrode terminal of the power source 11 via the opening and closing switch 22 has the same potential as 0 V, which is the potential of the negative electrode terminal of the power source 11. Thus, since the current does not flow through the voltage divider resistors R1C and R2C in the state detecting unit 14, the light-emitting element in the photocoupler 41C does not emit light, and consequently the output side of the photocoupler 41C is High. Thus, the state detection signal FB indicating the potential state of the electrical path between the drain of the opening and closing switch 22 and the negative electrode terminal of the brake device 2 is High.

The contents of the state detection signals $FB_A$ and $FB_B$ in the brake actuation process, the power source-ON-control process and the brake release process in the above-described case where there is no abnormality in the opening and closing switch 22, the devices related to this switch and the power source 11, i.e., in the normal state, are stored in advance in the abnormality detecting unit 15 such that it can be used for the abnormality detection process described below.

Subsequently, a case where the short circuit failure of the opening and closing switch 22 has occurred is described with reference to FIG. 33B.

When the short circuit failure of the opening and closing switch 22 has occurred during the power source-ON-control process period, the state detection signal FB output from the state detecting unit 14 differs from the signal state in the normal state. That is, during the power source-ON-control process period, the opening and closing switch 22 is opened in the normal state, but when a short circuit failure of the opening and closing switch 22 occurs, the opening and closing switch 22 is caused to be in the same state as the closed state. During the power source-ON-control process period, the DC voltage (in the example illustrated in FIG. 32, the DC voltage of 24 V) is output from the power source 11 that has received the output ON signal. Since the opening and closing switch 22 is caused to be in the closed state due to the short circuit failure of the opening and closing switch 22, the electrical path from the positive electrode terminal of the power source 11 to the negative electrode terminal of the power source 11 via the brake device 2 is formed. The electrical path from the negative electrode terminal of the brake device 2 to the negative electrode terminal of the power source 11 via the opening and closing switch 22 has the same potential as 0 V, which is the potential of the negative electrode terminal of the power source 11. Thus, since the current does not flow through the voltage divider resistors R1C and R2C in the state detecting unit 14, the light-emitting element in the photocoupler 41C does not emit light, and consequently the output side of the photocoupler 41C is High. Thus, the state detection signal FB indicating the potential state of the electrical path between the drain of the opening and closing switch 22 and the negative electrode terminal of the brake device 2 is High.

As a result, when the short circuit failure of the opening and closing switch 22 has occurred during the power source-ON-control process period, the state detection signal FB output from the state detecting unit 14 differs from the signal state in the normal state. During the execution of the power source-ON-control process, the abnormality detecting unit 15 detects whether or not the short circuit failure occurs in the opening and closing switch 22, based on the combination of the contents of the brake control signal BS and the contents of the state detection signal FB. More specifically, during the execution of the power source-ON-control process, the abnormality detecting unit 15 determines that no short circuit failure occurs in the opening and closing switch 22 when the state detection signal FB is Low, and determines that an abnormality occurs (i.e., the short circuit failure of the opening and closing switch 22) when the state detection signal FB is High. When the occurrence of an abnormality is detected during the execution of the power source-ON-control process, the abnormality detecting unit 15 outputs the alarm signal.

Subsequently, a case where the first protecting operation process is performed when the opening and closing switch 22 experiences a short circuit failure is described with reference to FIG. 34A.

When the abnormality detecting unit 15 determines that the short circuit failure of the opening and closing switch 22 has occurred, the first protecting operation process is executed after the power source-ON-control process.

In the first protecting operation process, the power source control unit 16 outputs the output OFF signal as the power source control signal CTRP for the power source 11, and the brake lock switch control unit 18 outputs the close signal for controlling the brake lock switch 17 to close as the brake lock control signal for the brake lock switch 17. As a result, the power source 11 does not output the DC voltage, i.e., the DC output voltage of the power source 11 is 0 V, the brake lock switch 17 is closed, and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

In the second protecting operation process being a modified example of the above-described first protecting operation process, the brake lock switch control unit 18 outputs the brake lock control signal to close the brake lock switch 17 as illustrated in FIG. 34B, but the power source control signal CTRP output by the power source control unit 16 to the power source 11 remains the output ON signal. As a result, the power source 11 outputs the DC voltage of 24 V, but the brake lock switch 17 is closed and a short circuit occurs between the input terminals of the brake device 2 (i.e., between the positive electrode terminal and the negative electrode terminal of the brake device 2), and therefore, the voltage of the power source 11 is not applied to the brake coil 115 of the brake device 2. This gives rise to the state where the brake is actuated on the motor 3, and safety is ensured.

In the third protecting operation process being a modified example of the above-described first protecting operation process, as illustrated in FIG. 34C, the power source control unit 16 outputs the output OFF signal as the power source control signal CTRP for the power source 11, but the brake lock control signal output by the brake lock switch control unit 18 to the brake lock switch 17 remains the open signal. As a result, since the brake lock switch 17 remains open, a short circuit is not made between the input terminals of the brake device 2 (i.e., between the positive electrode terminal and the negative electrode terminal of the brake device 2), but the power source 11 does not output the DC voltage, i.e., the DC output voltage of the power source 11 is 0 V, and therefore, the voltage of the power source 11 is not applied to the brake coil 115 of the brake device 2. This gives rise to the state where the brake is actuated on the motor 3, and safety is ensured.

As described above, the brake control device 1 according to the sixth embodiment of the present disclosure allows the brake of the brake device 2 actuated on the motor 3 to be released only when no abnormality occurs. Even when an abnormality occurs at the time of releasing the brake of the brake device 2 actuated on the motor 3, the release of the brake can be avoided.

It should be noted that while the brake lock switch 17 includes a normally open switch in the above-described fifth and sixth embodiments, the brake lock switch 17 may also include a normally closed switch as an alternative example. Due to the brake lock switch 17 including a normally close switch, even when the power source of the drive circuit of the normally closed brake lock switch 17 is lost for some reason, a short circuit occurs between the input terminals of the brake device 2 (i.e., between the positive electrode terminal and the negative electrode terminal of the brake device 2), and thus the voltage of the power source 11 is not applied to the brake coil 115 of the brake device 2. This gives rise to the state where the brake is actuated on the motor 3, and safety is ensured.

REFERENCE SIGNS LIST

1 Brake control device
2 Brake device
3 Motor
11 Power source
12 Brake control unit
13 Opening and closing unit
14 State detecting unit
Abnormality detecting unit
16 Power source control unit
17 Brake lock switch
18 Brake lock switch control unit
21A Positive-side opening and closing switch
21B Negative-side opening and closing switch
22 Opening and closing switch
41A, 41B, 41C Photocoupler
42 Surge absorber
100 Motor drive device
Friction plate
112 Armature
113 End plate
114 Spring
115 Brake coil
116 Core
117 Spacer
118 Bolt
Shaft
122 Hub
R1A, R2A, R1B, R2B, R1C, R2C Voltage divider resistor
R3A, R3B, R3C Pull-up resistor

The invention claimed is:

1. A brake control device configured to control a brake device that is a non-excitation actuated type and is configured to actuate a brake in a non-excitation state in which no voltage is applied and to release the brake in an excitation state in which a voltage is applied, the brake control device comprising:

a power source configured to be controlled so as to output the voltage or not to output the voltage in response to a received power source control signal;

a brake control unit configured to output a brake control signal;

an opening and closing unit connected in series to the brake device and configured to open and close an electrical path between the power source and the brake device in response to the brake control signal which has been received;

a state detecting unit configured to output a state detection signal indicating a potential state of an electrical path between the opening and closing unit and the brake device;

an abnormality detecting unit including a processor with a memory, and configured to detect whether or not an abnormality occurs, based on a combination of a content of the brake control signal and a content of the state detection signal; and a power source control unit configured to output, as the power source control signal for the power source, an output OFF signal for controlling the power source so as not to output the voltage, when the occurrence of the abnormality is detected by the abnormality detecting unit, wherein the opening and closing unit includes:

at least one positive-side opening and closing switch configured to open and close an electrical path between a positive electrode terminal of the power source and a positive electrode terminal of the brake device; and at least one negative-side opening and closing switch configured to open and close an electrical path between a negative electrode terminal of the power source and a negative electrode terminal of the brake device, wherein the brake control unit is configured to execute:

a brake actuation process to output the brake control signal for controlling the positive-side opening and closing switch and the negative-side opening and closing switch to open;

a brake release process to output the brake control signal for controlling the positive-side opening and closing switch and the negative-side opening and closing switch to close; and a brake release preparation process to output the brake control signal for controlling the positive-side opening and closing switch to close and the negative-side opening and closing switch to open between the brake actuation process and the brake release process during a transition from the brake actuation process to the brake release process, wherein the abnormality detecting unit is configured to detect whether or not the abnormality occurs, during execution of the brake actuation process and during execution of the brake release preparation process, based on the combination of the content of the brake control signal and the content of the state detection signal, and wherein the power source control unit is configured to output the output OFF signal when the abnormality detecting unit detects the occurrence of the abnormality, both during the execution of the brake actuation process and during the execution of the brake release preparation process.

2. The brake control device according to claim 1, wherein the power source control unit is configured to output, as the power source control signal for the power source, an output ON signal for controlling the power source so as to output the voltage when the occurrence of the abnormality is not detected by the abnormality detecting unit.

3. The brake control device according to claim 1, wherein the brake control unit is configured to terminate the brake release preparation process and execute the brake release process when the abnormality detecting unit does not detect the occurrence of the abnormality during the execution of the brake release preparation process.

4. The brake control device according to claim 1, wherein the abnormality detecting unit is configured to detect whether or not the abnormality occurs, during the execution of the brake actuation process, based on the combination of the content of the brake control signal and the content of the state detection signal, and wherein the abnormality detecting unit is configured to output an alarm signal when the abnormality detecting unit detects the occurrence of the abnormality during the execution of the brake actuation process.

5. The brake control device according to claim 1, wherein the abnormality detecting unit is configured to:

detect whether or not a further abnormality in the power source occurs, while the power source control unit outputs the output OFF signal before execution of the brake release preparation process during a transition from the brake actuation process to the brake release preparation process, based on a combination of the content of the brake control signal, the content of the state detection signal, and a content of the power source control signal; and output an alarm signal when the occurrence of the further abnormality in the power source is detected.

6. The brake control device according to claim 5, wherein the brake control unit is configured to terminate the brake release preparation process and execute the brake release process when at least one selected from the group consisting of the occurrence of the abnormality to be detected during the execution of the brake actuation process by the abnormality detecting unit, the occurrence of the abnormality to be detected during the execution of the brake release preparation process by the abnormality detecting unit, and occurrence of the further abnormality in the power source is not detected during a transition from the brake actuation process to the brake release process via the brake release preparation process.

7. The brake control device according to claim 1, wherein the abnormality detecting unit is configured to:

detect whether or not a further abnormality in the power source occurs, while the power source control unit outputs the output ON signal for controlling the power source so as to output the voltage before the brake actuation process is executed during a transition from the brake release process to the brake actuation process, based on a combination of the content of the brake control signal, the content of the state detection signal, and the content of the power source control signal; and output an alarm signal when the occurrence of the further abnormality in the power source is detected.

8. A motor drive device, comprising:

a brake device that is a non-excitation actuated type and configured to actuate a brake on a motor in a non-excitation state in which no voltage is applied and to release the brake on the motor in an excitation state in which a voltage is applied; and the brake control device according to claim 1 that is configured to control the brake device.

9. A brake control device configured to control a brake device that is a non-excitation actuated type and is configured to actuate a brake in a non-excitation state in which no voltage is applied and to release the brake in an excitation state in which a voltage is applied, the brake control device comprising:

a power source configured to be controlled so as to output the voltage or not to output the voltage in response to a received power source control signal;

a brake control unit configured to output a brake control signal;

an opening and closing unit connected in series to the brake device and configured to open and close an electrical path between the power source and the brake device in response to the brake control signal which has been received;

a state detecting unit configured to output a state detection signal indicating a potential state of an electrical path between the opening and closing unit and the brake device;

an abnormality detecting unit including a processor with a memory, and configured to detect whether or not an abnormality occurs, based on a combination of a content of the brake control signal and a content of the state detection signal; and a power source control unit configured to output, as the power source control signal for the power source, an output OFF signal for controlling the power source so as not to output the voltage, when the occurrence of the abnormality is detected by the abnormality detecting unit, wherein the opening and closing unit includes at least one opening and closing switch configured to open and close an electrical path between a positive electrode terminal of the power source and a positive electrode terminal of the brake device or an electrical path between a negative electrode terminal of the power source and a negative electrode terminal of the brake device, wherein the brake control unit is configured to execute a brake actuation process to output the brake control signal for controlling the opening and closing switch to open and a brake release process to output the brake control signal for controlling the opening and closing switch to close, wherein the abnormality detecting unit is configured to detect whether or not the abnormality occurs, during the execution of the brake actuation process, based on the combination of the content of the brake control signal and the content of the state detection signal, wherein the power source control unit is configured to output the output OFF signal when the abnormality detecting unit detects the occurrence of the abnormality during the execution of the brake actuation process, the abnormality detecting unit is configured to detect whether or not a further abnormality in the power source occurs, while the power source control unit outputs the output OFF signal before the brake actuation process is executed during a transition from the brake actuation process to the brake release process, based on a combination of the content of the brake control signal, the content of the state detection signal, and a content of the power source control signal, and wherein the brake control unit is configured to:

continue the execution of the brake actuation process when the abnormality detecting unit detects the occurrence of the further abnormality in the power source, and terminate the brake actuation process and execute the brake release process when the abnormality detecting unit does not detect the occurrence of the further abnormality in the power source.

10. The brake control device according to claim 9, wherein the brake control unit is configured to terminate the brake actuation process and execute the brake release process when the abnormality detecting unit does not detect the occurrence of the abnormality while the brake actuation process is executed during a transition from the brake actuation process to the brake release process.

11. The brake control device according to claim 9, wherein the abnormality detecting unit is configured to output an alarm signal when the occurrence of the abnormality is detected during the execution of the brake actuation process.

12. The brake control device according to claim 9, wherein the abnormality detecting unit is configured to output an alarm signal when detecting the occurrence of the further abnormality in the power source.

13. A brake control device configured to control a brake device that is a non-excitation actuated type and is configured to actuate a brake in a non-excitation state in which no voltage is applied and to release the brake in an excitation state in which a voltage is applied, the brake control device comprising:

a power source configured to be controlled so as to output the voltage or not to output the voltage in response to a received power source control signal;

a brake control unit configured to output a brake control signal;

an opening and closing unit connected in series to the brake device and configured to open and close an electrical path between the power source and the brake device in response to the brake control signal which has been received;

a state detecting unit configured to output a state detection signal indicating a potential state of an electrical path between the opening and closing unit and the brake device;

an abnormality detecting unit including a processor with a memory, and configured to detect whether or not an abnormality occurs, based on a combination of a content of the brake control signal and a content of the state detection signal;

a power source control unit configured to output, as the power source control signal for the power source, an output OFF signal for controlling the power source so as not to output the voltage, when the occurrence of the abnormality is detected by the abnormality detecting unit;

a brake lock switch connected between input terminals of the brake device so as to be connected in parallel to the brake device and configured to open and close an electrical path in response to a received brake lock control signal; and a brake lock switch control unit configured to output, as the brake lock control signal for the brake lock switch, a close signal for controlling the brake lock switch to close when the occurrence of the abnormality is detected by the abnormality detecting unit, and output an open signal for controlling the brake lock switch to open when the occurrence of the abnormality is not detected by the abnormality detecting unit.

* * * * *